(12) United States Patent
Nemovicher

(10) Patent No.: US 7,395,436 B1
(45) Date of Patent: Jul. 1, 2008

(54) METHODS, SOFTWARE PROGRAMS, AND SYSTEMS FOR ELECTRONIC INFORMATION SECURITY

(76) Inventor: Kerry Nemovicher, 39 Markham Cir., Englewood, NJ (US) 07631

( * ) Notice: Subject to any disclaimer, the term of this patent is extended or adjusted under 35 U.S.C. 154(b) by 574 days.

(21) Appl. No.: 10/301,395

(22) Filed: Nov. 21, 2002

Related U.S. Application Data

(60) Provisional application No. 60/353,635, filed on Jan. 31, 2002.

(51) Int. Cl.
  *H04L 9/32* (2006.01)
  *H04K 1/00* (2006.01)
  *G06F 7/04* (2006.01)

(52) U.S. Cl. .................. 713/193; 713/166; 726/28; 726/30

(58) Field of Classification Search .............. 713/193, 713/166; 726/30, 28
  See application file for complete search history.

(56) References Cited

U.S. PATENT DOCUMENTS

| | | | |
|---|---|---|---|
| 5,657,390 A | 8/1997 | Elgamal et al. | |
| 5,978,475 A * | 11/1999 | Schneier et al. | 713/177 |
| 6,088,747 A * | 7/2000 | Cotugno et al. | 710/74 |
| 6,574,609 B1 * | 6/2003 | Downs et al. | 705/50 |
| 6,584,466 B1 * | 6/2003 | Serbinis et al. | 707/10 |
| 6,587,945 B1 * | 7/2003 | Pasieka | 713/176 |
| 6,754,820 B1 * | 6/2004 | Scheidt et al. | 713/166 |
| 6,868,495 B1 * | 3/2005 | Glover | 713/190 |
| 6,950,867 B1 * | 9/2005 | Strohwig et al. | 709/224 |
| 6,981,141 B1 * | 12/2005 | Mahne et al. | 713/165 |
| 2002/0007453 A1 | 1/2002 | Nemovicher | |

(Continued)

OTHER PUBLICATIONS

Schneier, Bruce, "Applied Cryptography," 1996, pp. 15-17 and 34-39.*

(Continued)

*Primary Examiner*—Emmanuel L. Moise
*Assistant Examiner*—Michael Pyzocha
(74) *Attorney, Agent, or Firm*—Day Pitney LLP

(57) ABSTRACT

The present invention relates to various methods, software programs, and systems for electronic information security. More particularly, these various methods, software programs, and systems may serve to protect information security by providing an integrated system that helps ensure confidentiality, integrity, accountability, and ease of use. Certain embodiments of the present invention relate to methods, software programs, and systems for electronic information security utilizing a file container for storing: (a) a data file, which data file is encrypted with a one-time random encryption key; (b) the one-time random encryption key, which one-time random encryption key is encrypted with a public key portion of a public key/private key pair associated with an owner of the file container; (c) an audit trail log of the history of the file container, which audit trail log is encrypted with the one-time random encryption key with which the data file is encrypted; (d) a digital signature based upon a hash of the combined data file and the audit trail log, which hash is encrypted with a private key portion of a public key/private key associated with a writer/creator of the file container; and (e) a profile associated with the file container. Additional embodiments of the present invention relate to methods, software programs, and systems for electronic information security utilizing a fully integrated system for user authentication, virus scanning, time/date certification, encryption/decryption, digital signatures, stored document protection, transmitted document protection, and delivery verification.

8 Claims, 41 Drawing Sheets

Virtual Strongbox Open

U.S. PATENT DOCUMENTS

| | | | |
|---|---|---|---|
| 2002/0019936 A1* | 2/2002 | Hitz et al. | 713/165 |
| 2002/0055942 A1* | 5/2002 | Reynolds | 707/200 |
| 2002/0133707 A1* | 9/2002 | Newcombe | 713/183 |
| 2002/0188638 A1* | 12/2002 | Hamscher | 707/530 |
| 2003/0217264 A1* | 11/2003 | Martin et al. | 713/156 |

OTHER PUBLICATIONS

Sibert, et al., Securing the content, not the wire, for information commerce, 1996.

* cited by examiner

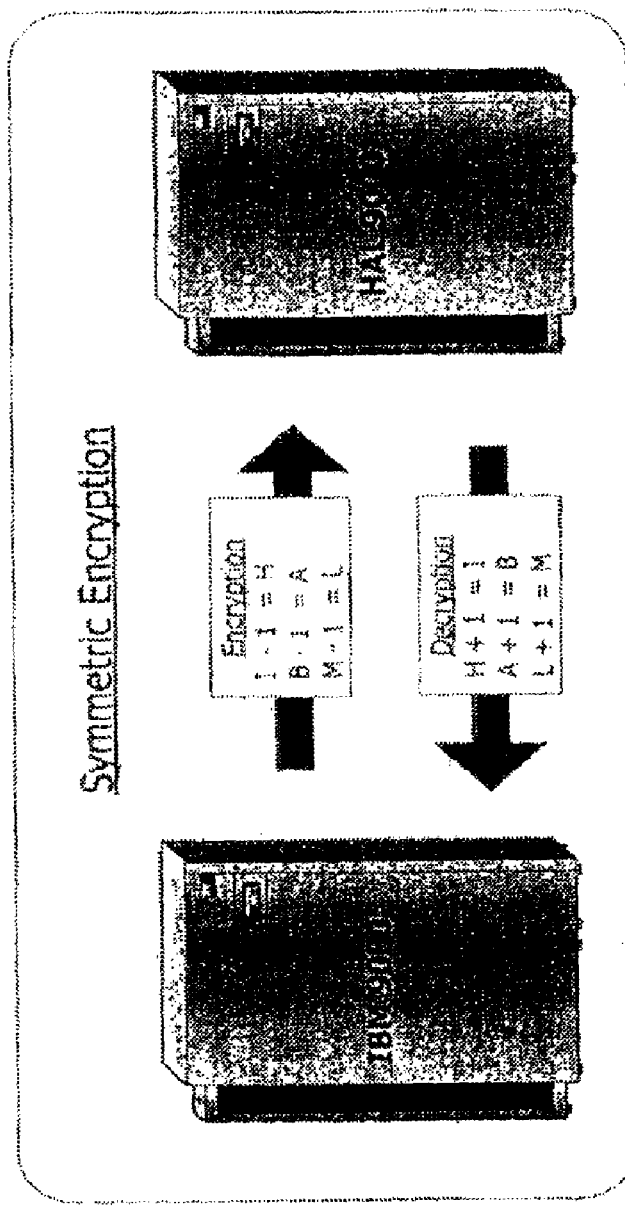
Fig. 1 Symmetric Encryption
(Prior Art)

Fig. 2 Asymmetric Encryption
*(Prior Art)*
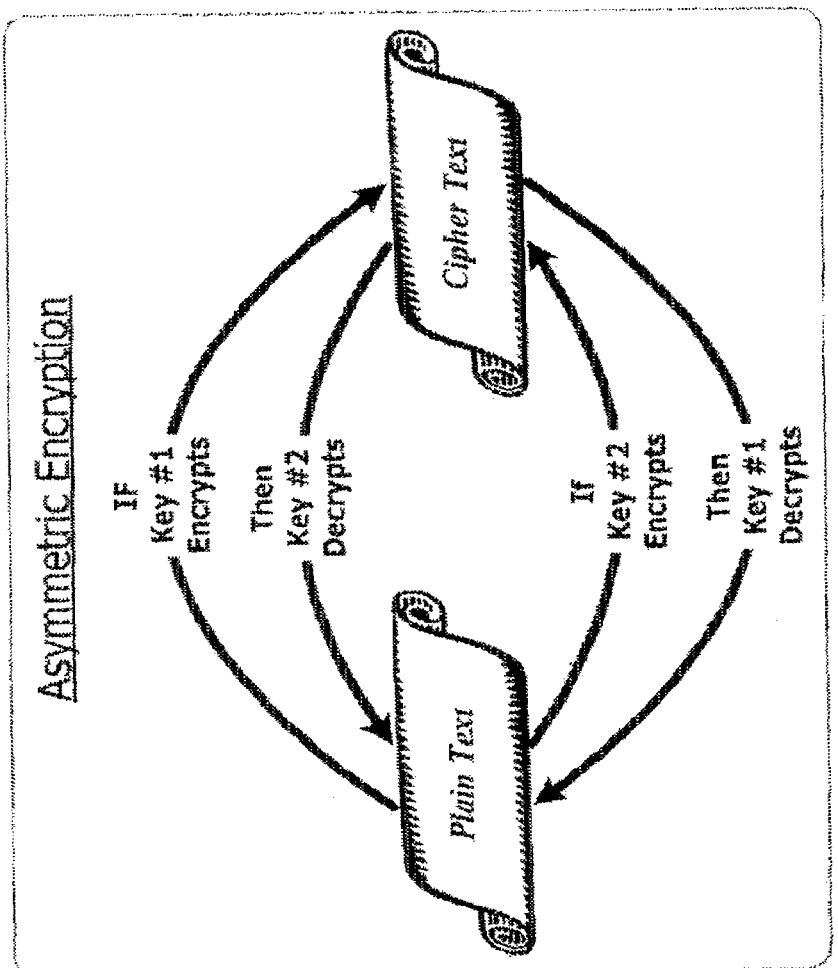

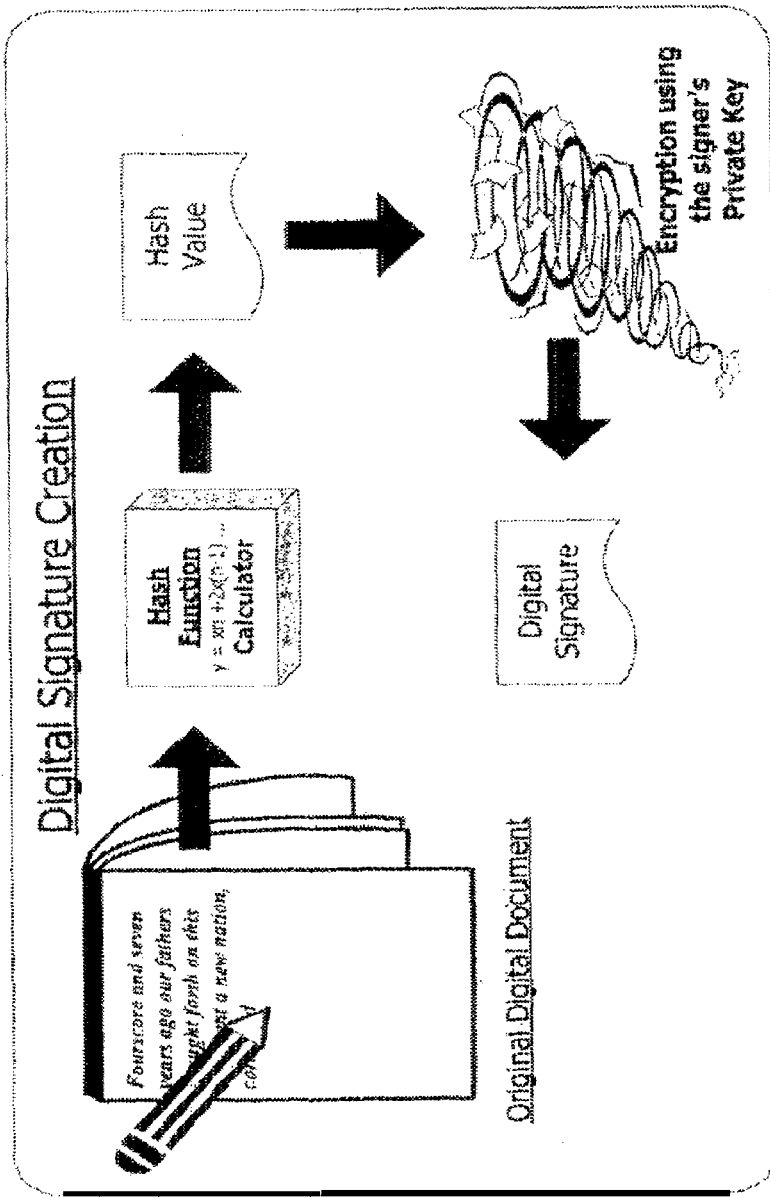
Fig. 3A  Digital Signature Creation
(Prior Art)

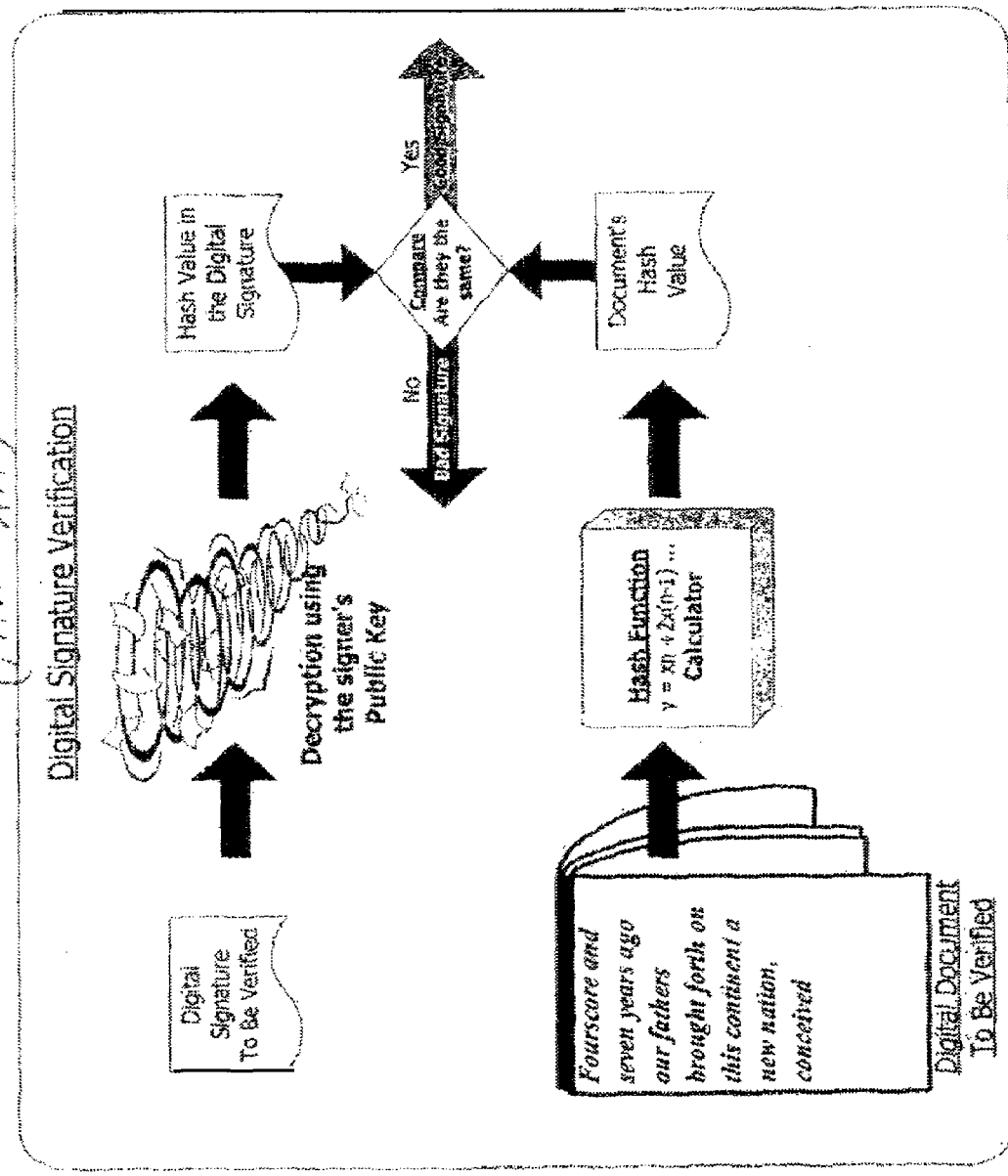
Fig. 3B Digital Signature Verification (Prior Art)

Fig. 4 S-I-S Virtual Strongbox System Components
The Components of the S-I-S Virtual Strongbox Data Security System
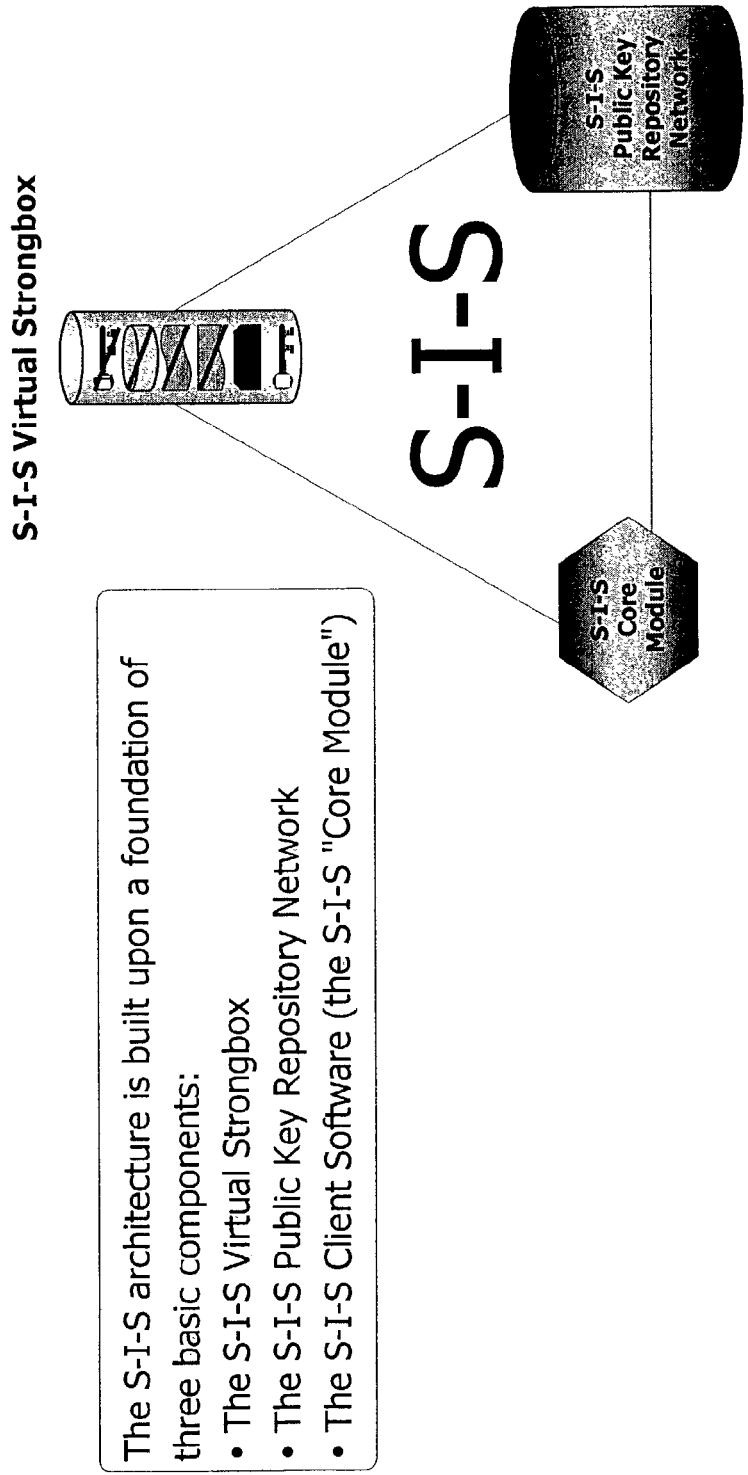
The S-I-S architecture is built upon a foundation of three basic components:
- The S-I-S Virtual Strongbox
- The S-I-S Public Key Repository Network
- The S-I-S Client Software (the S-I-S "Core Module")

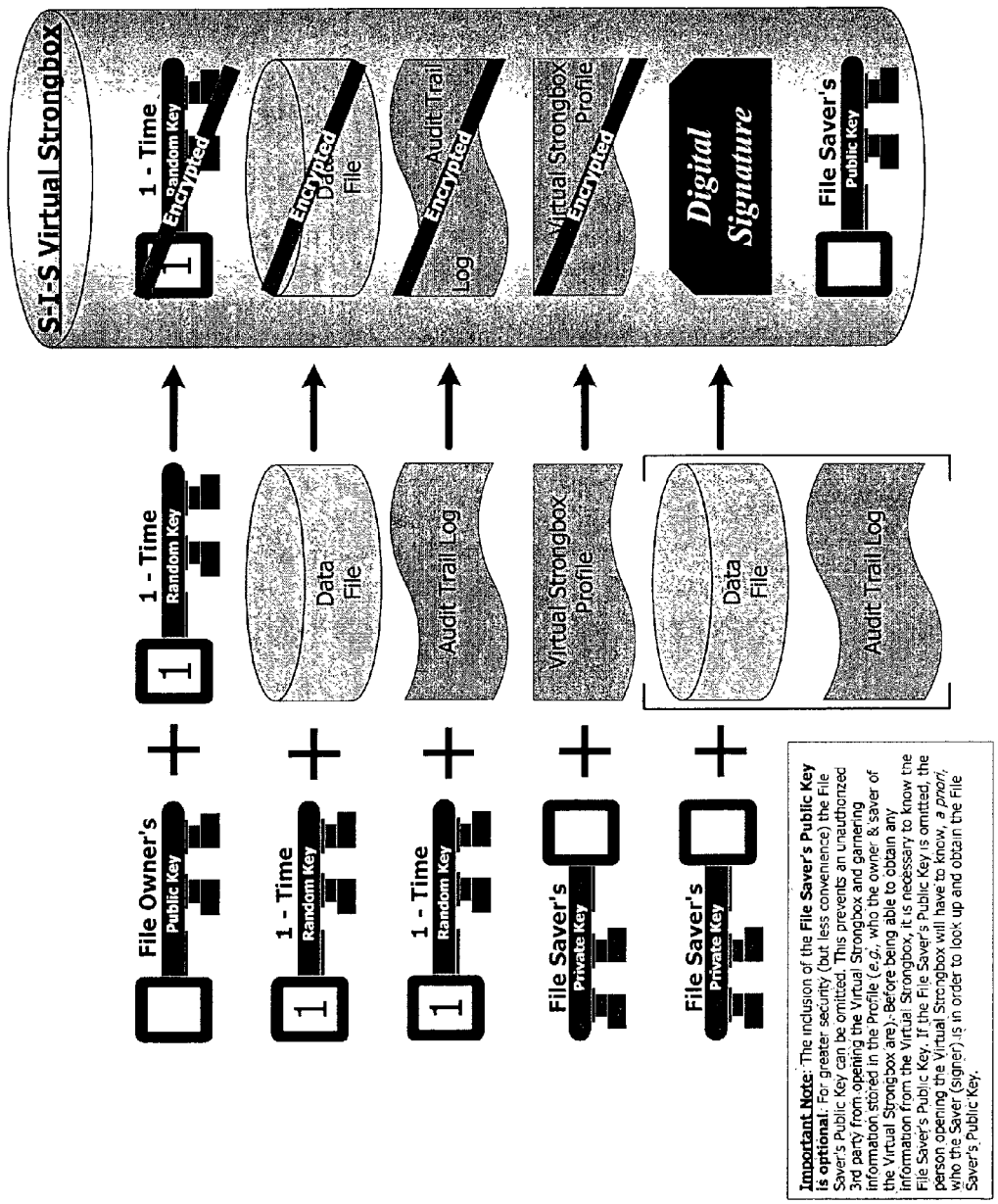
Fig. 5A  S-I-S Virtual Strongbox

Fig. 5B  S-I-S Virtual Strongbox Ownership

Strongbox Ownership

What Each Function Requires (Uses) For Each Type of Ownership

| Function | Individual Identity | Group Identity | Group Membership | Group Entity |
|---|---|---|---|---|
| Strongbox Open | Individual's Private Key | Group's Private Key | Group's Private Key | Multiple Private Keys |
| Strongbox Save | Individual's Public Key | Group's Public Key | Group's Public Key | Group's Public Key |
| Digitally Sign | Individual's Private Key | Individual's Private Key | Individual's Private Key | Multiple Private Keys |
| Obtain Keys | Real-Time Generation | Real-Time Generation | Table Look-up | Real-Time Generation |
| Private Key Storage | Not Stored | Not Stored | Stored in Table | Not Stored |
| Public Key Storage | Stored in Repository | Stored in Repository | Stored in Repository | Stored in Repository |
| Authentication | Key Pair Generation | Key Pair Generation | Table Look-up | Key Pair Generation |

Group Identity (High Security)
The Virtual Strongbox is owned by a group (e.g., a department in an organization). The Group Identity is functionally the same as an individual, except for digital signature and audit trail records (which always revert to the individual). The Group Identity authentication requires real-time key generation. Group members must typically remember the group password and possibly have a group specific "unique device".

Group Membership (Moderate Security)
The Virtual Strongbox is owned by a group (e.g., a department in an organization). The Group Membership is functionally the same as an individual, except for digital signature and audit trail records (which always revert to the individual). The Group Membership authentication requires table look for membership, based upon individual identity authentication. Group Membership use also requires a "group administrator" to manage and control the look-up table and its keys

Group Entity (Very High Security)
The Virtual Strongbox is owned by more than one individual, but typically not many. The Ownership is functionally the same as an individual, except that all the individual owners are required for all functions. All of the individual owner authentications are required to establish the Group Entity identification. The digital signature and audit trail records are also that of the Group Entity and not of any single individual. The concept is similar to that of a safety deposit box that requires multiple keys to be opened and closed.

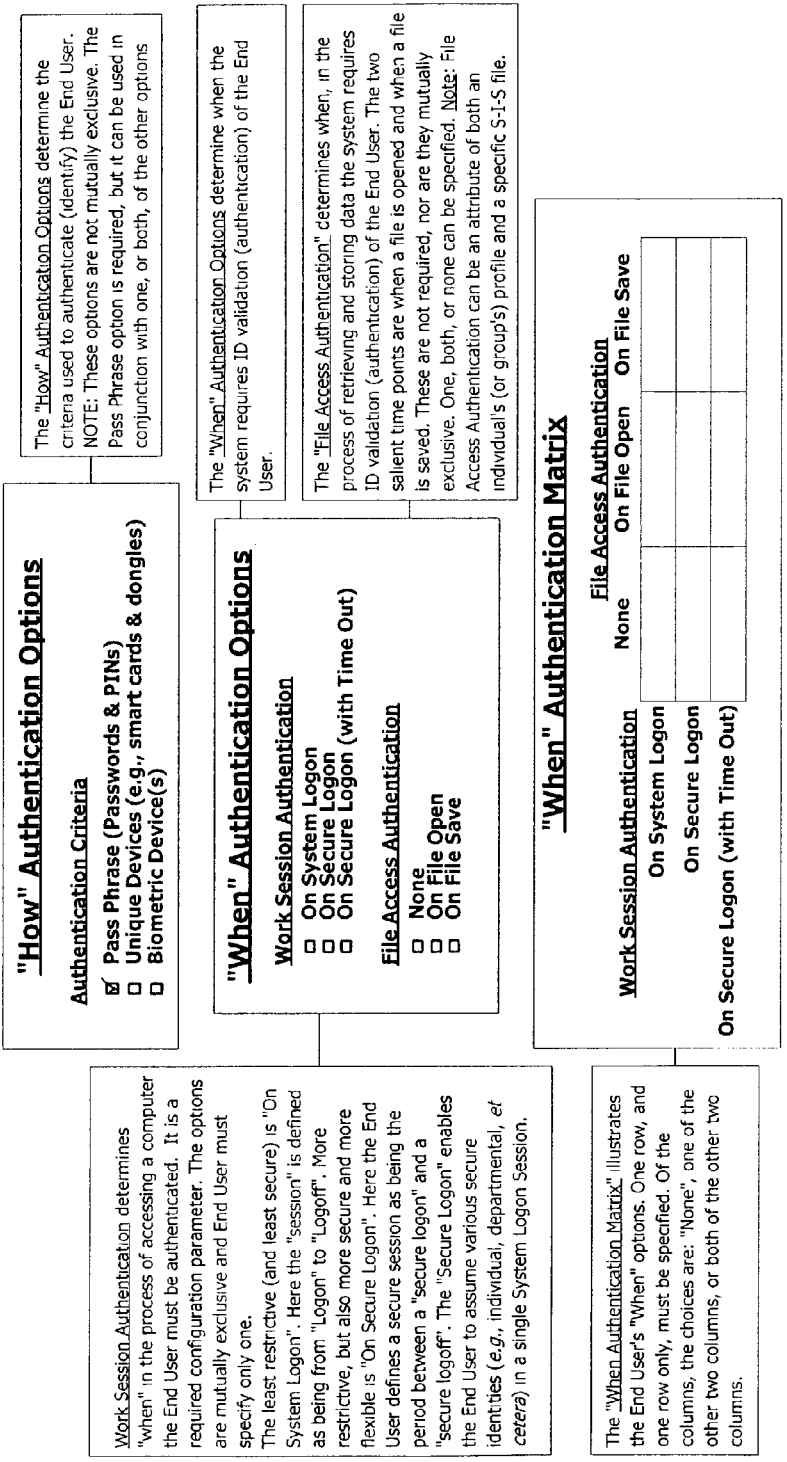
Fig. 6 S-I-S Authentication Options

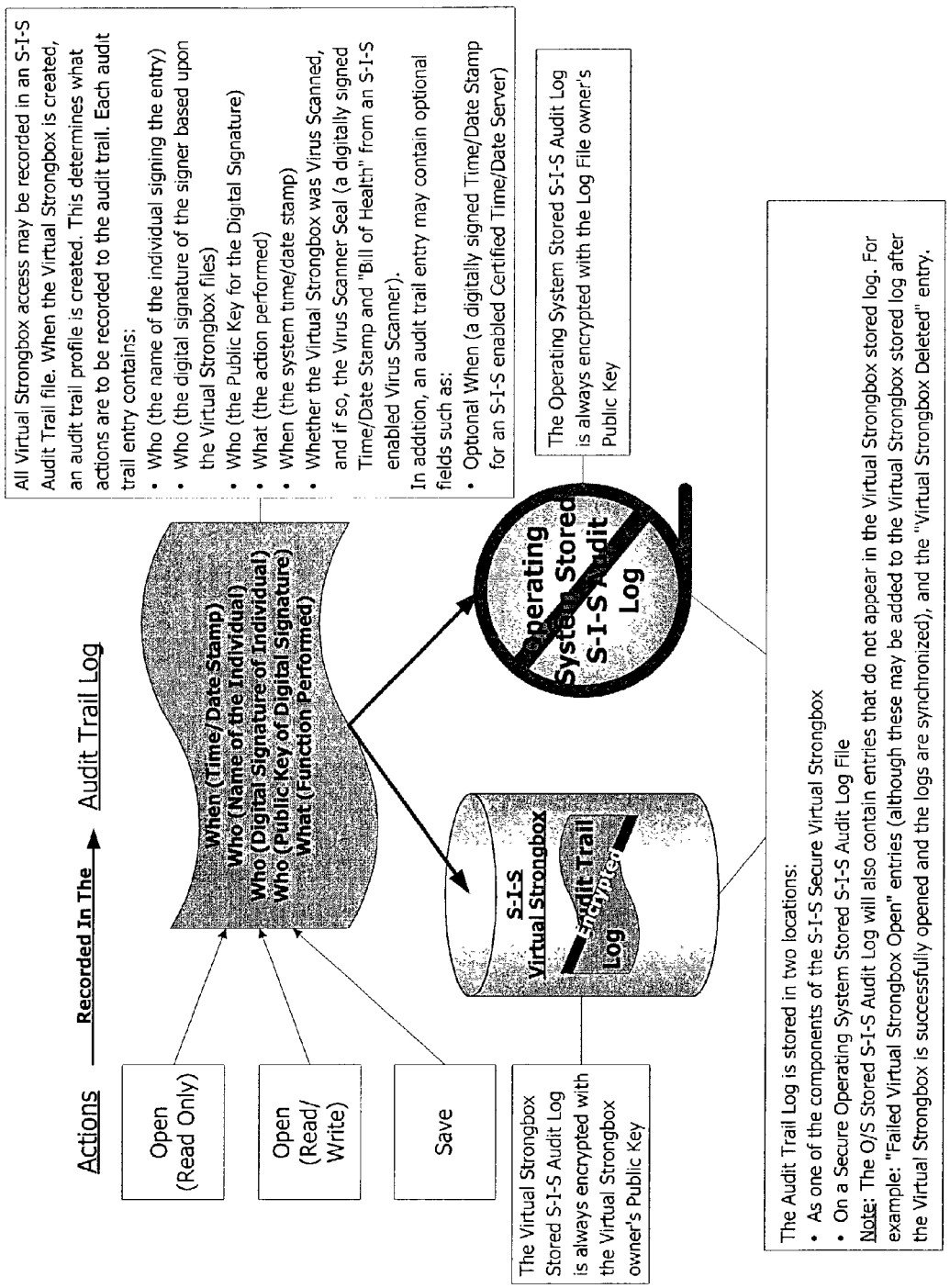
Fig. 7 S-I-S Audit Trail Log

Fig. 8 S-I-S Return Receipt Package

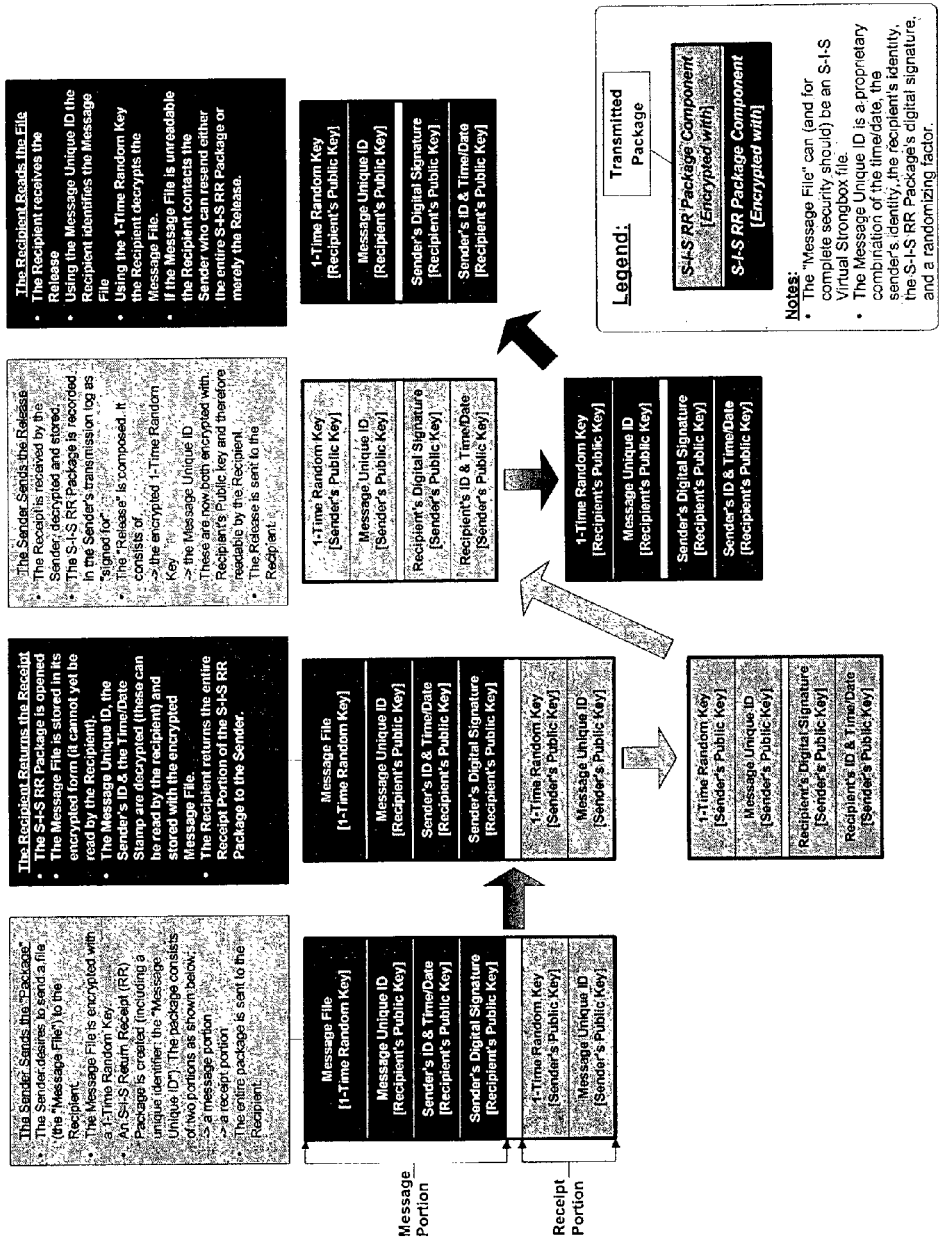
Fig. 9 S-I-S Return Receipt System

Fig. 10  S-I-S Return Receipt Options

S-I-S Return Receipt Options

The Recipient has two options: to set his/her local S-I-S enabled File Transmission software to automatically send the return receipt ("Implicit" Acknowledgement) or to require that the return receipt be sent only when the recipient explicitly authorizes it ("Explicit" Acknowledgement). The Sender has the option, on a per message basis, to force an Explicit response. The Sender also has two receipt handling options: to manage the return receipt directly, or to allow the Secure Third Party Intermediary Service (e.g., a Secure e-Mail Service) to manage it. This can be chosen on a per message basis.

| Receipt Processing is: | Acknowledgement is: | |
|---|---|---|
| | Explicit | Implicit |
| Sender Managed | High Security | Lower Security |
| Service Managed | High Security | Lower Security |

Fig. 11  S-I-S File Name Randomizer

File names and ownership can, and should, be revealing. With the quantity of information stored and the number of files maintained on computers, it would be totally unmanageable if the file names did not indicate something about the content of their files and who owns them. And yet, even if a malefactor does not have access to the content of a file, knowing the name of file, that the file exists, and who the owner is, can be valuable information. In order to protect against this type of vulnerability, S-I-S provides an optional S-I-S File Name Randomizer program. The S-I-S File Name Randomizer program maintains a translation table that converts between meaningful file names (Virtual Strongbox names) and random meaningless names, generated by S-I-S, that are seen by the operating system. This program also contains an optional feature that similarly disguises file ownership (using randomly generated proxy owner names). The S-I-S File Name Randomizer program uses one or two tables. For the most stringent security, each user maintains his/her own "S-I-S File Name & Ownership Translation Table". This is kept in a special Virtual Strongbox owned by the user. For less private security, but for greater System Administrator control, the operating system can also maintain a single "Global File Name and Ownership Translation Table" common to all users. This table is accessible by operating system users. Confidentiality in this table is maintained through the use of encrypted and digitally signed table entries.

Basic File Name Translation
When a new Virtual Strongbox is created, the S-I-S File Name Randomizer:
- Obtains the meaningful name from the user
- Generates a "random" name for use by the operating system
- Creates a new translation entry in the owner's translation table
- Saves the new Virtual Strongbox as an operating system visible file using the random name.

When the user wishes to open a Virtual Strongbox and the S-I-S File Name Randomizer is operating, the user consults the list of meaningful Virtual Strongbox names in the translation table. Upon choosing one, the S-I-S File Name Randomizer issues a command to the operating system to open the file (the Virtual Strongbox file) with the corresponding random name.

File Proxy Ownership
The File Proxy Ownership option enables the user to hide the ownership of a Virtual Strongbox file. When this option is installed, the S-I-S File Name Randomizer registers a number of new operating system users. Each of these new users has a "random" name, i.e., a "proxy" name, and identical permissions as the original S-I-S user. The number of proxy names requested is a user settable parameter. When a new Virtual Strongbox is created, the S-I-S File Name Randomizer saves the Virtual Strongbox file in the operating system, assigning its ownership to one of the file owner's proxy names. Access to the operating system file directory reveals only the proxy name for the file ownership and not the identity of the real owner. When a Virtual Strongbox is opened, the S-I-S File Name Randomizer assumes the identity of the proxy name in order to open the file.

S-I-S File Name & Ownership Translation Table

| Basic File Name Translation | | Owner Proxy Name |
|---|---|---|
| Meaningful File Name 1 | Random File Name 1 | Proxy Owner Name 1 |
| Meaningful File Name 2 | Random File Name 2 | Proxy Owner Name 2 |
| Meaningful File Name 3 | Random File Name 3 | Proxy Owner Name 3 |
| ... | ... | ... |
| Meaningful File Name n | Random File Name n | Proxy Owner Name n |

Global File Name & Owner Translation Table
Since the System Administrator's Public Key is known, each user can write his/her own entries into the table. Since the Meaningful File Name column is encrypted with the File Owner's Public Key, only the File Owner can know its value. The two Plain Text fields contain information that is available in the operating system directories. The File Owner's Real Name is accessible only to the System Administrator. The File Owner's Digital Signature prevents bogus table entries.

Global File Name and Ownership Translation Table

| Basic File Name Translation | | Owner Proxy Name | Owner Name Translation | Owner Digital Signature |
|---|---|---|---|---|
| Meaningful File Name 1 | Random File Name 1 | Proxy Owner Name 1 | Actual Owner Name 1 | Digital Signature Entry 1 |
| Meaningful File Name 2 | Random File Name 2 | Proxy Owner Name 2 | Actual Owner Name 2 | Digital Signature Entry 2 |
| Meaningful File Name 3 | Random File Name 3 | Proxy Owner Name 3 | Actual Owner Name 3 | Digital Signature Entry 3 |
| ... | ... | ... | ... | ... |
| Meaningful File Name n | Random File Name n | Proxy Owner Name n | Actual Owner Name n | Digital Signature Entry n |
| Encrypted with? -> | Owner's Public Key | "Plain Text" | "Plain Text" | Sys Admin Public Key | Owner's Private Key |

Fig. 12 Point-to-Point Encryption
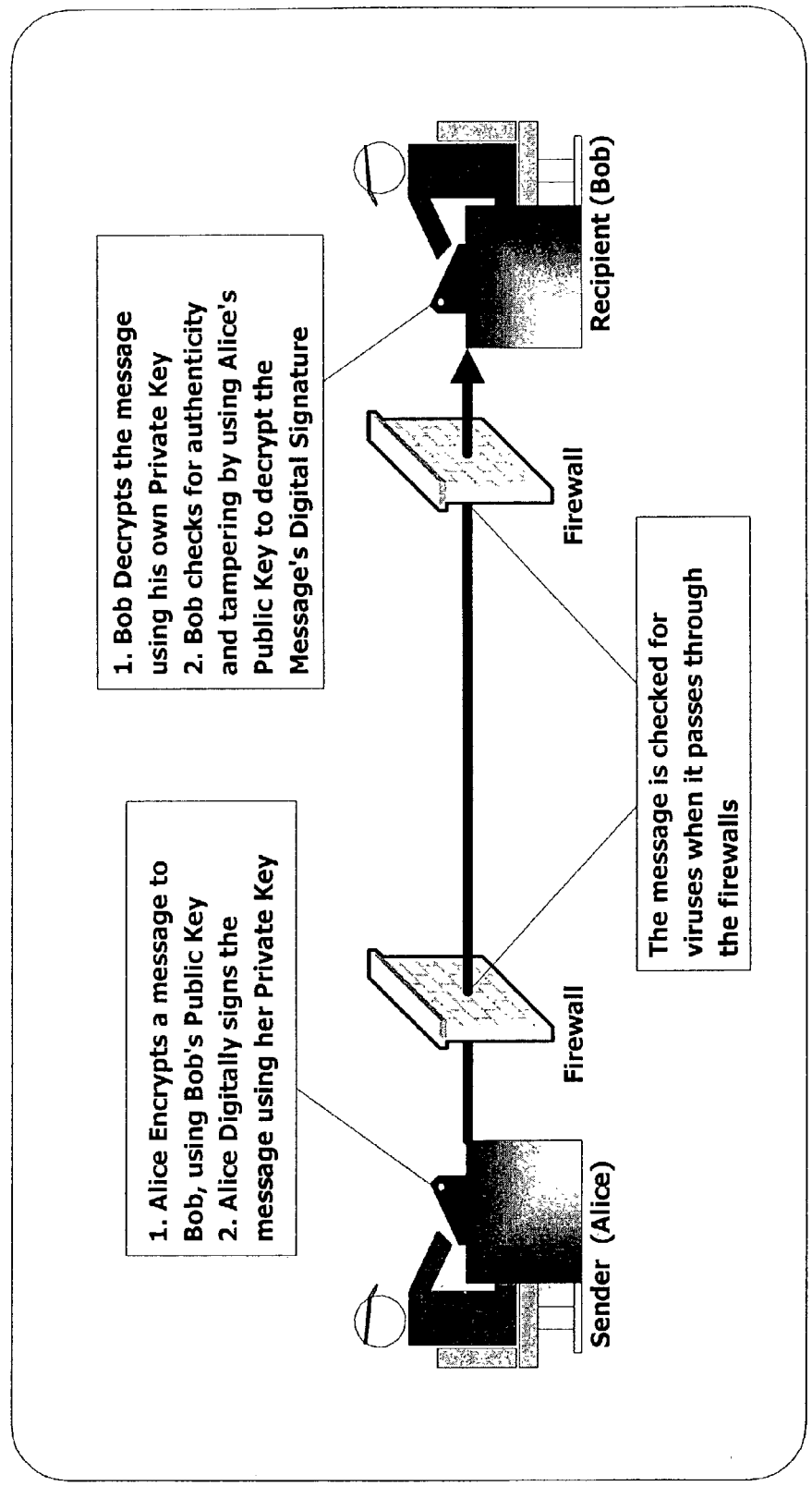

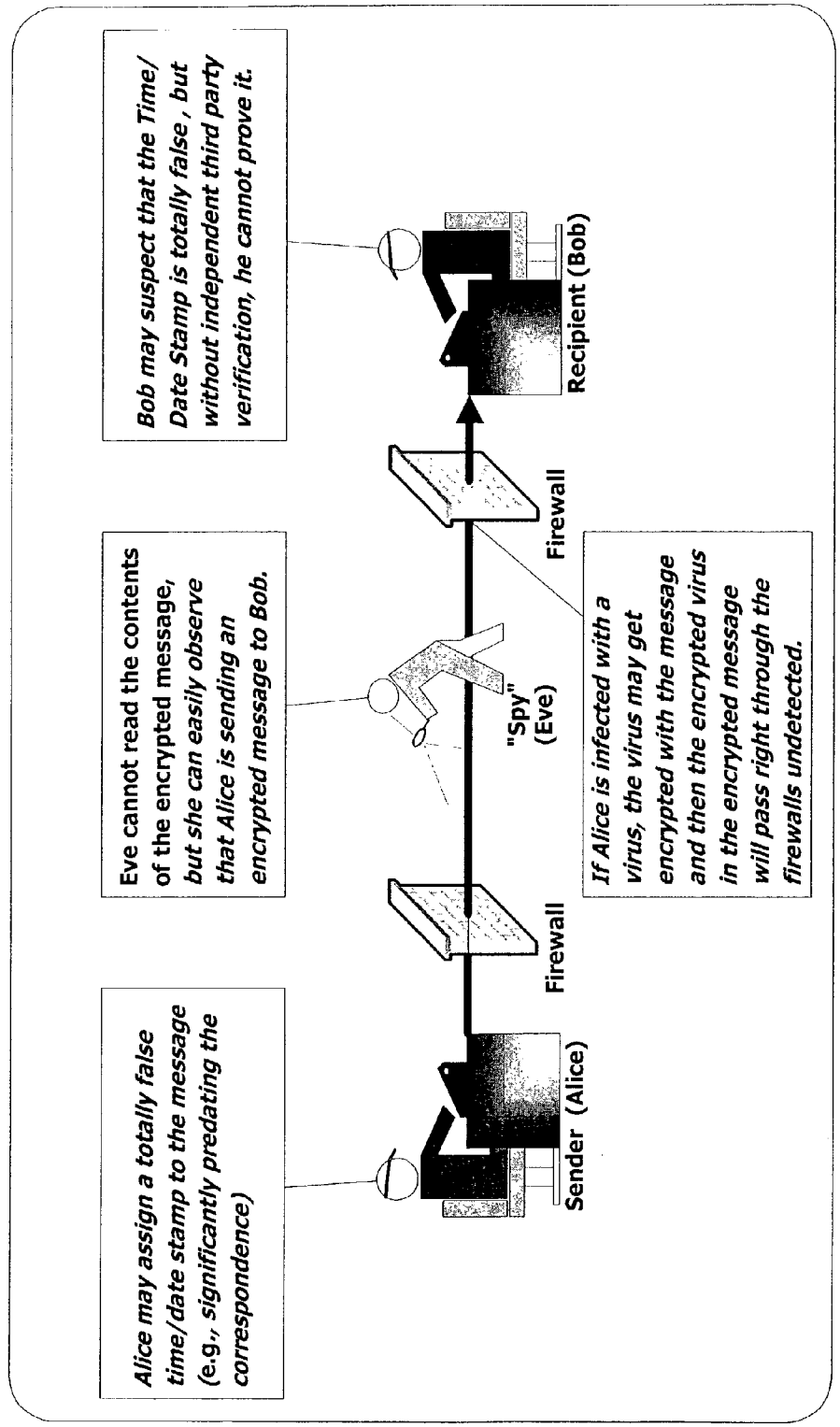
Fig. 13 Point-to-Point Encryption Vulnerabilities

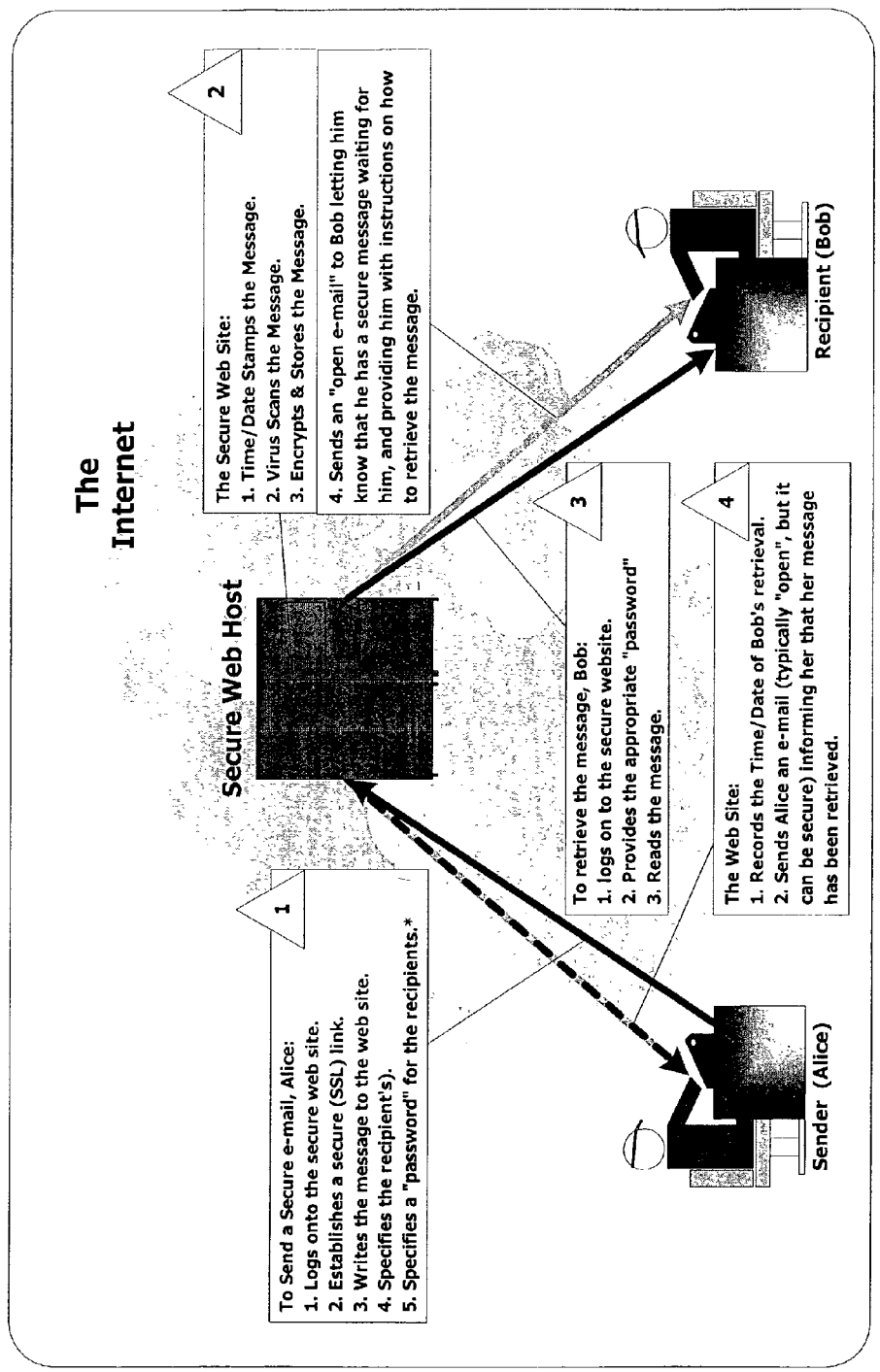
Fig. 14 Web-Based "Secure" e-Mail

Fig. 15 Web-Based e-Mail Vulnerabilities
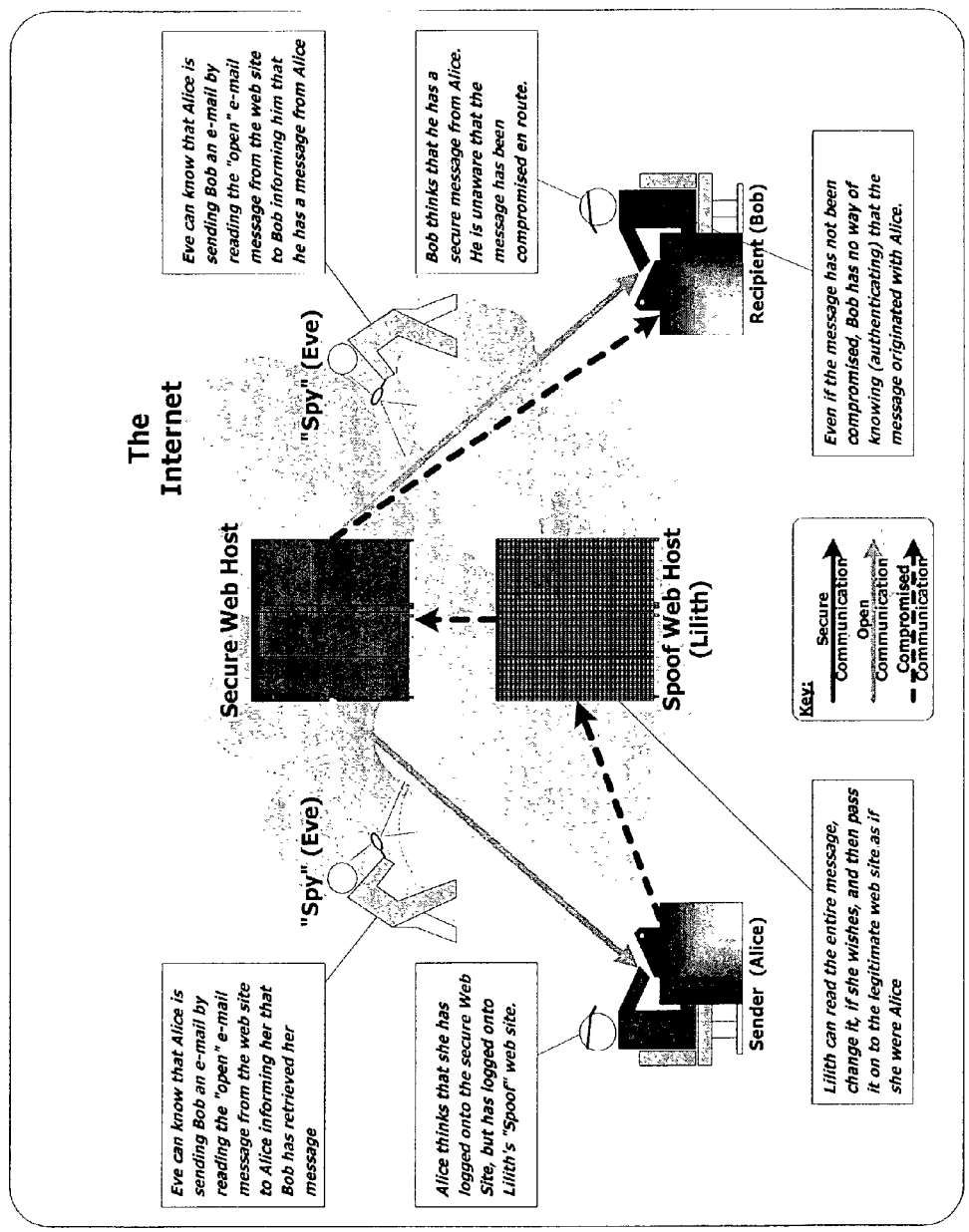

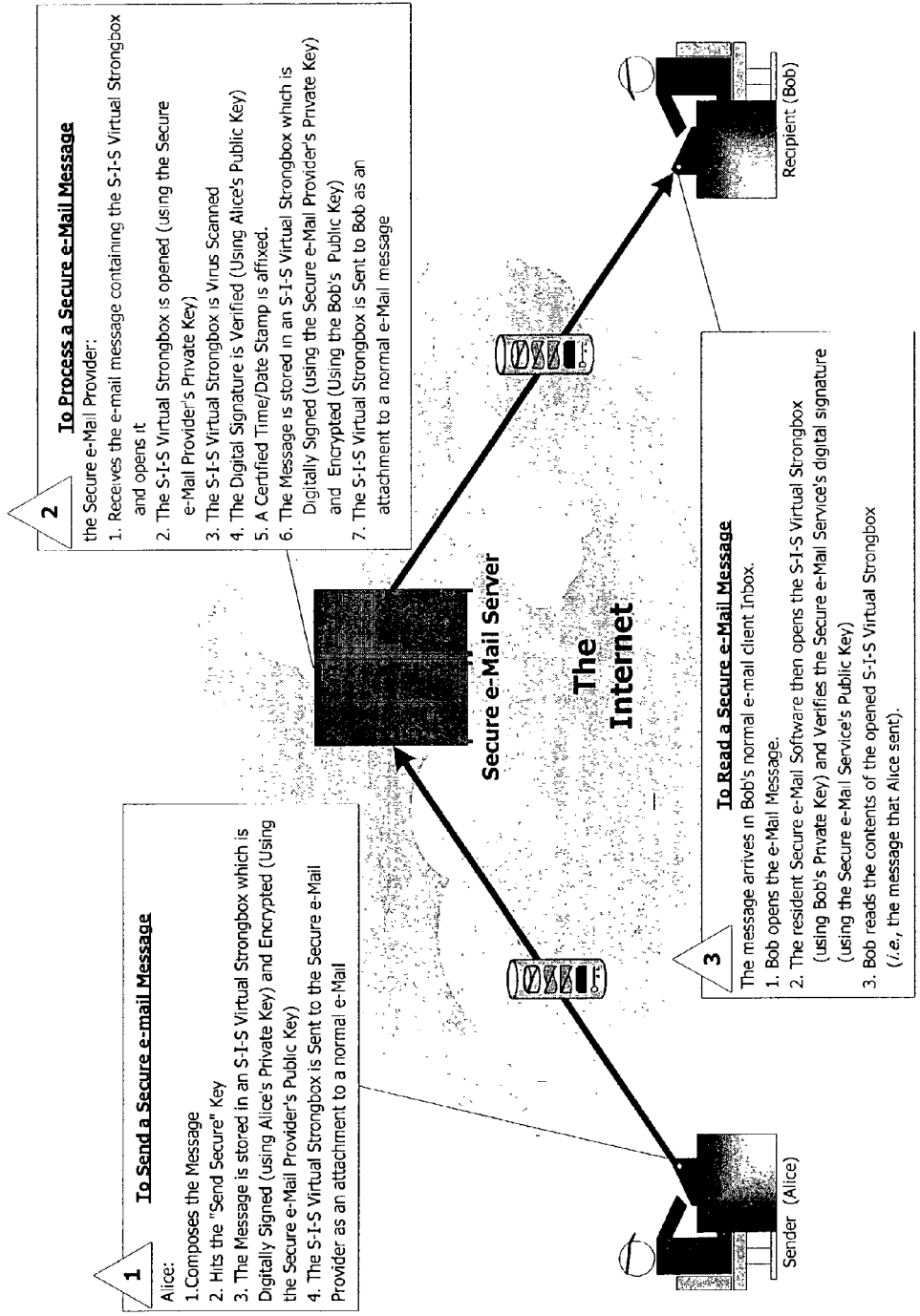
Fig. 16 S-I-S Enabled Secure e-Mail

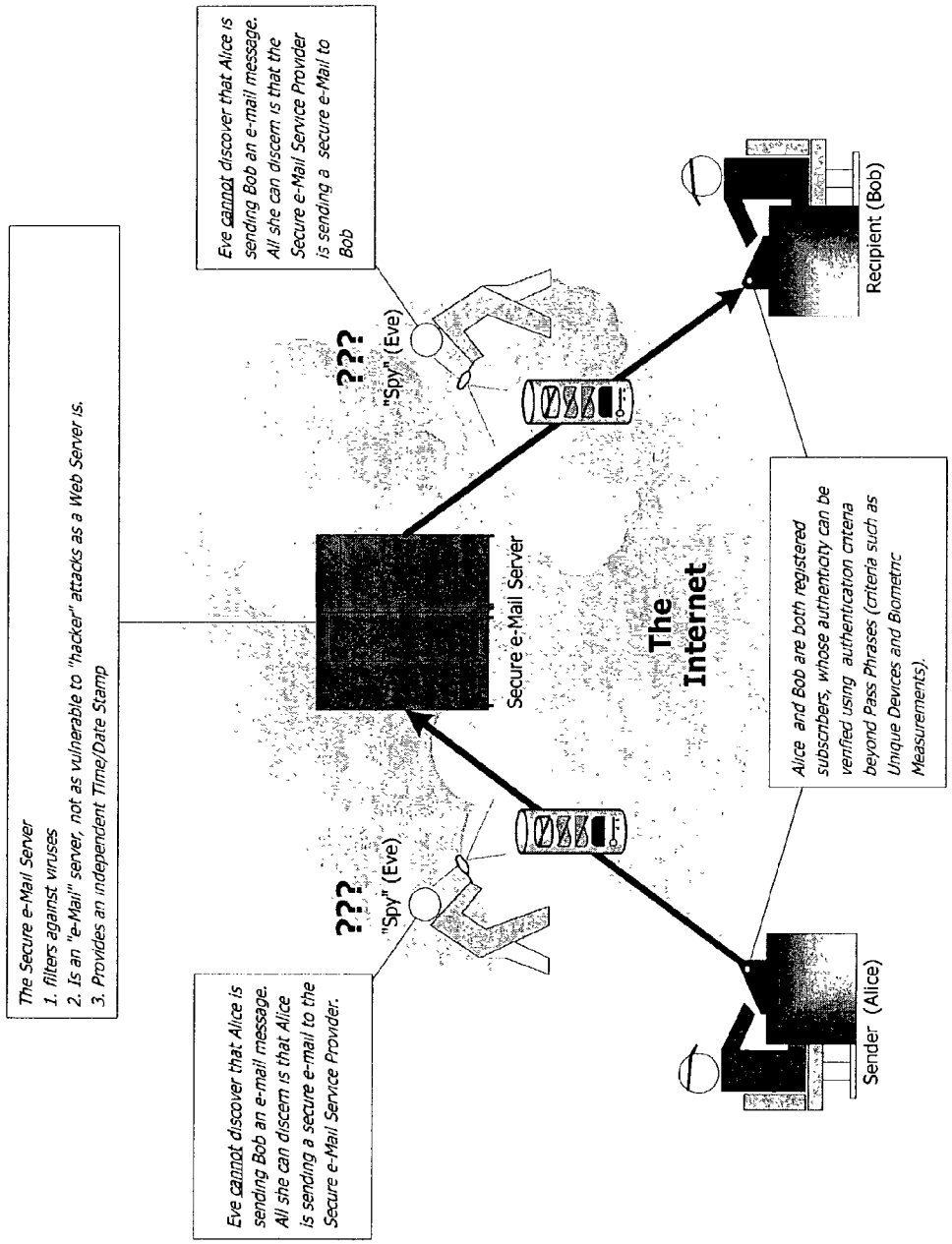
Fig. 17 S-I-S Enabled e-Mail Security

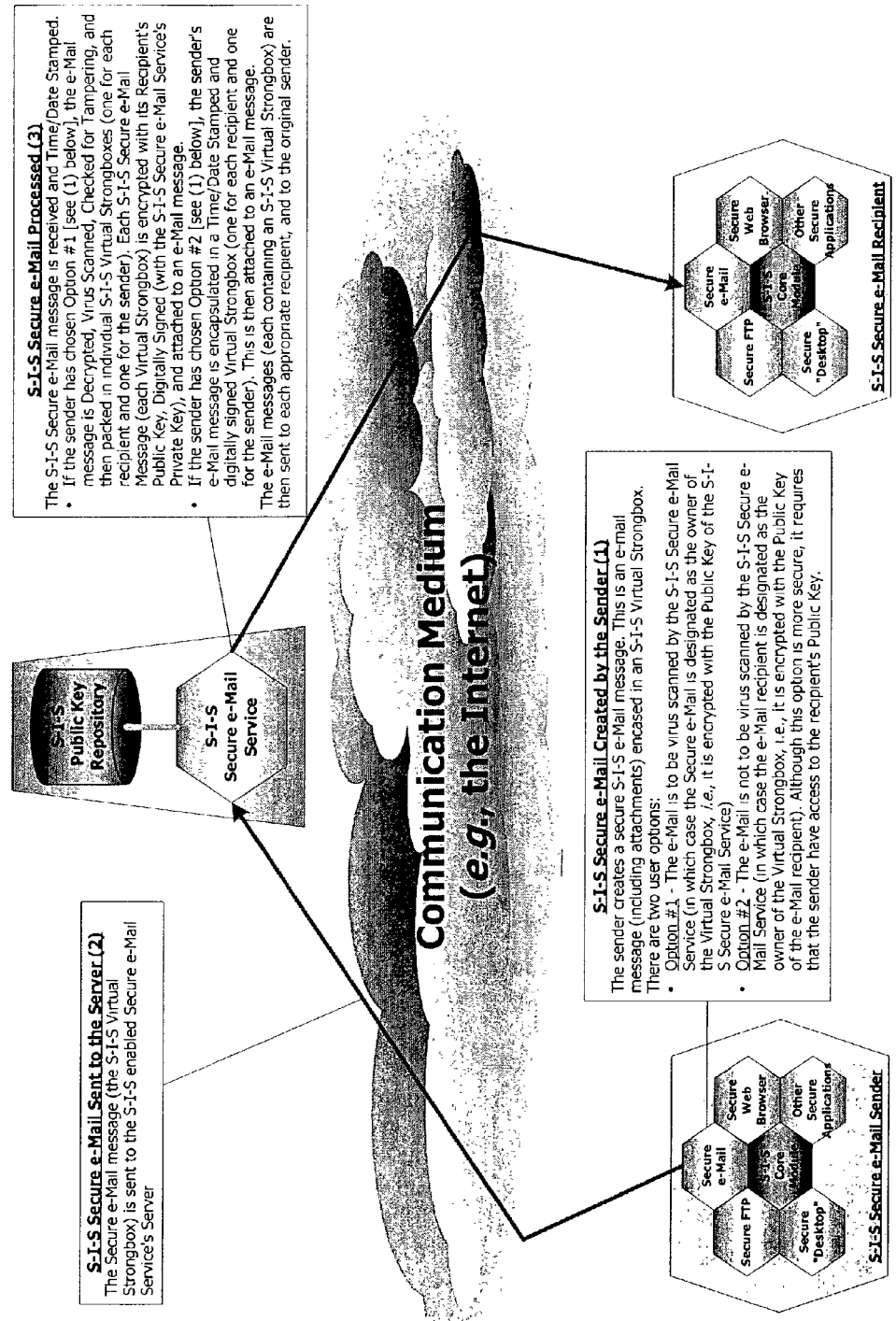
Fig. 18 Secure Client e-Mail System

Fig. 19 Secure ISP e-Mail System
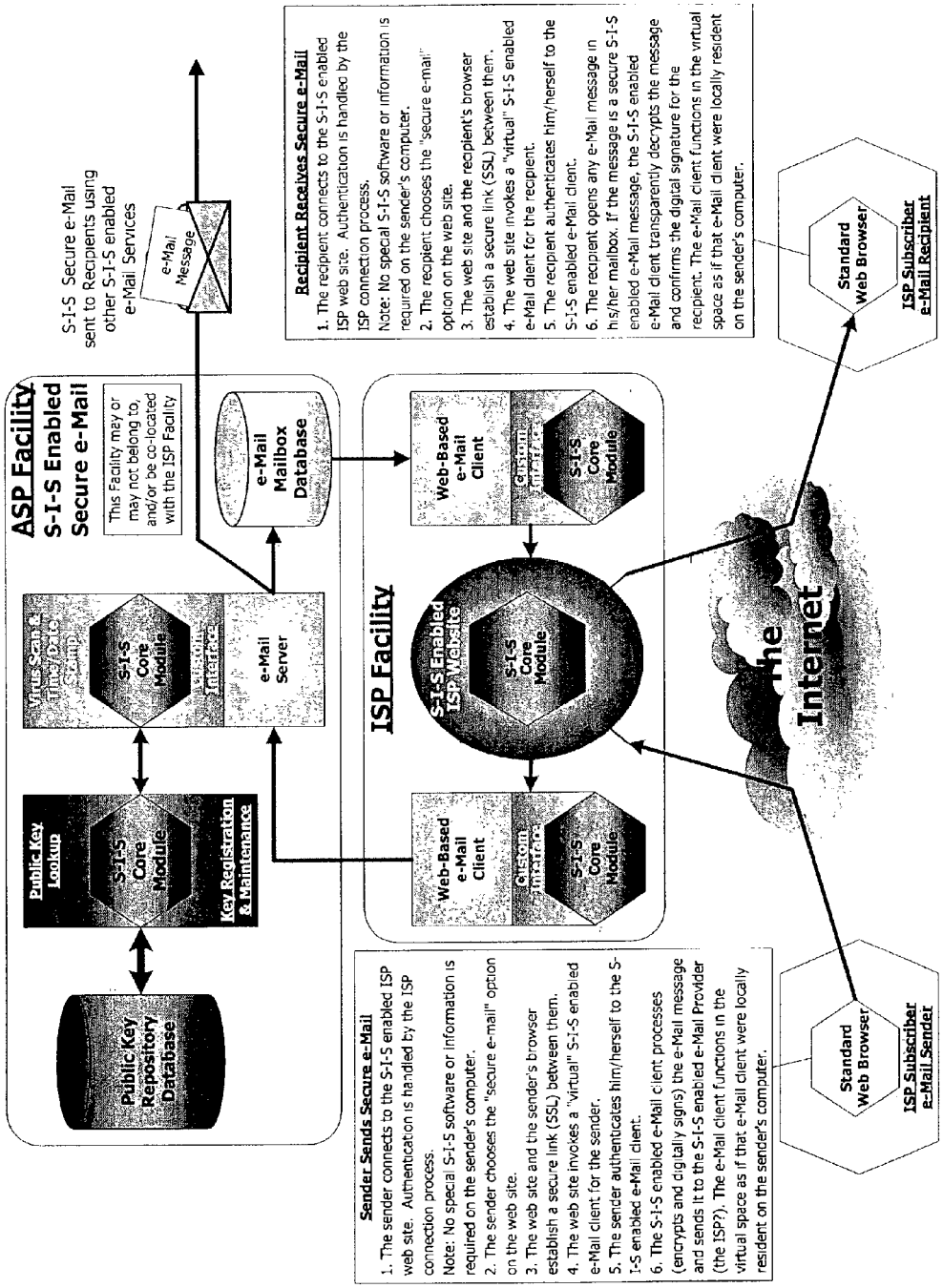

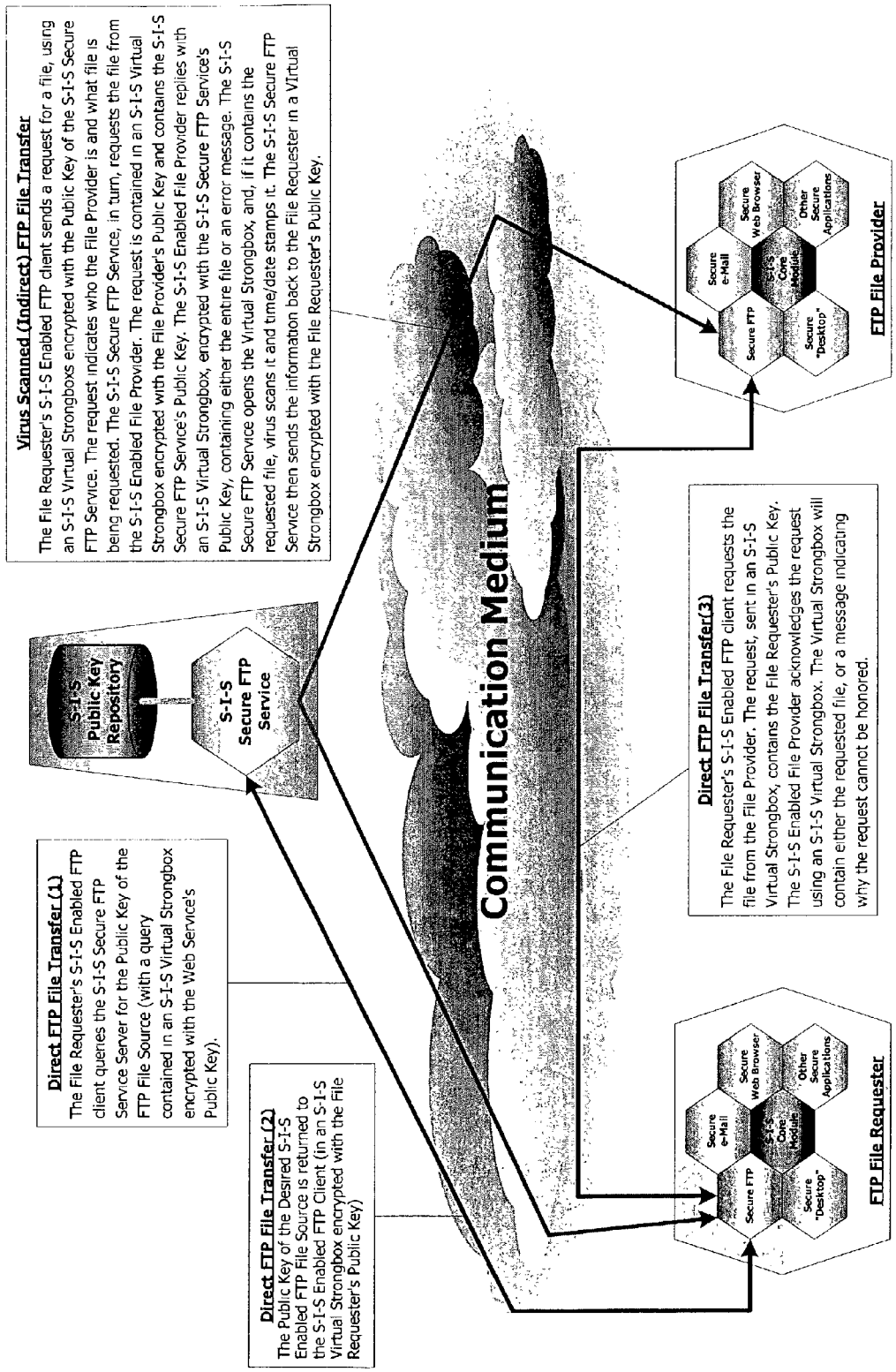
Fig. 20 Secure FTP System

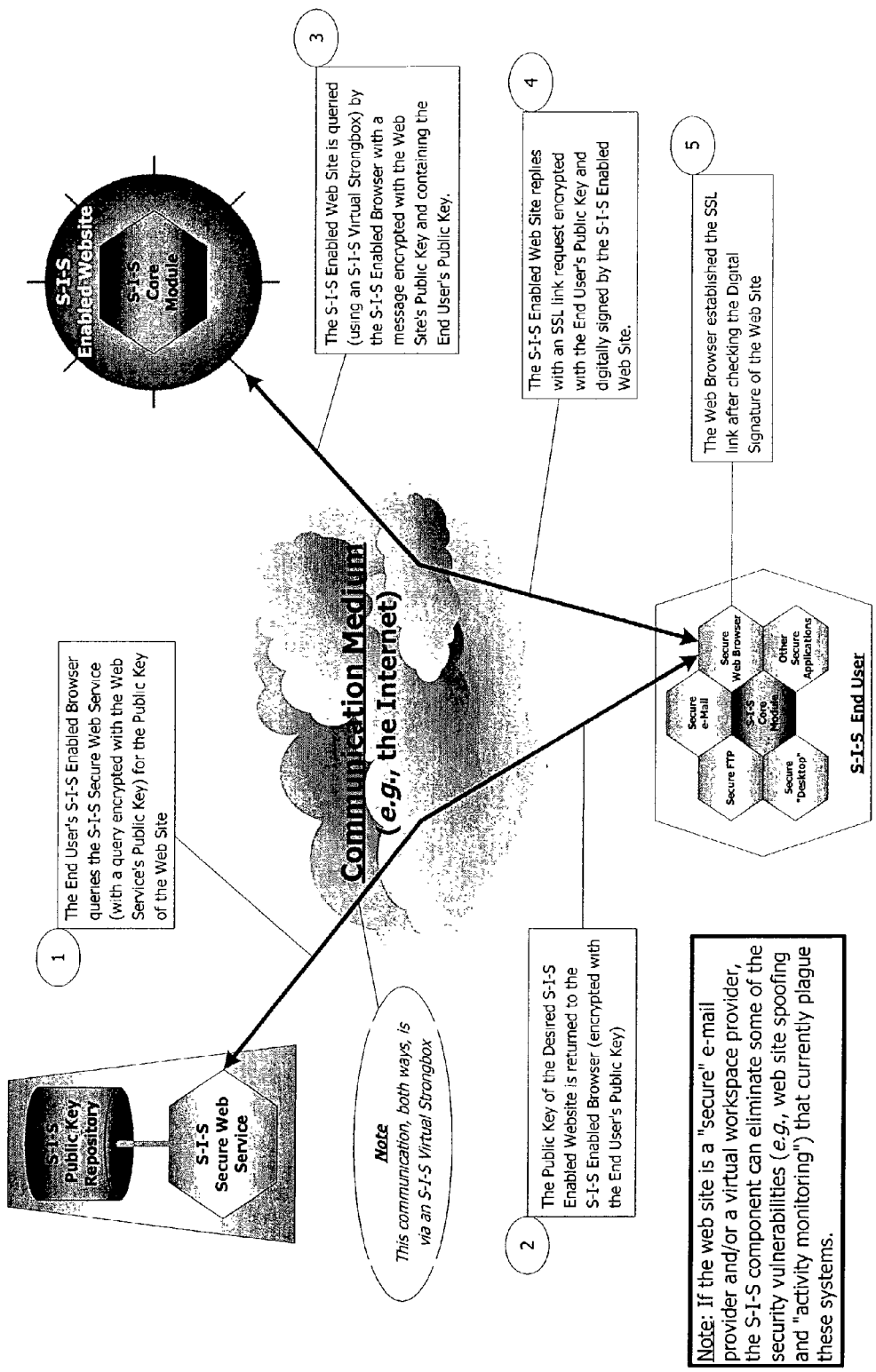
Fig. 21 Secure Web Access

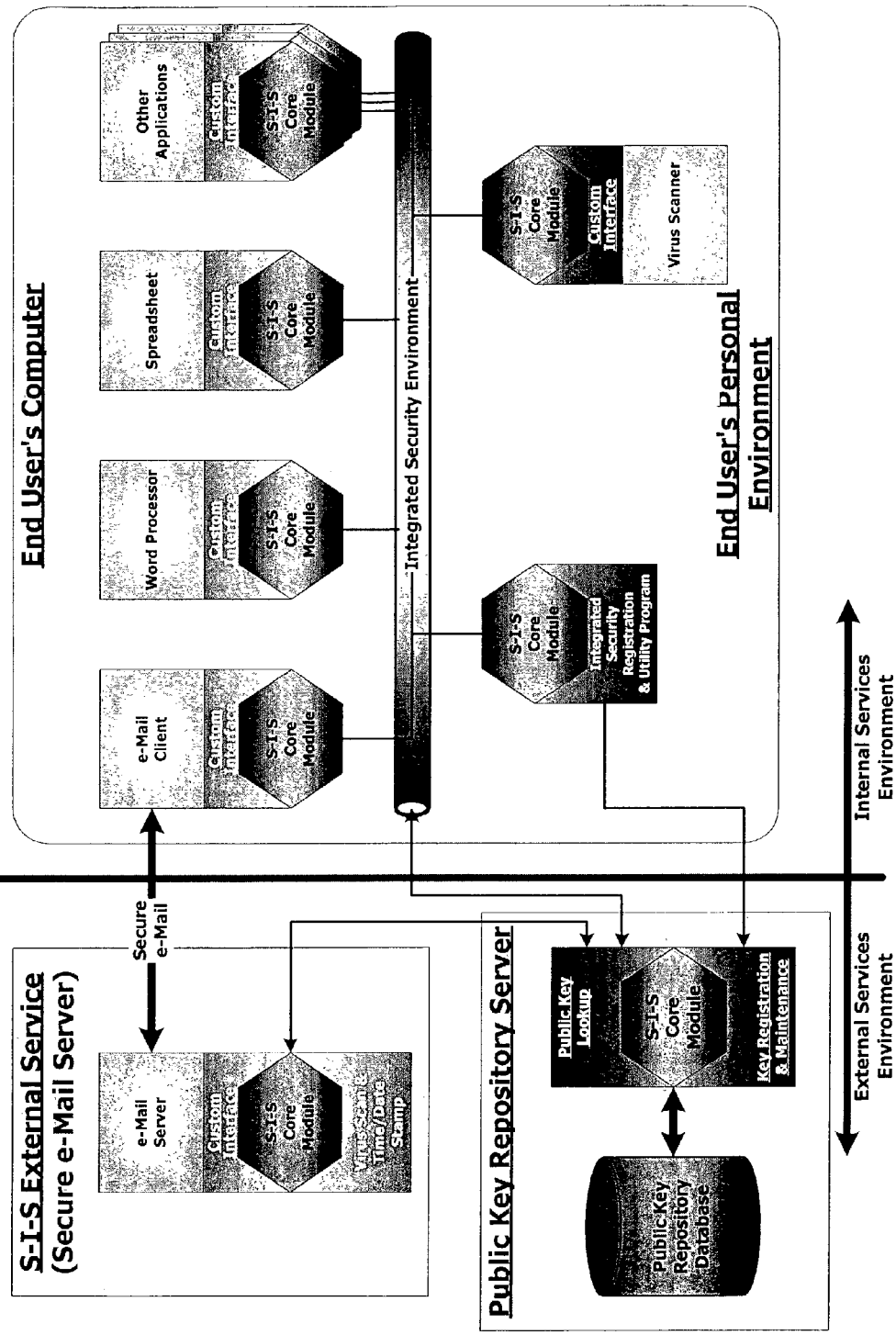
Fig. 22 S-I-S User's Perspective Overview

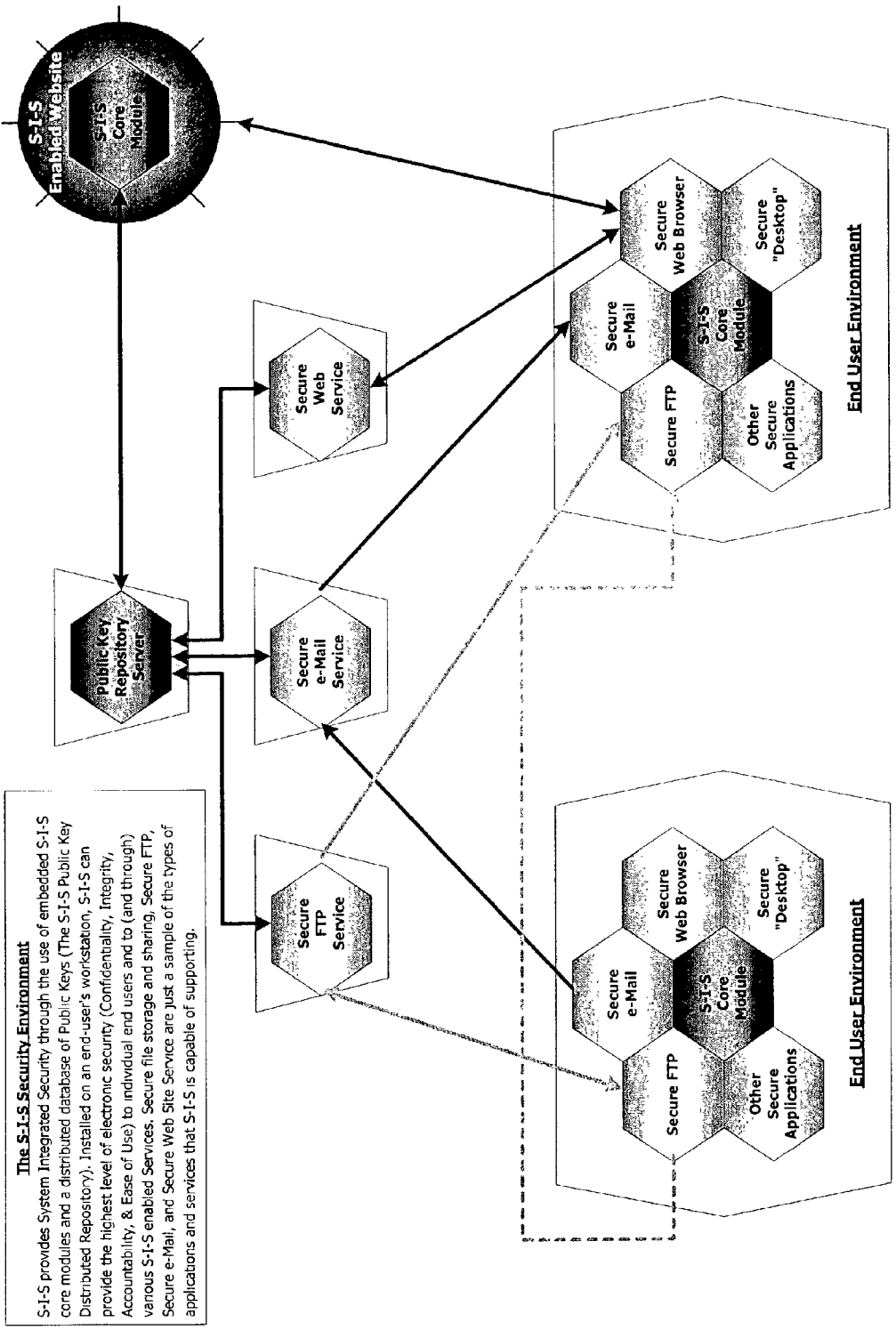
Fig. 23 S-I-S External Services Overview

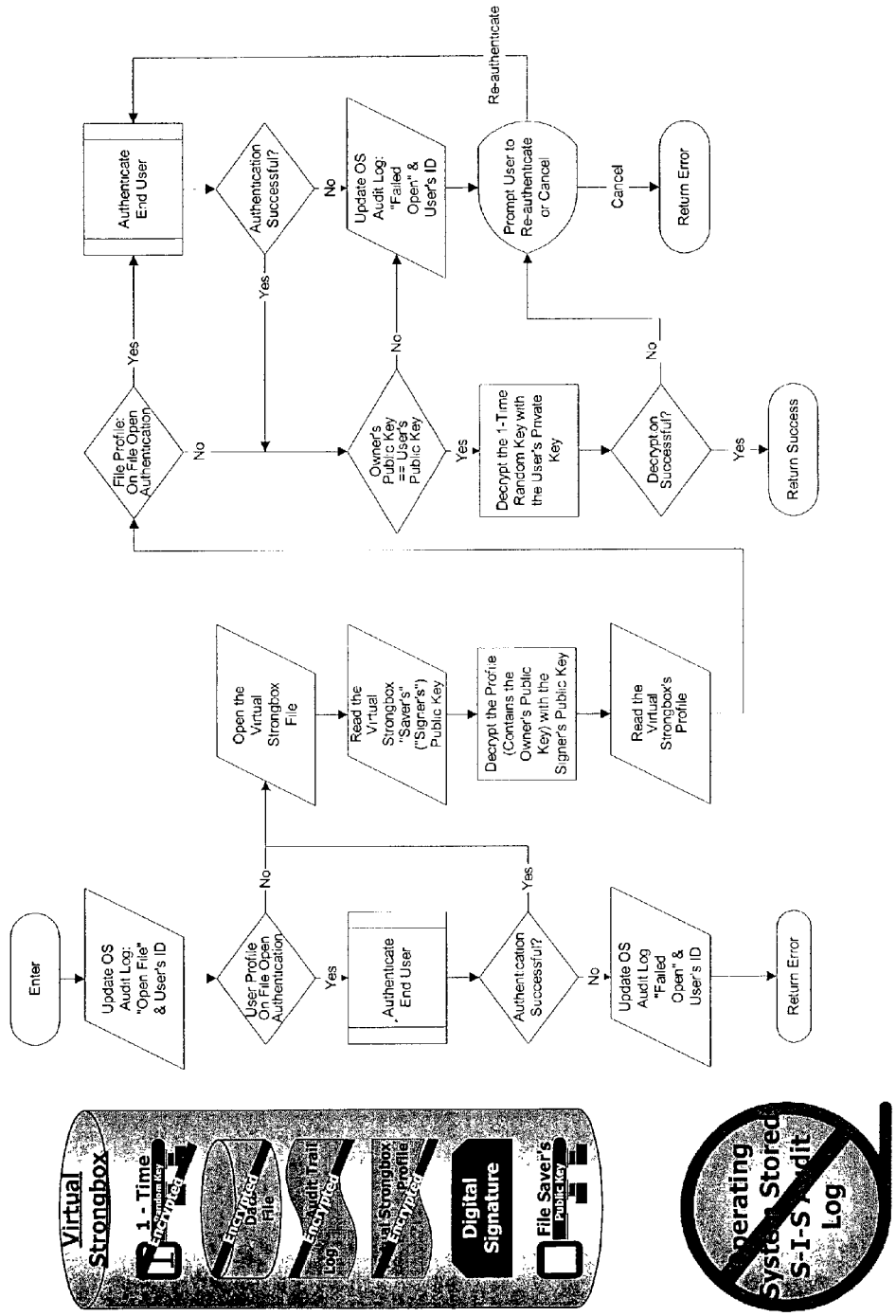
Fig. 24 Virtual Strongbox Open

Fig. 25 Virtual Strongbox Unpack
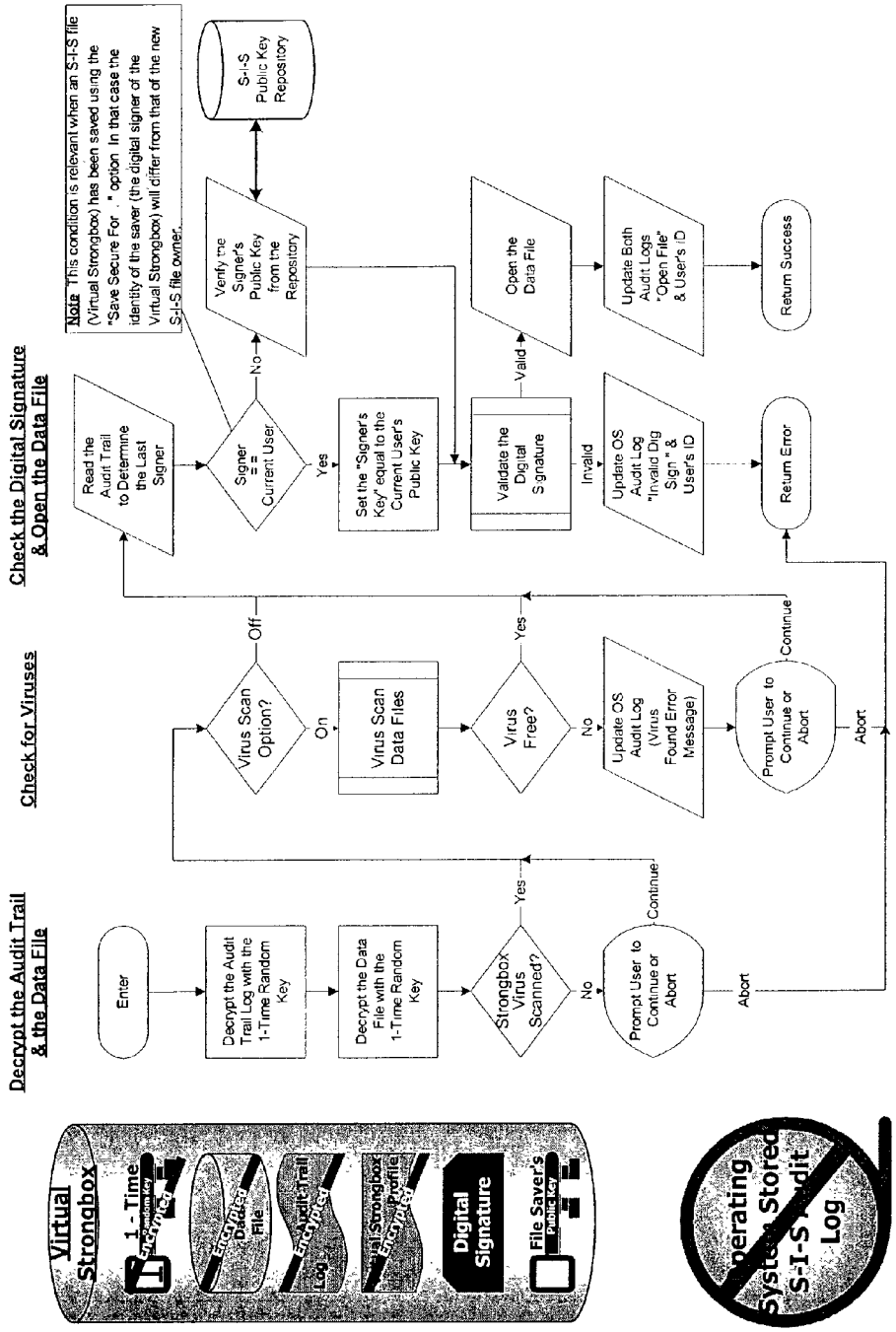
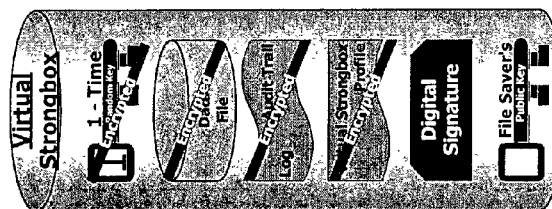

Fig. 26 Virtual Strongbox Save
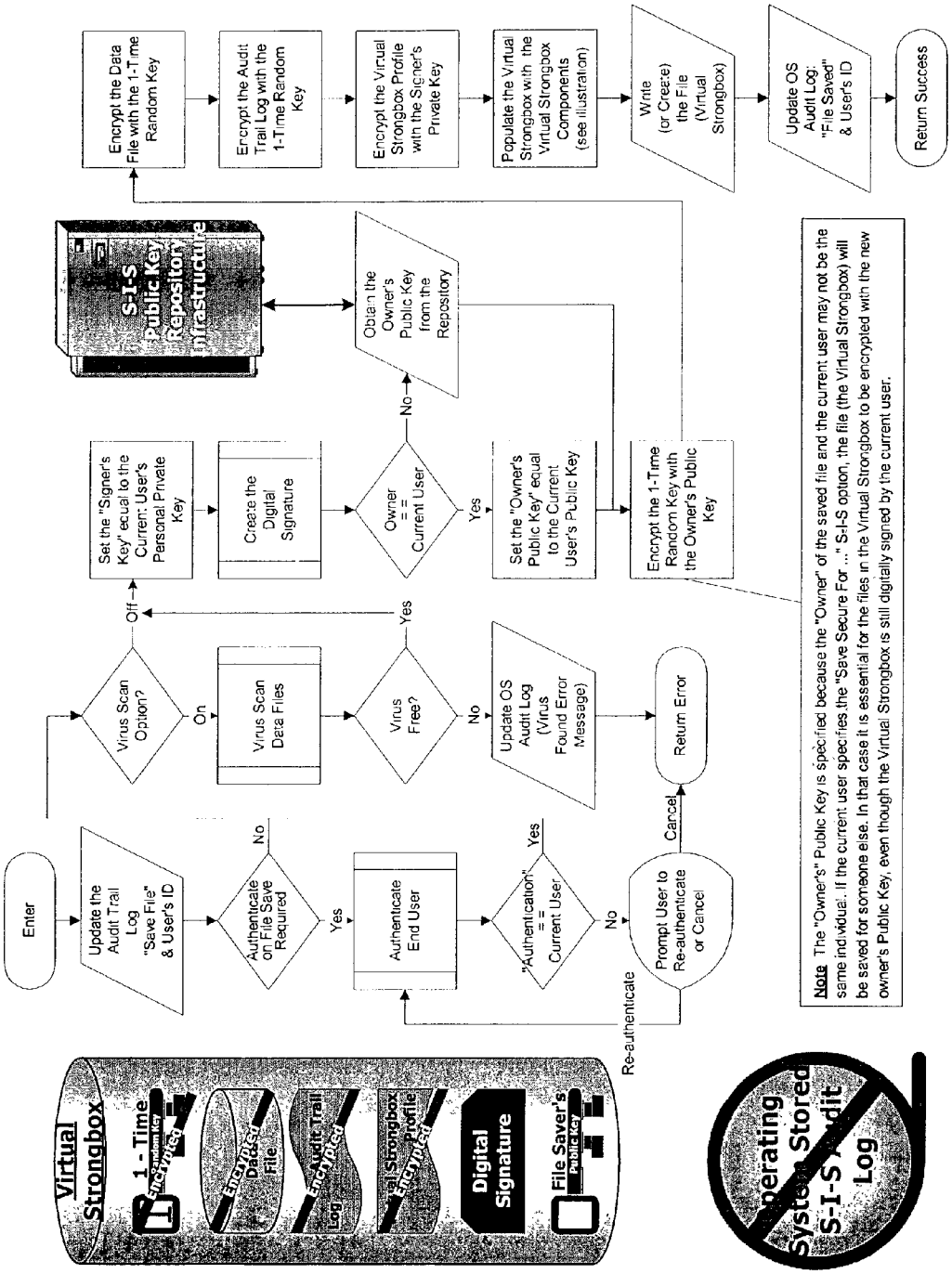

Fig. 27 S-I-S User Authentication
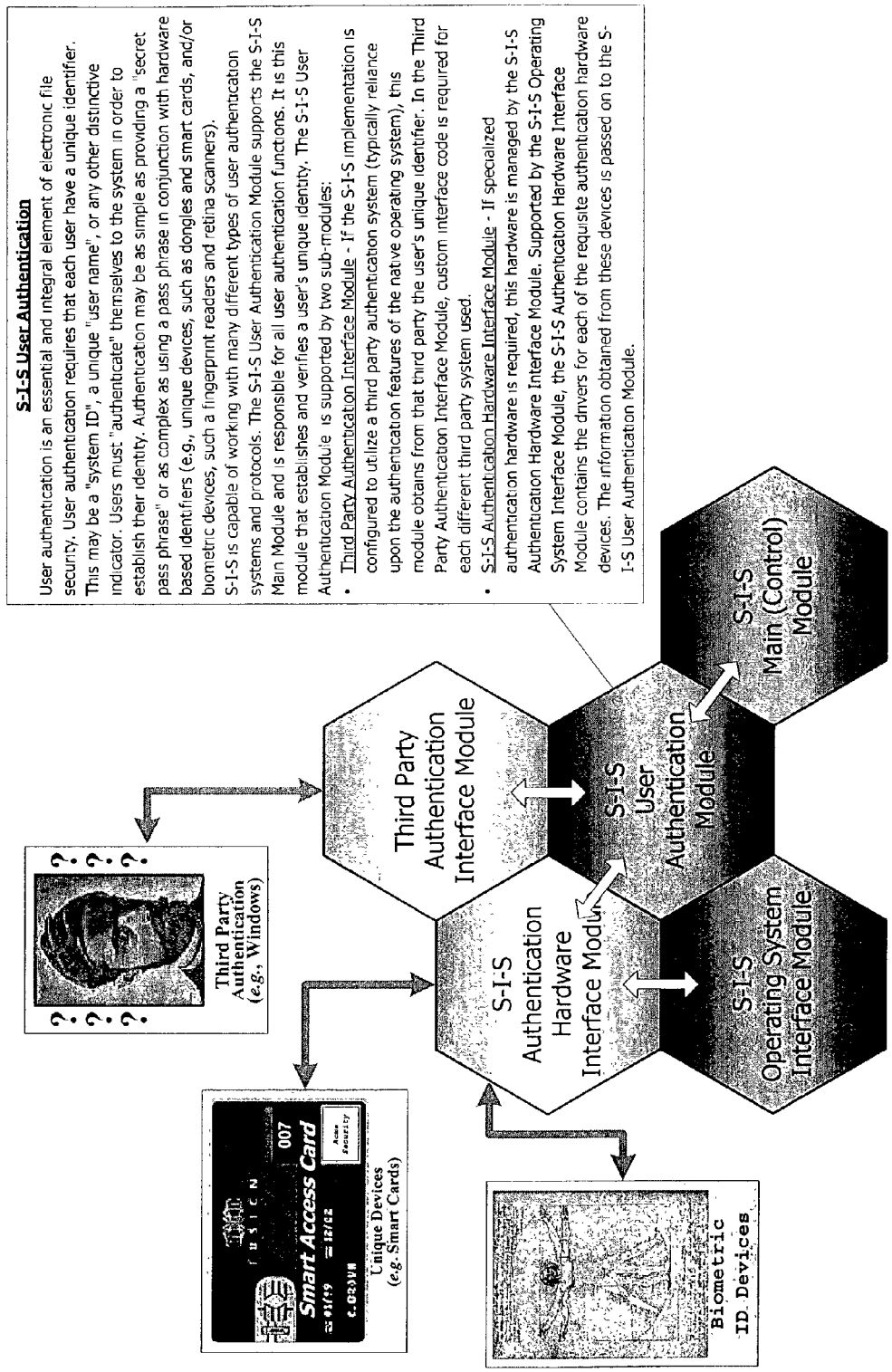

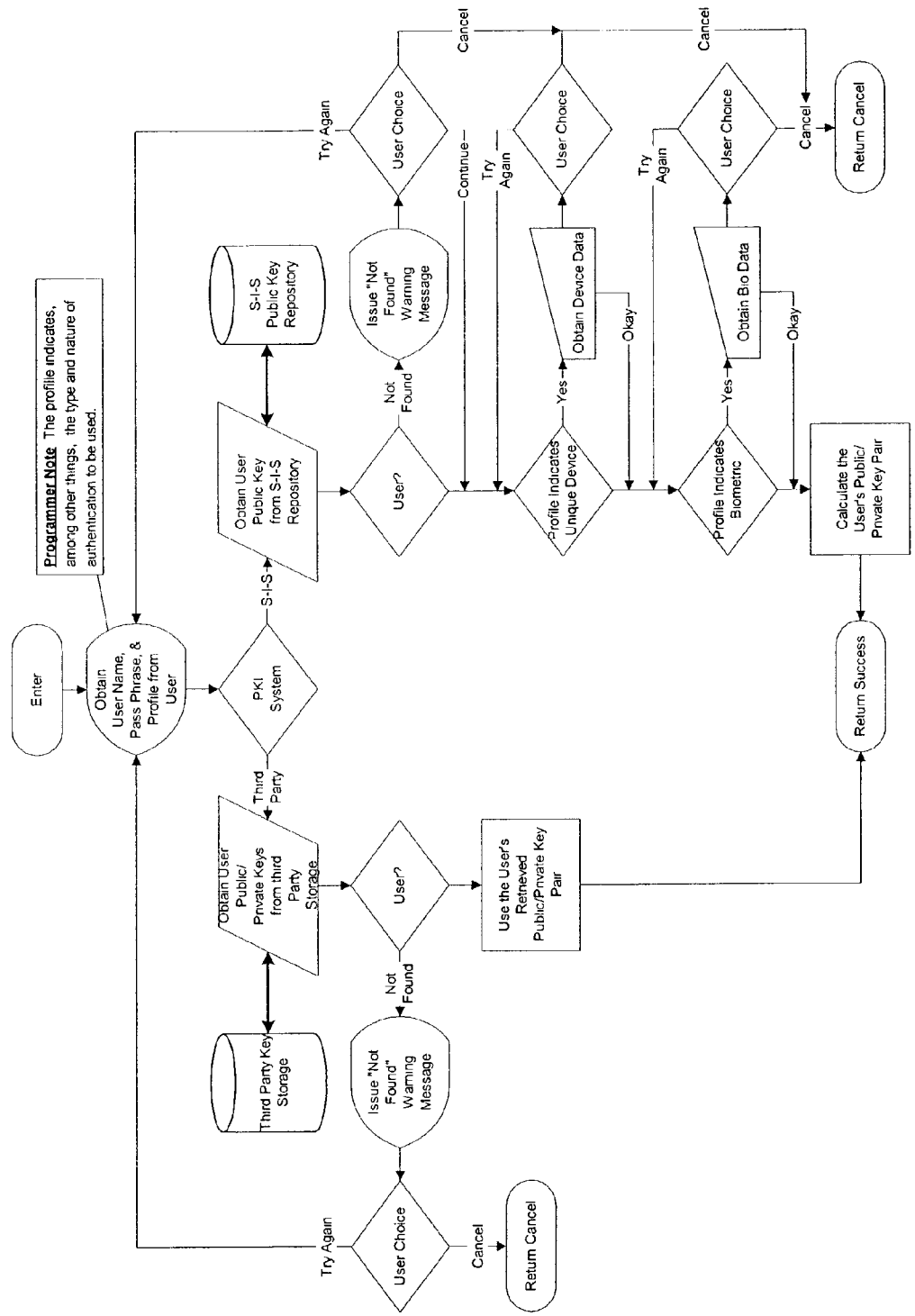
Fig. 28 Authenticate End-User

Fig. 29 User ID & Key Arrays

User ID Arrays

An S-1-S User may utilize concurrent multiple S-1-S identities. At a very basic level, the user must have a unique personal individual identity. He/she may also have one or more group affiliations (group "memberships"). In certain circumstances, a single user may be authorized to assume multiple system identities. And over time, Public/Private key pairs may (and probably should) change. In order to accommodate all of these possible scenarios, the S-1-S process maintains two dynamically allocated "User ID" arrays. One is for individual identities, the other for group affiliations. The base entry (array entry zero) is always the currently used identity. When the S-1-S system discovers that the current entry is not applicable, it searches the arrays for an applicable one. If the search does find a valid identity, it copies that identity into the appropriate base entry. Only if the search does not turn up an applicable identity does the S-1-S system issue a "Not authorized access" message.

Note: The "Not Authorized Access" message can result in one of two outcomes:
- The user chooses to "Re-Authenticate" and successfully supplies the appropriate identity and authentication criteria, or
- The user is denied access to the file (Virtual Strongbox).

Individual Identity Array

| | Public Name | System ID | Public Key | Private Key |
|---|---|---|---|---|
| Current | | | | |
| Temporary 1 | | | | |
| Temporary 2 | | | | |
| Temporary 3 | | | | |
| ... | | | | |
| Temporary n | | | | |

Group Identity Array

| | Public Name | System ID | Public Key | Private Key |
|---|---|---|---|---|
| Current | | | | |
| Temporary 1 | | | | |
| Temporary 2 | | | | |
| Temporary 3 | | | | |
| ... | | | | |
| Temporary n | | | | |

User Key Arrays

At any one time in an S-1-S User's process space, there are five essential keys for each S-1-S file (Virtual Strongbox). These are: The Current User's Public/Private Keys, the File Owner's Public/Private Keys, and the File Signer's Public Key. In many circumstances the Current User, the File Owner, and the File Signer will be one and the same individual. In order, however, for S-1-S to provide its robust functionality, it must accommodate the situation in which all three identities are different.

The Essential S-1-S Keys

| | Public Key | Private Key | Public Name | System ID |
|---|---|---|---|---|
| Current User | | | | |
| File Owner | | | | |
| File Signer | | | | |

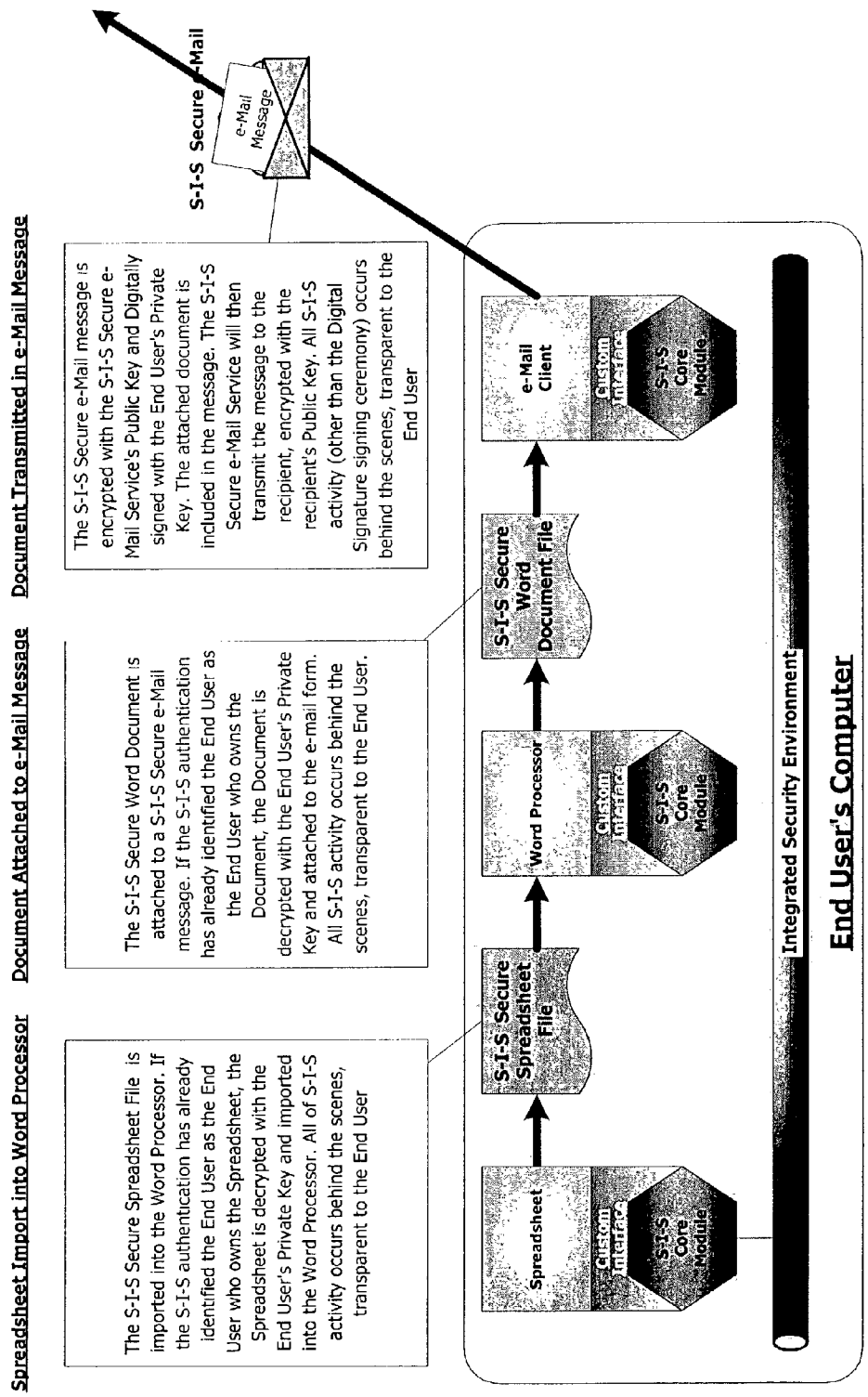
Fig. 30 S-I-S Internal Integration

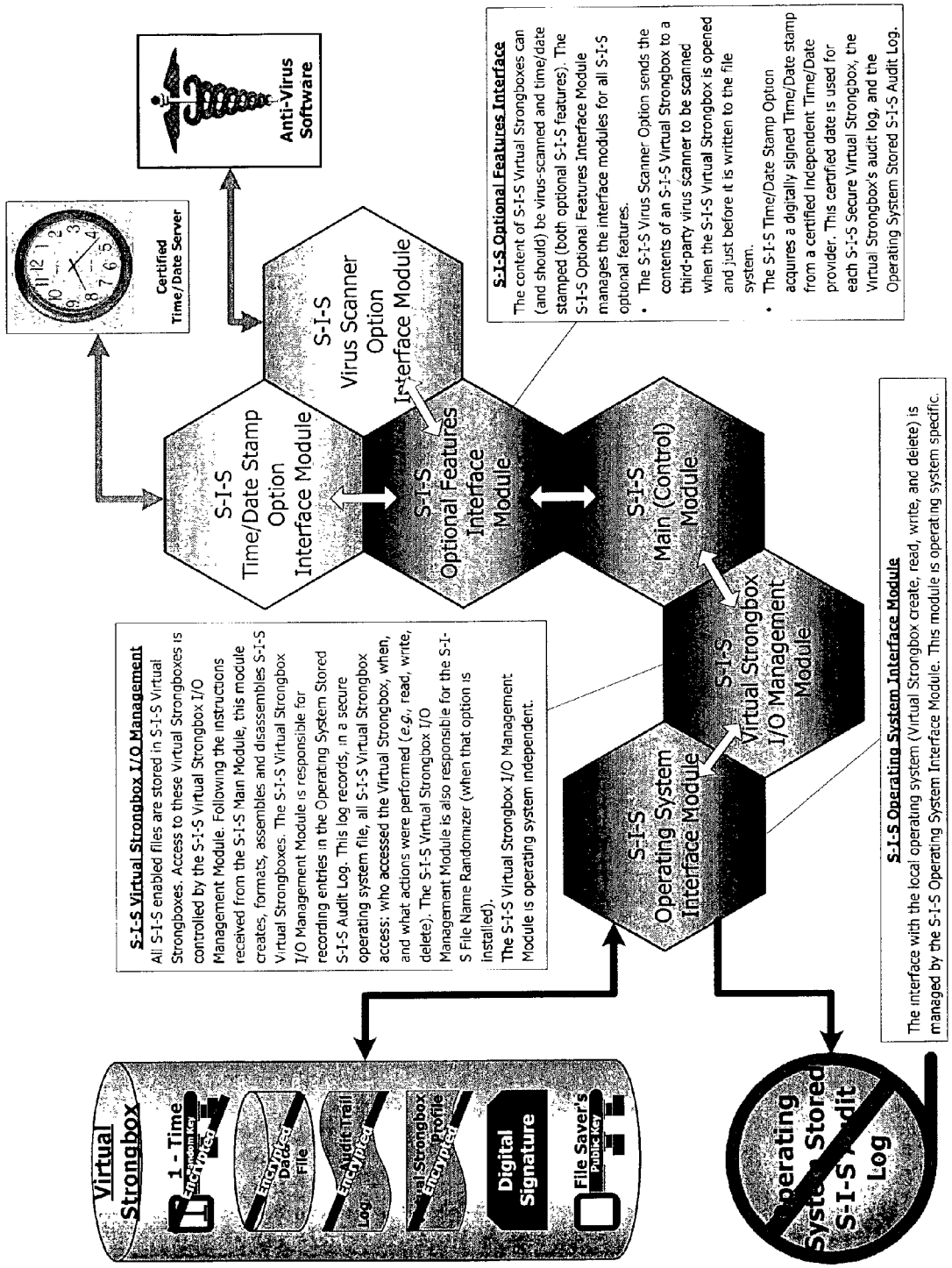
Fig. 31 S-I-S File Processing & I/O

Fig. 32 S-I-S Invocation
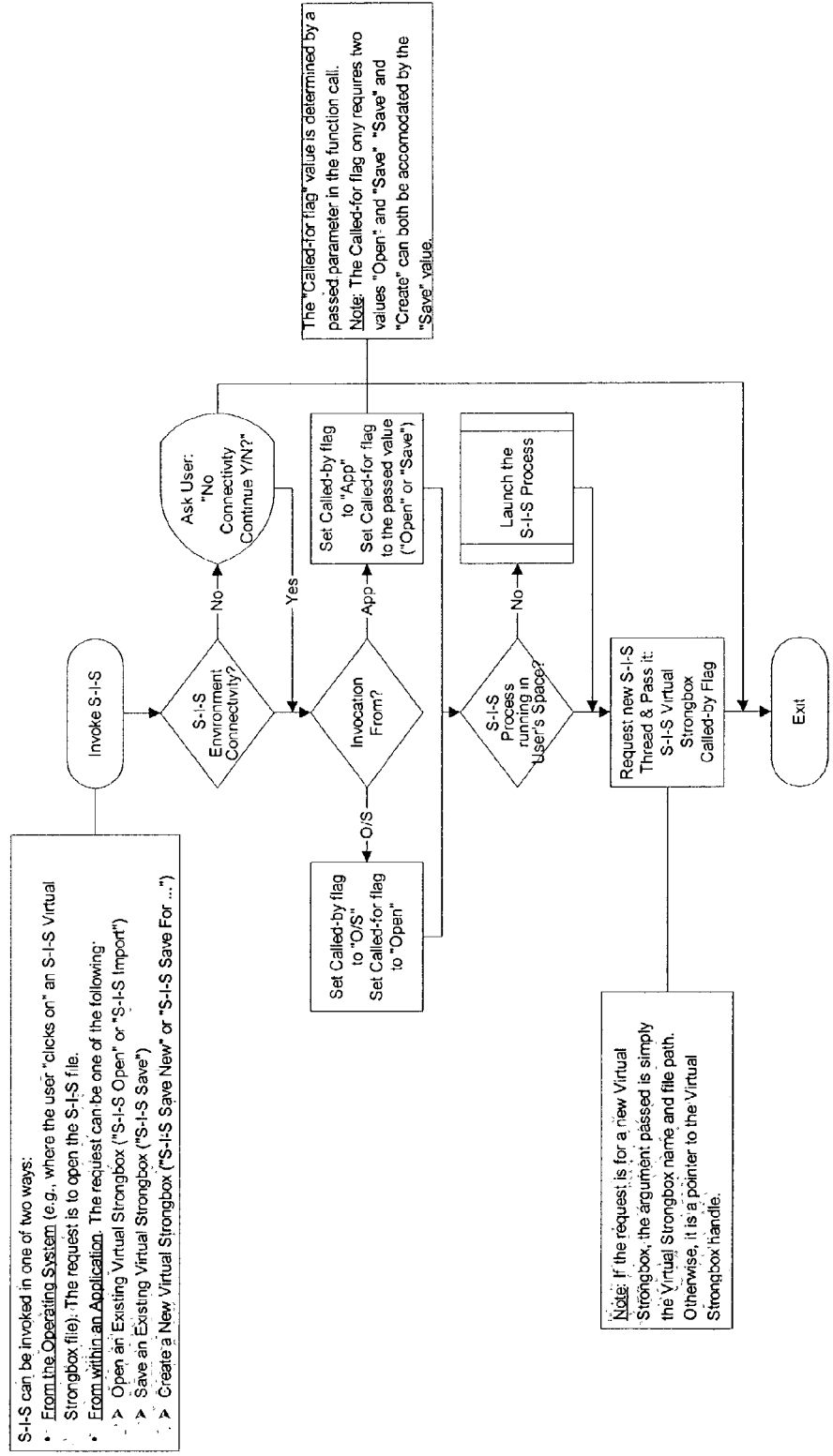

Fig. 33a Launch the S-I-S Process
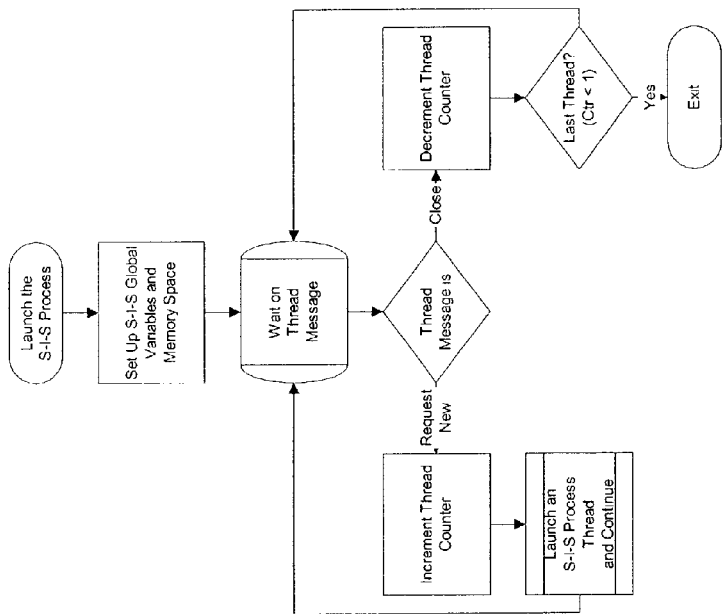

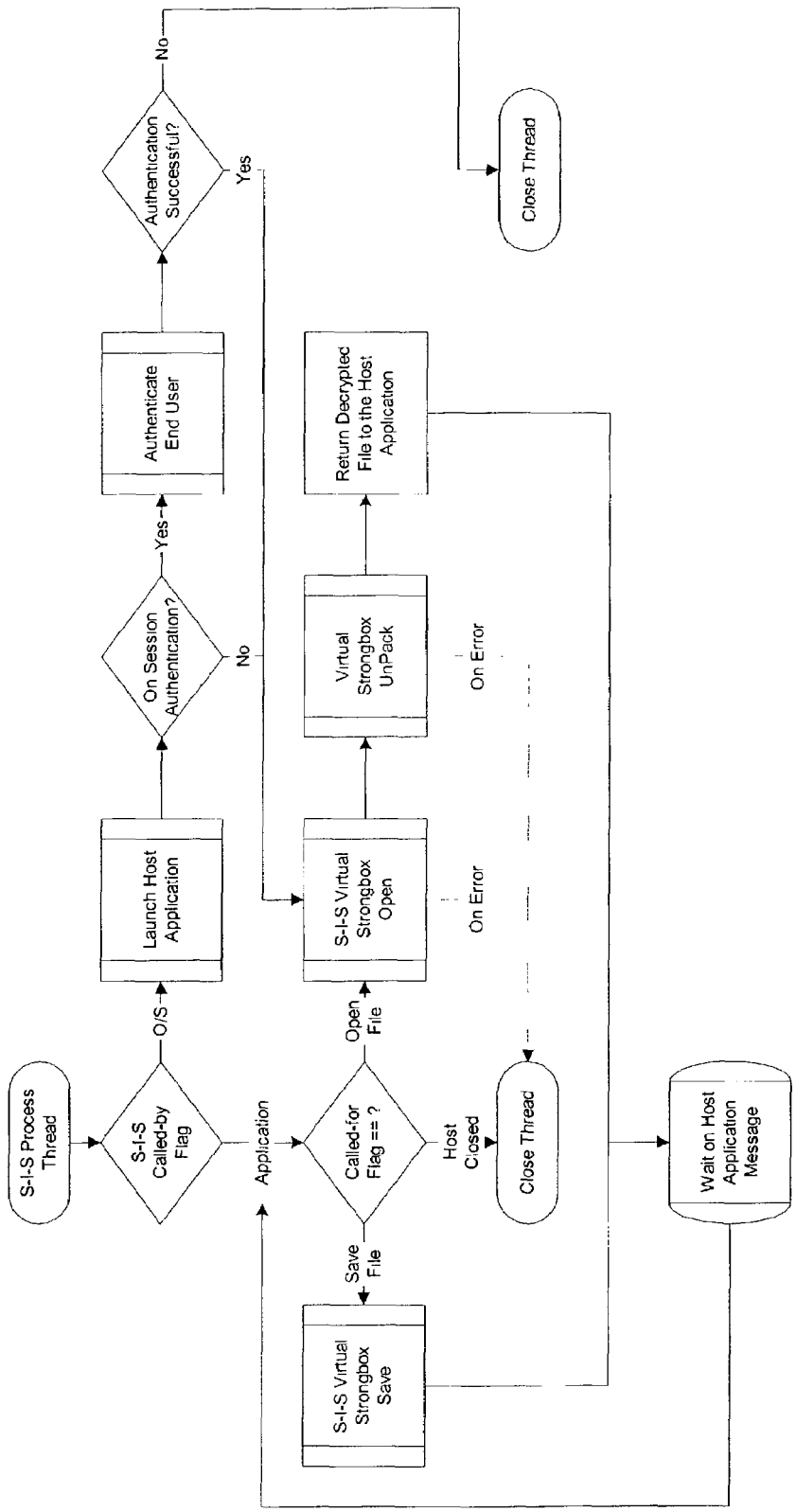
Fig. 33b Launch S-I-S Thread

Fig. 34 S-I-S Main Module Functions

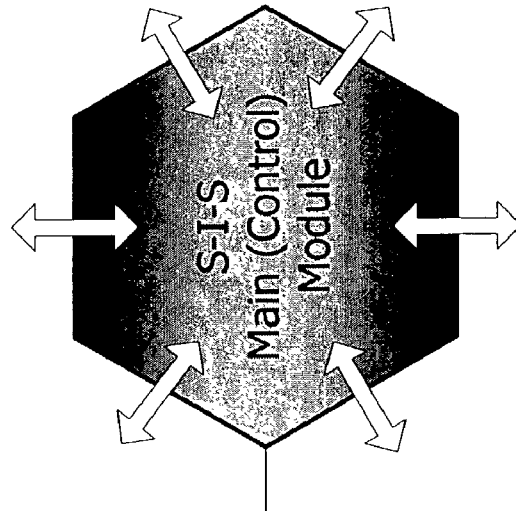

The S-I-S Main (Control) Module

The S-I-S Main Module controls all of the S-I-S Process' functions. These functions must include:

- End User Authentication (Accountability)
- File Encryption/Decryption (Confidentiality)
- Digital Signature Creation and Verification (Integrity & Accountability)
- Audit Trail (Log) Creation and Maintenance (Accountability)
- File I/O (Creation, Reading, & Writing of the S-I-S Virtual Strongbox)
- S-I-S Support Infrastructure Interface
- Integration with the host application interface (not illustrated here)

And may include:

- Time/Date Stamp Creation and Verification (Integrity & Accountability)
- Virus Scanning (Integrity)

In addition, the S-I-S Main Module contains all of the logic that integrates these component functions into a unified and integral whole; the heart of true System Integrated Security.

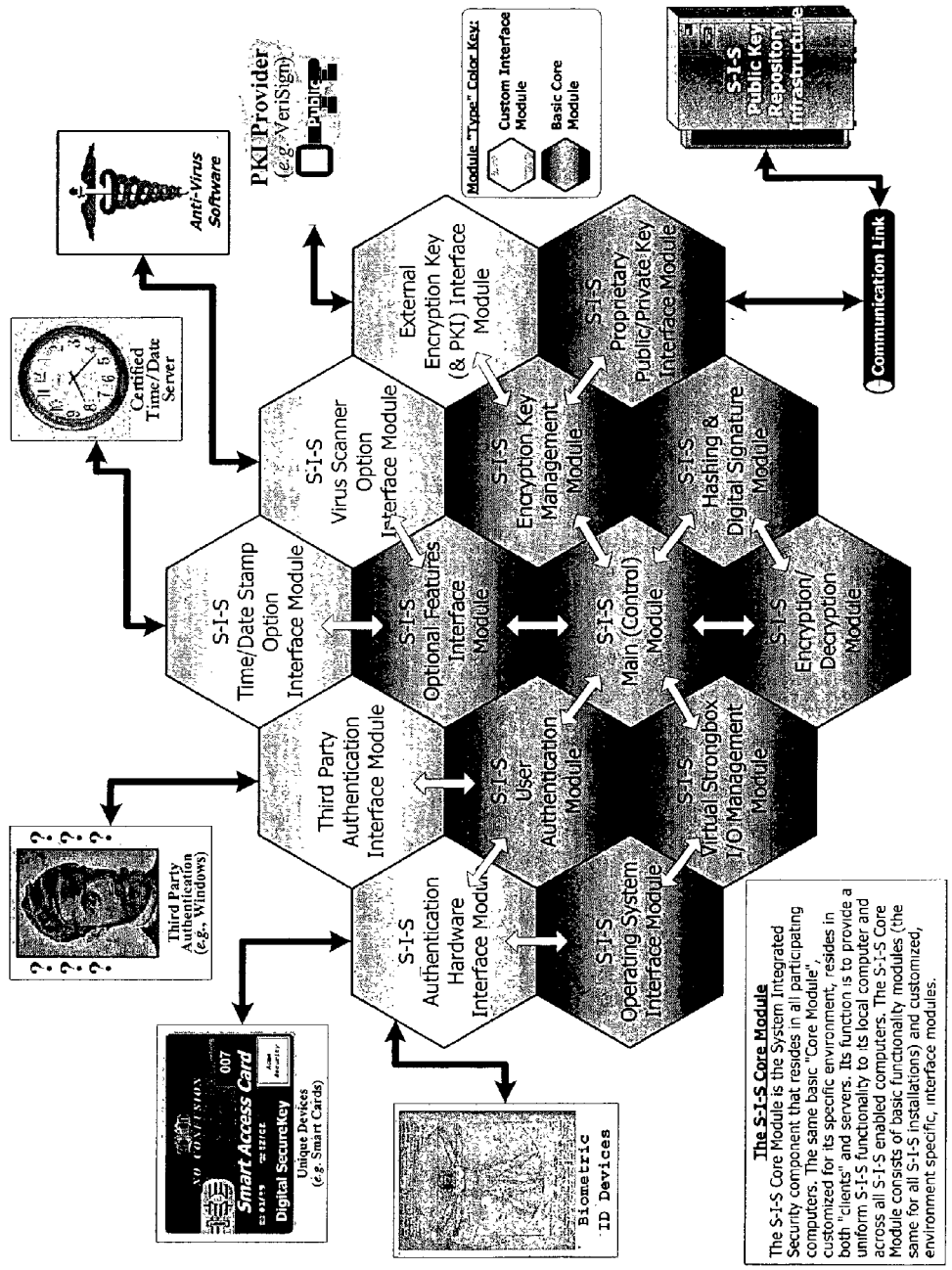
Fig. 35 S-I-S Core Module Components

Fig. 36 S-I-S Encryption & Digital Signature Modules

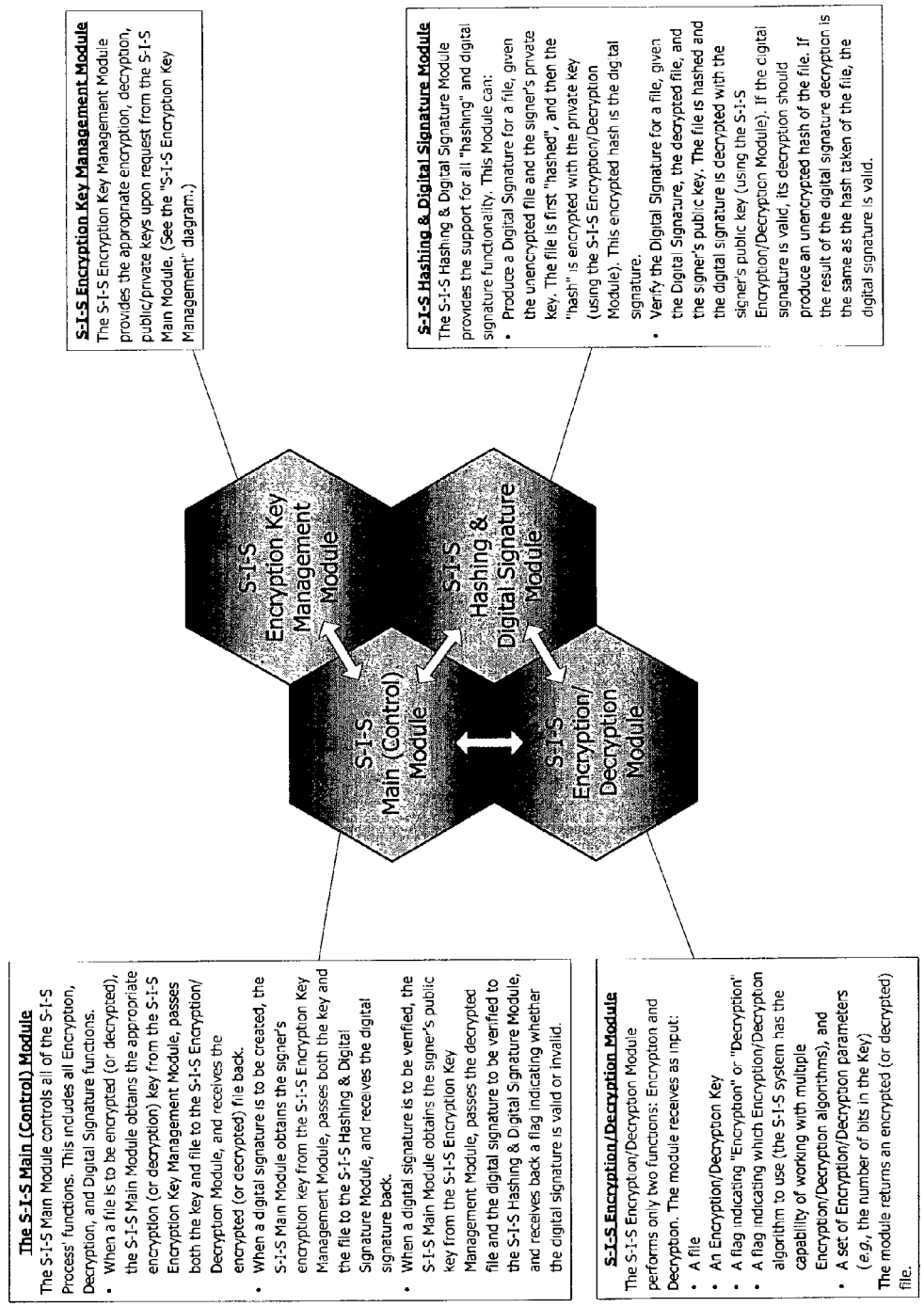

The S-I-S Main (Control) Module
The S-I-S Main Module controls all of the S-I-S Process' functions. This includes all Encryption, Decryption, and Digital Signature functions.
- When a file is to be encrypted (or decrypted), the S-I-S Main Module obtains the appropriate encryption (or decryption) key from the S-I-S Encryption Key Management Module, passes both the key and file to the S-I-S Encryption/Decryption Module, and receives the encrypted (or decrypted) file back.
- When a digital signature is to be created, the S-I-S Main Module obtains the signer's encryption key from the S-I-S Encryption Key Management Module, passes both the key and the file to the S-I-S Hashing & Digital Signature Module, and receives the digital signature back.
- When a digital signature is to be verified, the S-I-S Main Module obtains the signer's public key from the S-I-S Encryption Key Management Module, passes the decrypted file and the digital signature to be verified to the S-I-S Hashing & Digital Signature Module, and receives back a flag indicating whether the digital signature is valid or invalid.

S-I-S Encryption/Decryption Module
The S-I-S Encryption/Decryption Module performs only two functions: Encryption and Decryption. The module receives as input:
- A file
- An Encryption/Decryption Key
- A flag indicating "Encryption" or "Decryption"
- A flag indicating which Encryption/Decryption algorithm to use (the S-I-S system has the capability of working with multiple Encryption/Decryption algorithms), and
- A set of Encryption/Decryption parameters (e.g., the number of bits in the Key)

The module returns an encrypted (or decrypted) file.

S-I-S Encryption Key Management Module
The S-I-S Encryption Key Management Module provides the appropriate encryption, decryption, public/private keys upon request from the S-I-S Main Module. (See the "S-I-S Encryption Key Management" diagram.)

S-I-S Hashing & Digital Signature Module
The S-I-S Hashing & Digital Signature Module provides the support for all "hashing" and digital signature functionality. This Module can:
- Produce a Digital Signature for a file, given the unencrypted file and the signer's private key. The file is first "hashed", and then the "hash" is encrypted with the private key (using the S-I-S Encryption/Decryption Module). This encrypted hash is the digital signature.
- Verify the Digital Signature for a file, given the Digital Signature, the decrypted file, and the signer's public key. The file is hashed and the digital signature is decrypted with the signer's public key (using the S-I-S Encryption/Decryption Module). If the digital signature is valid, its decryption should produce an unencrypted hash of the file. If the result of the digital signature decryption is the same as the hash taken of the file, the digital signature is valid.

Fig. 37 S-I-S Encryption Key Management
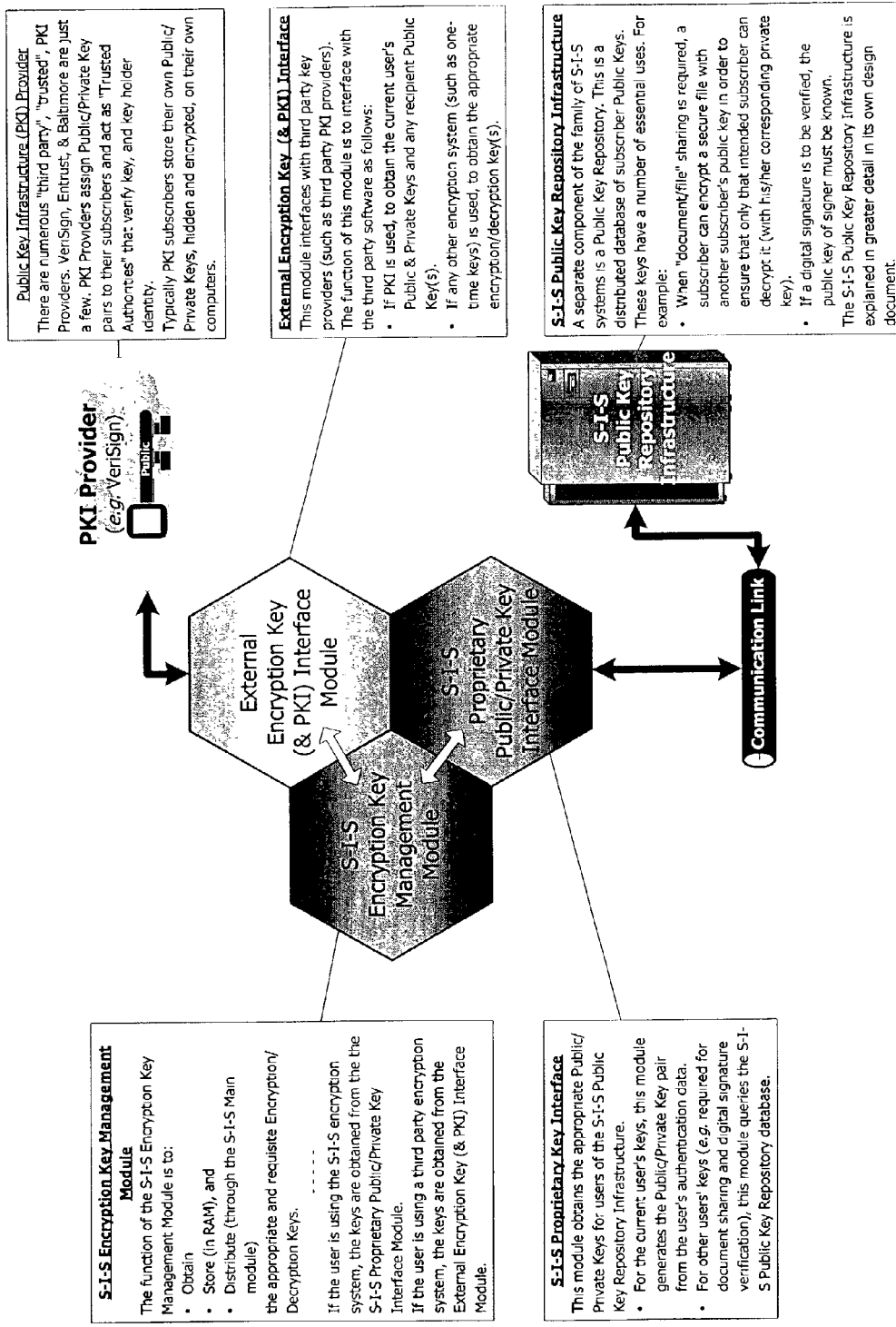

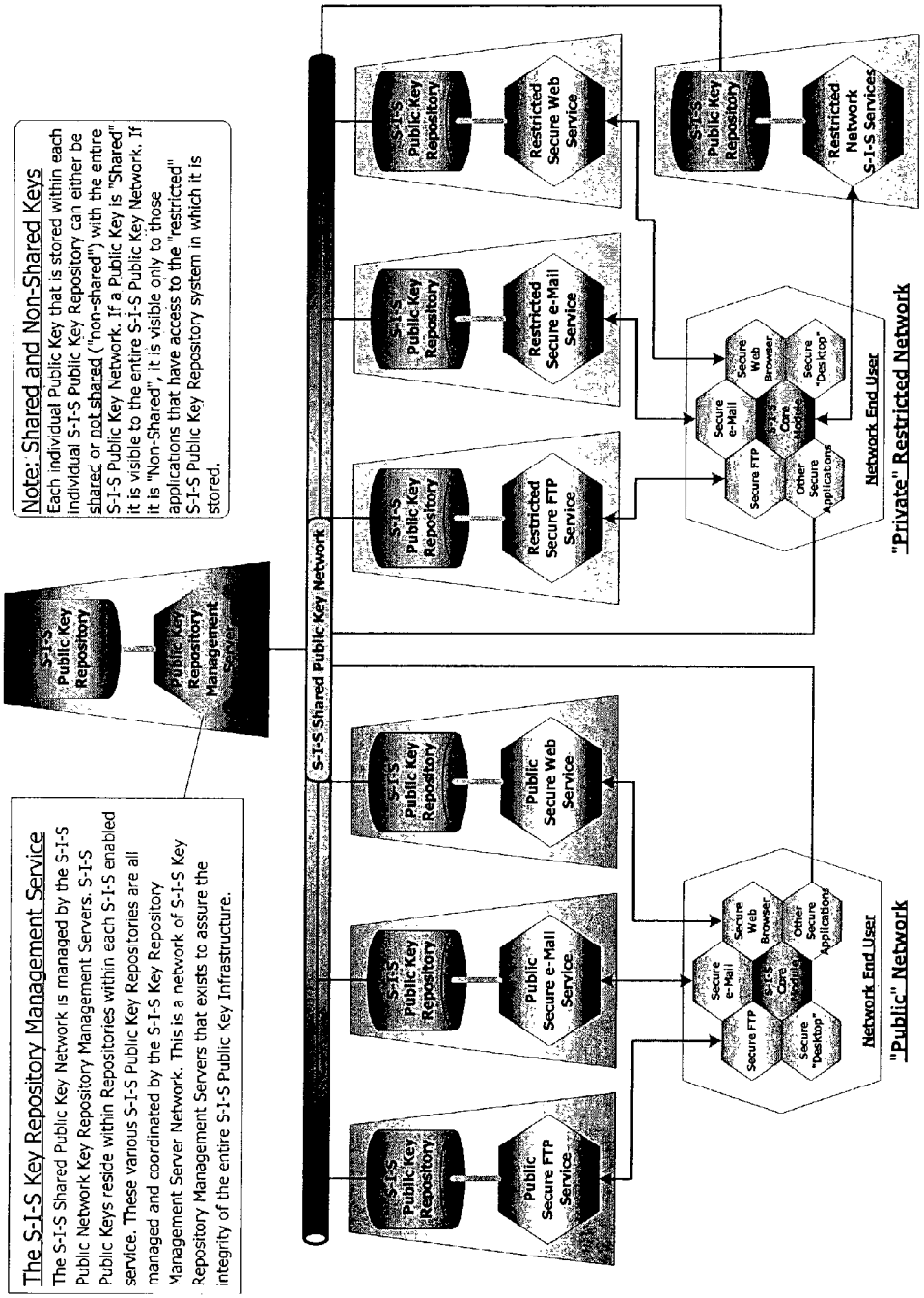
Fig. 38 S-I-S Shared Public Key Network

METHODS, SOFTWARE PROGRAMS, AND SYSTEMS FOR ELECTRONIC INFORMATION SECURITY

CROSS-REFERENCE TO RELATED APPLICATIONS

This application claims the benefit under 35 U.S.C. 119(e) of U.S. Provisional Application Ser. No. 60/353,635, filed Jan. 31, 2002.

FIELD OF THE INVENTION

The present invention relates to various methods, software programs, and systems for electronic information security. More particularly, certain embodiments of the present invention relate to methods, software programs, and systems for electronic information security utilizing a file container for storing: (a) a data file, which data file is encrypted with a one-time random encryption key; (b) the one-time random encryption key, which one-time random encryption key is encrypted with a public key portion of a public key/private key pair associated with an owner of the file container; (c) an audit trail log of the history of the file container, which audit trail log is encrypted with the one-time random encryption key with which the data file is encrypted; (d) a digital signature based upon a hash of the combined data file and the audit trail log, which hash is encrypted with a private key portion of a public key/private key associated with a writer/creator of the file container; and (e) a profile associated with the file container.

For the purposes of the present application the term "entity" is intended to refer to any person, organization, or group.

Further, for the purposes of the present application the term "file container" is intended to refer to a mechanism for storing information, including the information in one or more data files.

Further still, for the purposes of the present application the term "file container creation operation" is intended to refer to generating a new instance of a file container.

Further still, for the purposes of the present application the term "file container writing operation" is intended to refer to modifying information stored in or associated with an existing file container. Such a file container writing operation may include "opening" the file container to write one or more various elements (such as distinct computer files) thereto and/or "opening" one or more of the various elements themselves to write thereto.

Further still, for the purposes of the present application the term "file container reading operation" is intended to refer to accessing information stored in or associated with an existing file container (without modifying the information). Such a file container reading operation may include "opening" the file container to read one or more various elements (such as distinct computer files) therein and/or "opening" one or more of the various elements themselves to read.

Further still, for the purposes of the present application the term "writer/creator" is intended to refer to the entity who most recently performed either a file container creation operation or a file container writing operation upon a specific file container.

Further still, for the purposes of the present application the term "owner of the file container" is intended to refer to the entity for whom the file container is created or written. The "owner" may or may not be the entity who has created or last written to the file container.

Further still, for the purposes of the present application the term "third party" is intended to refer to an entity that is neither the writer/creator of a specific file container nor the owner of the specific file container.

Further still, for the purposes of the present application the term "ftp operation" is intended to refer, but not be limited to, transmitting data using a file transfer protocol.

Further still, for the purposes of the present application the term "web browsing operation" is intended to refer, but not be limited to, transmitting data using a hypertext transfer protocol.

Further still, for the purposes of the present application the term "emailing operation" is intended to refer, but not be limited to, transmitting data using an email protocol.

Further still, for the purposes of the present application the term "encryption" is intended to refer to the process of converting some information (the "message"), usually represented as a string of characters (e.g., numbers, letters, symbols), into a different set of characters. The intention of encryption is typically to disguise the original message (the "plain text") so that in its encrypted form (the "cipher text") it is no longer recognizable and/or comprehensible.

Further still, for the purposes of the present application the term "decryption" is intended to refer to the reverse process of encryption. That is, decryption converts an encrypted "message" (the "cipher text") back into its original form (the "plain text").

Further still, for the purposes of the present application the term "computer virus" (or "virus") is intended to refer to a computer program that was designed to and/or actually operates in a generally malicious, counterproductive, and/or destructive manner.

Further still, for the purposes of the present application the term "virus scanning operation" (or "virus scanning") is intended to refer to detecting and/or eliminating a computer virus.

Further still, for the purposes of the present application the term "time/date stamp" is intended to refer to a mechanism for identifying the time and/or date of an event (such as a file container creation operation, a file container writing operation, or a file container reading operation, for example).

Further still, for each term which is identified herein as "intended to include, but not be limited to" certain definition(s), when such term is used in the claims the term is to be construed more specifically as "intended to include at least one of the definition(s)".

BACKGROUND OF THE INVENTION

A. Encryption

The basis of conventional encryption typically involves the use of one or more "keys". If a party knows the encryption key and the process used to encrypt the message, the message can be encrypted. If a party knows the decryption key and the process used to decrypt the message, the party can decrypt the message. Typically, within any given system, these processes remain static and only the keys change. For example, consider the famous "2001 Space Odyssey Code": The computer's name is HAL, the HAL 9000. Many people regard that name as being an encrypted name. Why? Add one letter to each of the letters in the name "HAL". H+1=I, A+1=B, and L+1=M. "IBM". In this case the process of decryption is to add a key to each letter. The key used is the number 1. Similarly the process of encryption (to convert from "IBM" into "HAL") would be to subtract the key from each letter. Here again, the key used is the number 1.

The above-described example of encryption is illustrated in FIG. 1. Of note, such encryption is known conventionally as "symmetric encryption" (where the same key is used to both encrypt and decrypt the message).

On the other hand, a different conventional process known as "asymmetric encryption" uses two keys. Under this system one key is used to encrypt the message and the other key, a different key, must be used to decrypt it. For this system to work, the two keys must, of course, be related; however, if the asymmetric encryption is to be effective the relationship between the two different keys cannot be obvious (i.e., knowing one key does not enable someone to automatically know the other key).

An important feature of such conventional asymmetric encryption is that either key can be used as the encryption key. Thus, if the initial "plain text" message is encrypted using Key #1, the encrypted text ("cipher text") can only be decrypted (converted back into "plain text") using Key#2. But if the plain text is encrypted using Key #2, the resulting cipher text can only be decrypted using Key #1. This relationship is illustrated in FIG. 2.

In addition, it is noted that conventional public key/private key technology is based upon asymmetric encryption. The concept is that each participant in the system has two keys. One key, the "private key", is kept private, known to, or accessible by, only the individual key owner (i.e., the entity associated with the key). The other key, the "public key", is considered public and is published to the world. The two keys work symmetrically. That is: (a) if a message is encrypted with an entity's public key, the message can only be decrypted with that entity's private key; and (b) if a message is encrypted with an entity's private key, the message can only be decrypted with that entity's public key.

When one is working with a conventional encryption mechanism there are certain important factors to note (because not all encryption is the same and not all public key/private key systems are the same). Some of the relevant issues are:

The type of encryption being used—
  Symmetric
  Asymmetric
  A Combination (Mixed Mode)—Some conventional systems use a randomly generated symmetric key to encrypt a message. They then use an asymmetric encryption process to encrypt the symmetric key, which is stored with the symmetrically encrypted message.
The size of the keys—In general, the longer the encryption key, the more difficult it is to crack the encryption code.
Who issues/generates the keys—Many implementations of conventional public key infrastructure ("PKI") technology rely upon "trusted authorities" (i.e., third party PKI vendors) to generate and issue all of the keys. On the other hand, some systems rely upon the end-users themselves to generate their own keys (using software supplied by the system).
Where and if the keys are stored—Some conventional systems store the public key/private key pairs within the computers being used by the system. Others systems generate the keys "on demand", when they are required, and do not store them at all. Still other systems store the public keys electronically, but generate the private keys on demand.

B. Digital Signatures

Conventional digital signatures serve two important purposes: (a) non-repudiation (i.e., the "signer" of an electronic document cannot deny having signed it); and (b) tamper-proofing (i.e., the contents of the electronic document cannot be changed without invalidating the digital signature).

Conventional digital signature technology is based upon two component technologies: (a) the public key/private key concept; and (b) a hash function (a hash function is a complex mathematical function, or formula, that uses the numeric representation of a document's content [e.g., text] to produce a specific number, the "hash value" of a document; conventional hash functions have been formulated in such a manner as to render it relatively easy to produce a hash value of a text, but almost impossible to produce a text that will yield a predetermined hash value).

Unlike handwritten, or even "digitized signatures" (i.e., digital images of handwritten signatures), each digital signature is different for each electronic document signed. In one example, a conventional mechanism used to create a digital signature for a specific document involves producing the hash value for the document and then encrypting the hash value with the signer's private key. This process is illustrated in FIG. 3A.

A signature, however, is essentially without value unless it can be "verified". Conventional digital signature verification confirms not only who signed the document but also that the document has not been changed in any way. The process of digital signature verification works as shown in FIG. 3B.

More particularly, to verify the signature using a conventional process, the verifier:

Produces the hash value of the document.
Decrypts the digital signature using the signer's public key, producing the signer's hash value. If the digital signature can be decrypted with the signer's" public key, then the signature was signed with the signer's private key (which, presumably, only the signer possesses).
Compares the hash values. If the two hash values match, the document has not been tampered with.

C. Authentication

Finally, it is noted that authentication is the means whereby system users are identified. In other words, authentication is verification of identity. Conventionally, there are three distinct types of authentication that correspond to the three distinct situations when authentication is required:

Registration Authentication (Enrollment)—When an entity is registered to use the system.
External Authentication (System Access)—When an entity "logs in" identifies his/her/itself) to use the system.
Internal Authentication (Resource Access)—After an entity has identified his/her/itself to the system and attempts to use a system resource (e.g., run a program) or access information stored in the system (e.g., open a file).

BRIEF DESCRIPTION OF THE DRAWINGS

FIG. 1 shows a diagram of symmetric encryption;
FIG. 2 shows a diagram of asymmetric encryption;
FIG. 3A shows a diagram of digital signature creation;
FIG. 3B shows a diagram of digital signature verification;
FIG. 4 shows an overview of the components of the S-I-S Virtual Strongbox security system according to an embodiment of the present invention;
FIG. 5A shows a virtual strongbox according to an embodiment of the present invention;
FIG. 5B shows virtual strongbox ownership according to an embodiment of the present invention;
FIG. 6 shows authentication options according to an embodiment of the present invention;

FIG. 7 shows an audit trail log according to an embodiment of the present invention;

FIG. 8 shows a return receipt package according to an embodiment of the present invention;

FIG. 9 shows a return receipt process according to an embodiment of the present invention;

FIG. 10 shows return receipt options according to an embodiment of the present invention;

FIG. 11 shows file name and ownership translation tables according to an embodiment of the present invention;

FIG. 12 shows conventional point-to-point encryption;

FIG. 13 shows conventional point-to-point encryption vulnerabilities;

FIG. 14 shows conventional web based secure email;

FIG. 15 shows conventional web based secure email vulnerabilities;

FIG. 16 shows a secure email system according to an embodiment of the present invention;

FIG. 17 shows secure email security according to an embodiment of the present invention;

FIG. 18 shows a secure e-mail system according to an embodiment of the present invention;

FIG. 19 shows a secure web-based e-mail system according to an embodiment of the present invention;

FIG. 20 shows a secure FTP system according to an embodiment of the present invention;

FIG. 21 shows a secure web access system according to an embodiment of the present invention;

FIG. 22 shows aspects of an S-I-S user's integrated security according to an embodiment of the present invention;

FIG. 23 shows an S-I-S external services overview according to an embodiment of the present invention;

FIG. 24 shows a flowchart relating to a Virtual Strongbox open operation according to an embodiment of the present invention;

FIG. 25 shows a flowchart relating to a Virtual Strongbox read ("unpack") operation according to an embodiment of the present invention;

FIG. 26 shows a flowchart relating to a Virtual Strongbox write ("save") operation according to an embodiment of the present invention;

FIG. 27 shows an overview of user authentication according to an embodiment of the present invention;

FIG. 28 shows a flowchart relating to user authentication according to an embodiment of the present invention;

FIG. 29 shows a diagram showing user ID and key arrays relating to user authentication according to an embodiment of the present invention;

FIG. 30 shows an overview of internal integration according to an embodiment of the present invention;

FIG. 31 shows an overview of S-I-S file processing and I/O according to an embodiment of the present invention;

FIG. 32 shows a flowchart relating to S-I-S invocation according to an embodiment of the present invention;

FIG. 33a shows a flowchart relating to launching the S-I-S process according to an embodiment of the present invention;

FIG. 33b shows a flowchart relating to launching an S-I-S process thread according to an embodiment of the present invention;

FIG. 34 shows an overview of an S-I-S main module according to an embodiment of the present invention;

FIG. 35 shows an overview of an S-I-S core module (and core module components) according to an embodiment of the present invention;

FIG. 36 shows an overview of an S-I-S encryption module according to an embodiment of the present invention;

FIG. 37 shows an overview of S-I-S encryption key management according to an embodiment of the present invention; and FIG. 38 shows an overview of an S-I-S public key network according to an embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment an electronic information security mechanism is provided, comprising: a file container for storing: (a) a data file, which data file is encrypted with a one-time random encryption key; (b) the one-time random encryption key, which one-time random encryption key is encrypted with a public key portion of a public key/private key pair associated with an owner of the file container; (c) an audit trail log of the history of the file container, which audit trail log is encrypted with the one-time random encryption key with which the data file is encrypted; (d) a digital signature based upon a hash of the combined data file and the audit trail log, which hash is encrypted with a private key portion of a public key/private key associated with a writer/creator of the file container; and (e) a profile associated with the file container.

In one example the digital signature may be encrypted with the one-time random encryption key with which the data file is encrypted.

In another example the profile associated with the file container may be encrypted with one of: (a) the private key portion of the public key/private key pair associated with the writer/creator of the file container; and (b) the one-time random encryption key with which the data file is encrypted.

In another example the file container may store a public key portion of the public key/private key pair associated with the writer/creator of the file container.

In another example the public key portion of the public key/private key pair associated with the writer/creator of the file container may be encrypted with the one-time random encryption key with which the data file is encrypted.

In another example the owner of the file container and the writer/creator of the file container may be distinct entities and each of the public key/private key pair associated with the owner of the file container and the public key/private key pair associated with the writer/creator of the file container may be unique.

In another example the owner of the file container and the writer/creator of the file container may be the same entity and the public key/private key pair associated with the owner of the file container and the public key/private key pair associated with the writer/creator of the file container may be identical.

In another example the file container may be an electronic file container adapted for processing by a computer.

In another example the processing may include at least one of the following operations: (a) a file container creation operation; (b) a file container reading operation; and (c) a file container writing operation.

In another embodiment an electronic information security mechanism is provided, comprising: means for carrying out at least one of a file container creation operation, a file container reading operation, and a file container writing operation on a file container storing: (a) a data file, which data file is encrypted with a one-time random encryption key; (b) the one-time random encryption key, which one-time random encryption key is encrypted with a public key portion of a public key/private key pair associated with an owner of the file container; (c) an audit trail log of the history of the file container, which audit trail log is encrypted with the one-time random encryption key with which the data file is encrypted; (d) a digital signature based upon a hash of the combined data file and the audit trail log, which hash is encrypted with a private key portion of a public key/private key associated with a writer/creator of the file container; and (e) a profile associated with the file container.

In one example the digital signature may be encrypted with the one-time random encryption key with which the data file is encrypted.

In another example the profile associated with the file container may be encrypted with one of: (a) the private key portion of the public key/private key pair associated with the writer/creator of the file container; and (b) the one-time random encryption key with which the data file is encrypted.

In another example the file container may store a public key portion of the public key/private key pair associated with the writer/creator of the file container.

In another example the public key portion of the public key/private key pair associated with the writer/creator of the file container may be encrypted with the one-time random encryption key with which the data file is encrypted.

In another example the file container may be an electronic file container adapted for processing by a computer and the means for carrying out at least one of the file container creation operation, the file container reading operation, and the file container writing operation on the file container may include computer software.

In another example the owner of the file container and the writer/creator of the file container may be distinct entities and each of the public key/private key pair associated with the owner of the file container and the public key/private key pair associated with the writer/creator of the file container may be unique.

In another example the owner of the file container and the writer/creator of the file container may be the same entity and the public key/private key pair associated with the owner of the file container and the public key/private key pair associated with the writer/creator of the file container may be identical.

In another example the means for carrying out at least one of the file container creation operation, the file container reading operation, and the file container writing operation on the file container may include means for encrypting at least one of: (a) the data file with the one-time random encryption key; (b) the one-time random encryption key with the public key portion of the public key/private key pair associated with the owner of the file container; (c) the audit trail log of the history of the file container with the one-time random encryption key with which the data file is encrypted; (d) the digital signature with the one-time random encryption key with which the data file is encrypted; (e) the profile associated with the file container with one of: (i) the private key portion of the public key/private key pair associated with the writer/creator of the file container; and (ii) the one-time random encryption key with which the data file is encrypted; and (f) the public key portion of the public key/private key pair associated with the writer/creator of the file container with the one-time random encryption key with which the data file is encrypted.

In another example the means for carrying out at least one of the file container creation operation, the file container reading operation, and the file container writing operation on the file container may include virus scanning means for virus scanning at least one of: (a) the data file before encryption; (b) the one-time random encryption key before encryption; (c) the audit trail log of the history of the file container before encryption; (d) the digital signature before encryption; (e) the profile associated with the file container before encryption; and (f) the public key portion of the public key/private key pair associated with the writer/creator of the file container before encryption.

In another example the means for carrying out at least one of the file container creation operation, the file container reading operation, and the file container writing operation on the file container may include means for decrypting at least one of: (a) the encrypted data file; (b) the encrypted one-time random encryption key; (c) the encrypted audit trail log of the history of the file container; (d) the encrypted digital signature; (e) the encrypted profile associated with the file container; and (f) the encrypted public key portion of the public key/private key pair associated with the writer/creator of the file container.

In another example the means for carrying out at least one of the file container creation operation, the file container reading operation, and the file container writing operation on the file container may include virus scanning means for virus scanning at least one of: (a) the data file after decryption; (b) the one-time random encryption key after decryption; (c) the audit trail log of the history of the file container after decryption; (d) the digital signature after decryption; (e) the profile associated with the file container after decryption; and (f) the public key portion of the public key/private key pair associated with the writer/creator of the file container after decryption.

In another example the invention may comprise means for adding a time/date stamp to the file container.

In another example the time/date stamp may correspond to a most recent operation selected from the group of: (a) a file container creation operation; (b) a file container writing operation; (c) a file reading operation; and (d) a virus scanning operation.

In another example the time/date stamp may be digitally signed.

In another example the time/date stamp may be digitally signed by a third party.

In another embodiment an electronic information security mechanism for use with a computer running at least a first application and a second application is provided, comprising: first data interface means for exchanging data with the first application; second data interface means for exchanging data with the second application; and means for carrying out at least one of a file container creation operation, a file container reading operation, and a file container writing operation on a file container storing: (a) a data file, which data file is encrypted with a one-time random encryption key; (b) the one-time random encryption key, which one-time random encryption key is encrypted with a public key portion of a public key/private key pair associated with an owner of the file container; (c) an audit trail log of the history of the file container, which audit trail log is encrypted with the one-time random encryption key with which the data file is encrypted; (d) a digital signature based upon a hash of the combined data file and the audit trail log, which hash is encrypted with a private key portion of a public key/private key associated with a writer/creator of the file container; and (e) a profile associated with the file container; wherein the means for carrying out at least one of the file container creation operation, the file container reading operation, and the file container writing operation on the file container includes means for providing the first application access to data in the data file through the first data interface means for exchanging data and means for providing the second application access to data in the data file through the second data interface means for exchanging data.

In one example the digital signature may be encrypted with the one-time random encryption key with which the data file is encrypted.

In another example the profile associated with the file container may be encrypted with one of: (a) the private key portion of the public key/private key pair associated with the writer/creator of the file container; and (b) the one-time random encryption key with which the data file is encrypted.

In another example the file container may store a public key portion of the public key/private key pair associated with the writer/creator of the file container.

In another example the public key portion of the public key/private key pair associated with the writer/creator of the file container may be encrypted with the one-time random encryption key with which the data file is encrypted.

In another example the file container may be an electronic file container adapted for processing by a computer and the means for carrying out at least one of the file container creation operation, the file container reading operation, and the file container writing operation on the file container may include computer software.

In another example the owner of the file container and the writer/creator of the file container may be distinct entities and each of the public key/private key pair associated with the owner of the file container and the public key/private key pair associated with the writer/creator of the file container may be unique.

In another example the owner of the file container and the writer/creator of the file container may be the same entity and the public key/private key pair associated with the owner of the file container and the public key/private key pair associated with the writer/creator of the file container may be identical.

In another example the means for carrying out at least one of the file container creation operation, the file container reading operation, and the file container writing operation on the file container may include means for encrypting at least one of: (a) the data file with the one-time random encryption key; (b) the one-time random encryption key with the public key portion of the public key/private key pair associated with the owner of the file container; (c) the audit trail log of the history of the file container with the one-time random encryption key with which the data file is encrypted; (d) the digital signature with the one-time random encryption key with which the data file is encrypted; (e) the profile associated with the file container with at least one of: (i) the private key portion of the public key/private key pair associated with the writer/creator of the file container; and (ii) the one-time random encryption key with which the data file is encrypted; and (f) the public key portion of the public key/private key pair associated with the writer/creator of the file container with the one-time random encryption key with which the data file is encrypted.

In another example the means for carrying out at least one of the file container creation operation, the file container reading operation, and the file container writing operation on the file container may include virus scanning means for virus scanning at least one of: (a) the data file before encryption; (b) the one-time random encryption key before encryption; (c) the audit trail log of the history of the file container before encryption; (d) the digital signature before encryption; (e) the profile associated with the file container before encryption; and (f) the public key portion of the public key/private key pair associated with the writer/creator of the file container before encryption.

In another example the means for carrying out at least one of the file container creation operation, the file container reading operation, and the file container writing operation on the file container may include means for decrypting at least one of: (a) the encrypted data file; (b) the encrypted one-time random encryption key; (c) the encrypted audit trail log of the history of the file container; (d) the encrypted digital signature; (e) the encrypted profile associated with the file container; and (f) the encrypted public key portion of the public key/private key pair associated with the writer/creator of the file container.

In another example the means for carrying out at least one of the file container creation operation, the file container reading operation, and the file container writing operation on the file container may include virus scanning means for virus scanning at least one of: (a) the data file after decryption; (b) the one-time random encryption key after decryption; (c) the audit trail log of the history of the file container after decryption; (d) the digital signature after decryption; (e) the profile associated with the file container after decryption; and (f) the public key portion of the public key/private key pair associated with the writer/creator of the file container after decryption.

In another example the invention may further comprise means for adding a time/date stamp to the file container.

In another example the time/date stamp may correspond to a most recent operation selected from the group of: (a) a file container creation operation; (b) a file container writing operation; (c) a file reading operation; and (d) a virus scanning operation.

In another example the time/date stamp may be digitally signed.

In another example the time/date stamp may be digitally signed by a third party.

In another example, the invention may further comprise authentication means for authenticating a user of the first application and a user of the second application.

In another embodiment an electronic information security mechanism for use with a first computer and a second computer is provided, comprising: first processing means associated with the first computer for carrying out at least one of a file container creation operation, a file container reading operation, and a file container writing operation on a file container storing: (a) a data file, which data file is encrypted with a one-time random encryption key; (b) the one-time random encryption key, which one-time random encryption key is encrypted with a public key portion of a public key/private key pair associated with an owner of the file container processed by the first processing means; (c) an audit trail log of the history of the file container, which audit trail log is encrypted with the one-time random encryption key with which the data file processed by the first processing means is encrypted; (d) a digital signature based upon a hash of the combined data file processed by the first processing means and the audit trail log processed by the first processing means, which hash is encrypted with the private key portion of a public key/private key pair associated with a writer/creator of the file container processed by the first processing means; and (e) a profile associated with the file container processed by the first processing means; second processing means associated with the second computer for carrying out at least one of a file container creation operation, a file container reading operation, and a file container writing operation on a file container storing: (a) a data file, which data file is encrypted with a one-time random encryption key; (b) the one-time random encryption key, which one-time random encryption key is encrypted with a public key portion of a public key/private key pair associated with an owner of the file container processed by the second processing means; (c) an audit trail log of the history of the file container, which audit trail log is encrypted with the one-time random encryption key with which the data file processed by the second processing means is encrypted; (d) a digital signature based upon a hash of the combined data file processed by the second processing means and the audit trail log processed by the second processing means, which hash is encrypted with the private key portion of a public key/private key pair associated with a writer/creator of the file container processed by the second processing means; and (e) a profile associated with the file container processed by the second processing means; first exchange means associated with the first computer for sending a file container processed by the first processing means to the second computer and for receiving a file container processed by the second processing means from the second computer; and second exchange means associated with the second computer for sending a file container processed by the second processing means to the first computer and for receiving a file container processed by the first processing means from the first computer.

In one example: a) the file container processed by the first processing means may be an electronic file container adapted for processing by a computer and the first processing means may include computer software; and b) the file container processed by the second processing means may be an electronic file container adapted for processing by a computer and the second processing means may include computer software.

In another example the owner of the file container processed by the first processing means and the writer/creator of the file container processed by the first processing means may be distinct entities and each of the public key/private key pair associated with the owner of the file container processed by the first processing means and the public key/private key pair associated with the writer/creator of the file container processed by the first processing means may be unique.

In another example the owner of the file container processed by the second processing means and the writer/creator of the file container processed by the second processing means may be distinct entities and each of the public key/private key pair associated with the owner of the file container processed by the second processing means and the public key portion of the public key/private key pair associated with the writer/creator of the file container processed by the second processing means may be unique.

In another example the owner of the file container processed by the first processing means and the writer/creator of the file container processed by the first processing means may be the same entity and the public key/private key pair associated with the owner of the file container processed by the first processing means and the public key/private key pair associated with the writer/creator of the file container processed by the first processing means may be identical.

In another example the owner of the file container processed by the second processing means and the writer/creator of the file container processed by the second processing means may be the same entity and the public key/private key pair associated with the owner of the file container processed by the second processing means and the public key/private key pair associated with the writer/creator of the file container processed by the second processing means may be identical.

In another example: (i) the file container processed by the first processing means may include a public key portion of the public key/private key pair associated with the writer/creator of the file container; and (ii) the file container processed by the second processing means may include a public key portion of the public key/private key pair associated with the writer/creator of the file container.

In another example: (i) the first processing means may include first encryption means for encrypting at least one element of the file container processed by the first processing means as follows: (a) the data file with the one-time random encryption key; (b) the one-time random encryption key with the public key portion of the public key/private key pair associated with the owner of the file container; (c) the audit trail log of the history of the file container with the one-time random encryption key with which the data file is encrypted; (d) the digital signature with the one-time random encryption key with which the data file is encrypted; (e) the profile associated with the file container with one of: (i) the private key portion of the public key/private key pair associated with the writer/creator of the file container; and (ii) the one-time random encryption key with which the data file is encrypted; and (f) the public key portion of the public key/private key pair associated with the writer/creator of the file container encrypted with the one-time random encryption key with which the data file is encrypted; and (ii) the second processing means may include second encryption means for encrypting at least one element of the file container processed by the second processing means as follows: (a) the data file with the one-time random encryption key; (b) the one-time random encryption key with the public key portion of the public key/private key pair associated with the owner of the file container; (c) the audit trail log of the history of the file container with the one-time random encryption key with which the data file is encrypted; (d) the digital signature with the one-time random encryption key with which the data file is encrypted; (e) the profile associated with the file container with one of: (i) the private key portion of the public key/private key pair associated with the writer/creator of the file container; and (ii) the one-time random encryption key with which the data file is encrypted; and (f) the public key portion of the public key/private key pair associated with the writer/creator of the file container encrypted with the one-time random encryption key with which the data file is encrypted.

In another example: (i) the first processing means may include first virus scanning means for virus scanning at least one element of the file container processed by the first processing means as follows: (a) the data file before encryption; (b) the one-time random encryption key before encryption; (c) the audit trail log of the history of the file container before encryption; (d) the digital signature before encryption; (e) the profile associated with the file container before encryption; and (f) the public key portion of the public key/private key pair associated with the writer/creator of the file container before encryption; and (ii) the second processing means may include second virus scanning means for virus scanning at least one element of the file container processed by the second processing means as follows: (a) the data file before encryption; (b) the one-time random encryption key before encryption; (c) the audit trail log of the history of the file container before encryption; (d) the digital signature before encryption; (e) the profile associated with the file container before encryption; and (f) the public key portion of the public key/private key pair associated with the writer/creator of the file container before encryption.

In another example: (i) the first processing means may include first decryption means for decrypting at least one of the following elements of the file container processed by the first processing means: (a) the encrypted data file; (b) the encrypted one-time random encryption key; (c) the encrypted audit trail log of the history of the file container; (d) the encrypted digital signature; (e) the encrypted profile associated with the file container; and (f) the encrypted public key portion of the public key/private key pair associated with the writer/creator of the file container; and (ii) the second processing means may include second decryption means for decrypting at least one of the following elements of the file container processed by the second processing means: (a) the encrypted data file; (b) the encrypted one-time random encryption key; (c) the encrypted audit trail log of the history of the file container; (d) the encrypted digital signature; (e) the encrypted profile associated with the file container and (f) the encrypted public key portion of the public key/private key pair associated with the writer/creator of the file container.

In another example: (i) the first processing means may include first virus scanning means for virus scanning at least one element of the file container processed by the first processing means as follows: (a) the data file after decryption; (b) the one-time random encryption key after decryption; (c) the audit trail log of the history of the file container after decryption; (d) the digital signature after decryption; (e) the profile associated with the file container after decryption; and (f) the public key portion of the public key/private key pair associated with the writer/creator of the file container after decryption; and (ii) the second processing means may include second virus scanning means for virus scanning at least one element of the file container processed by the second processing means as follows: (a) the data file after decryption; (b) the one-time random encryption key after decryption; (c) the audit trail log of the history of the file container after decryption; (d) the digital signature after decryption; (e) the profile associated with the file container after decryption; and (f) the public key portion of the public key/private key pair associated with the writer/creator of the file container after decryption.

In another example the invention may further comprise means for adding a time/date stamp to at least one of: (a) the file container processed by the first processing means; and (b) the file container processed by the second processing means.

In another example the time/date stamp may correspond to a most recent operation selected from the group of: (a) a file container creation operation; (b) a file container writing operation; (c) a file reading operation; and (d) a virus scanning operation.

In another example the time/date stamp may be digitally signed.

In another example the time/date stamp may be digitally signed by a third party.

In another example the invention may further comprise authentication means for authenticating a user of the first computer.

In another example the invention may further comprise authentication means for authenticating a user of the second computer.

In another example the first computer, the second computer, the first processing means, the second processing means, the first exchange means, and the second exchange means may be used for at least part of a mechanism for carrying out at least one of an ftp operation, a web browsing operation, and an emailing operation.

In another embodiment a security mechanism for disguising a chosen name of an electronic file from a computer operating system is provided, comprising: means for generating an alias name for the electronic file; means for storing the chosen name and the alias name as an associated pair of names; and means for applying the alias name to the electronic file, wherein the computer operating system identifies the electronic file by the alias name.

In one example the means for generating the alias name and the means for applying the alias name may comprise computer software and the means for storing the chosen name and the alias name as the associated pair of names may comprise a look-up table.

In another example at least one of the alias name, the chosen name, the associated pair of names, and the look-up table may be encrypted.

In another example the means for generating the alias name may generate an alias name which is selected from the group including, but not limited to: (a) random alphanumeric characters; (b) pseudo-random alphanumeric characters; (c) a predetermined group of alphanumeric characters; (d) a pseudo-random combination of characters; and (e) a pseudo-random combination of groups of characters.

In another embodiment a security mechanism for disguising an identity of an entity associated with an electronic file from a computer operating system is provided, comprising: means for generating an alias entity associated with the electronic file; means for storing an identification of the entity associated with the electronic file and an identification of the alias entity associated with the electronic file as an associated pair of identities; and means for associating the alias entity with the electronic file, wherein the computer operating system associates the alias entity with the electronic file.

In one example the means for generating the alias entity and the means for associating the alias entity may comprise computer software and the means for storing the identification of the entity and the identification of the alias entity as the associated pair of identities may comprise a look-up table.

In another example at least one of the alias entity, the identity of the entity associated with the electronic file, the associated pair of identities, and the look-up table may be encrypted.

In another example the means for generating the alias entity may generate an alias entity which is selected from the group including, but not limited to: (a) random alphanumeric characters; (b) pseudo-random alphanumeric characters; (c) a predetermined group of alphanumeric characters; (d) a pseudo-random combination of characters; and (e) a pseudo-random combination of groups of characters.

In another embodiment a method for sending information from a sender to a recipient is provided, comprising: assembling a return receipt package including a message portion and a receipt portion, wherein the message portion includes: (a) a message file encrypted with a one-time random encryption key; (b) a message unique ID associated with the message file encrypted with a public key portion of a public key/private key pair associated with the recipient; (c) a sender ID associated with the sender encrypted with the public key portion of the public key/private key pair associated with the recipient; (d) a time/date stamp encrypted with the public key portion of the public key/private key pair associated with the recipient; and (e) a digital signature associated with the sender; and the receipt portion includes: (a) the one-time random encryption key encrypted with a public key portion of the public key/private key pair associated with the sender; and (b) the message unique ID encrypted with the public key portion of the public key/private key pair associated with the sender; sending the return receipt package from the sender to the recipient; storing the message portion after receipt by the recipient; assembling a receipt portion acknowledgement message including: (a) the receipt portion of the return receipt package; (b) a recipient ID associated with the recipient encrypted with the public key portion of the public key/private key pair associated with the sender; (c) a time/date stamp encrypted with the public key portion of the public key/private key pair associated with the sender; and (d) a digital signature associated with the recipient; sending the receipt portion back to the sender; assembling a release including: (a) the one-time random encryption key encrypted with the public key portion of the public key/private key pair associated with the recipient; (b) the message unique ID encrypted with the public key portion of the public key/private key pair associated with the recipient; (c) the digital signature associated with the sender; and (d) a time/date stamp encrypted with the public key portion of the public key/private key pair associated with the recipient; and sending the release from the sender to the recipient.

In one example the digital signature associated with the sender may be encrypted with a public key portion of a public key/private key pair associated with the recipient.

In another example the digital signature associated with the recipient may be encrypted with a public key portion of a public key/private key pair associated with the sender.

In another example the invention may further comprise decrypting the one-time random encryption key contained within the release using the public key portion of the public key/private key pair associated with the recipient and using the decrypted one-time random encryption key to decrypt the message file from the message portion of the return receipt package.

In another embodiment a method for generating a public key portion of a public key/private key pair is provided, comprising: receiving a pass-phrase; and generating the public key portion based at least in part upon the received pass-phrase.

In one example the invention may further comprise: (a) receiving data from at least one of: (i) a unique device, which unique device serves to confirm an identity of a possessor thereof; and (ii) a biometric authenticator, which biometric authenticator reads a unique human attribute; and (b) generating the public key portion based at least in part upon the received pass-phrase and the received data.

In another example the unique device may be one of a smart card and a dongle and the biometric authenticator may be one of a fingerprint reader, a hand geometry reader, and a retinal scanner.

In another embodiment a method for generating a private key portion of a public key/private key pair is provided, comprising: receiving a pass-phrase; and generating the private key portion based at least in part upon the received pass-phrase.

In one example the invention may further comprise: (a) receiving data from at least one of: (i) a unique device, which unique device serves to confirm an identity of a possessor thereof; and (ii) a biometric authenticator, which biometric authenticator reads a unique human attribute; and (b) generating the private key portion based at least in part upon the received pass-phrase and the received data.

In another example the unique device may be one of a smart card and a dongle and the biometric authenticator may be one of a fingerprint reader, a hand geometry reader, and a retinal scanner.

In summary, various embodiments of the present invention provide a mechanism (hereinafter referred to as "System Integrated Security" or "S-I-S") for the secure storage and/or transmission of information. More particularly, S-I-S may provide security for the "e-world", enabling businesses and private individuals to avail themselves of the opportunity to use electronic files for the storage and transmission of even the most confidential information. In one example (which example is intended to be illustrative and not restrictive) S-I-S may provide an inexpensive, easy to use, platform-independent suite of products and/or services that provide unique and complete, state-of-the-art electronic file security including one or more of the following elements:

S-I-S "Add-On" Components: user installable software modules to enable the users of popular software products (e.g., Microsoft Office, Lotus Notes) to store and/or transmit electronic files securely;

S-I-S OEM integration products: software developer kit(s) to extend powerful S-I-S security to specialized third part software;

S-I-S Infrastructure products: server software to support S-I-S infrastructure services (e.g., the S-I-S Public Key Repository Network), and S-I-S support services (customer and/or technical support).

In another example (which example is intended to be illustrative and not restrictive) S-I-S may provide the key to universally accessible, easy to use, platform and application independent, highly effective security for all types of electronic files. More particularly, S-I-S may include:

The S-I-S Virtual Strongbox—The S-I-S Virtual Strongbox technology can be used for both secure file storage and secure file transmission. Each S-I-S Virtual Strongbox may store an encrypted and digitally signed file, as well as its own internal audit trail. The S-I-S Virtual Strongbox can be stored as a local file, and/or, with essentially equal facility, transmitted across systems.

The S-I-S Core Module—The S-I-S Core Module may readily integrate into existing and future software application programs, enabling them to utilize the full power of S-I-S technology (i.e., enabling them to authenticate system users and, when authorized to do so, to create, open, modify, close, and save S-I-S Virtual Strongboxes).

The S-I-S Public Key Repository Network—The S-I-S Public Key Repository Network may provide the means for one S-I-S user to create one or more S-I-S Virtual Strongboxes for another S-I-S user (i.e., the means to share information securely).

Of note, the use of S-I-S enabled applications and/or S-I-S enhanced applications (such as optional virus-scanning and independent Time/Date stamping services, for example) may be implemented in another example (which example is intended to be illustrative and not restrictive) as follows:

For the end-user market→S-I-S add-on component software for existing popular software applications (such as Microsoft Office and Lotus Notes).

For the software developer market→S-I-S Software Developer Kits (SDKs) for enhancing their existing and future software products.

For the application service provider (ASP) market→S-I-S support applications (e.g., S-I-S enabled certified Time/Date provider software).

For the S-I-S Public Key Repository Provider market→The S-I-S Public Key Repository software and/or the S-I-S Public Key Repository Network Management Service.

In another example (which example is intended to be illustrative and not restrictive) S-I-S may include (but not be limited to) the following software products that enable customers to implement and take advantage of the S-I-S architecture:

System Integrated Security Plug-in Modules for existing, popular client software packages (e.g., plug-ins for Microsoft Office and Lotus Notes).

System Integrated Security Plug-in Modules for existing, popular server software packages (e.g., plug-ins for Microsoft Exchange and Lotus Notes).

System Integrated Security Server Software. This may include (but not be limited to) modules to:

Provide local S-I-S Time/Date support for, and connectivity to, S-I-S enabled "Time/Date" ASPs (Application Service Providers)

Provide connectivity to S-I-S Delivery Confirmation ASPs

Host Local Secure e-Mail Systems (with built-in connectivity to public S-I-S Secure e-Mail Systems, and the "hooks" to connect to other public Secure e-Mail Systems)

Host Local Public Key Repository Databases (that have built-in connectivity to the S-I-S Public Key Repository Network, and "hooks" to connect to other PKI providers)

Provide local support for Centralized Virus Protection Services for S-I-S enabled applications System Integrated Security Software Developers Kits for Software Vendors who wish to incorporate S-I-S Enabled Software into their product line.

In another example (which example is intended to be illustrative and not restrictive) S-I-S may include (but not be limited to) the following services (some of which may be outsourced and/or licensed) that enable customers to implement and take advantage of the S-I-S architecture:

Trusted Independent Third Party Service Providers (ASP) for:

Digitally Signed Certified and Independent Time/Date Stamps

Delivery Confirmation (for e-mail & other communication media)

Secure Electronic Document Transmission Services (e.g. e-Mail)

Public Key Repository Databases

Public Key Repository Network Oversight and Management

System Integrated Security Technical/Customer Support

Having summarized certain embodiments of the present invention, a discussion of various elements of electronic security according to the present invention will now be undertaken. In this regard, it is noted that certain salient elements of electronic security according to the present invention can be identified by the acronym "CIA&E". This stands for:

Confidentiality,
Integrity,
Accountability, and
Ease of Use
These elements are set out in more detail below as follows
Confidentiality There are two components to confidentiality:
Content Protection
Surveillance Protection Content Protection For files that are stored and files that are transmitted, content protection ensures that the contents of those files are accessible only to the entities(s) who should, and who are authorized to, have access to them. Others are prevented from seeing the contents of those files.

Surveillance Protection: Primarily for files that are transmitted, surveillance protection ensures that the existence of a communication between two (or more) entities is known only to those who should, and are authorized to, know of it. Advanced surveillance protection also ensures that confidential files that are stored are as invisible as possible to unauthorized surveillance and monitoring.

Complete confidentiality means that both the content of a secure file and the facts of its existence and/or transmission are known only to those who are intended to know: the file owner(s), the sender, and the recipient(s). Confidential files cannot be read by those not authorized to read them. Transmissions cannot be monitored to know from whom to whom the files (i.e., the communications) are sent.

Integrity

Integrity in an electronic file that is stored and/or transmitted means that when the file is opened and/or received it is the same, complete, unaltered file it was originally. Nothing is added to it, no words, no letters, no spaces, no bits and no deleterious viruses. Nothing is deleted from it, no missing pages, no words, no letters, no spaces and no bits. When a file is stored with integrity, the file, the whole file, and nothing but the file is retrieved when the file is opened. When a file is transmitted with integrity, the file, the whole file, and nothing but the file, is received by the recipient. In the context of information technology, integrity means that when files are securely stored and securely transmitted they cannot be tampered with and altered, and they are protected from viral infection.

Accountability

Accountability—means that the knowledge of: (a) who created, saved, changed, read, deleted, and/or transmitted the file; (b) when the file was saved and/or transmitted; and if the file was transmitted, who opened and/or received the file is available, but only to those authorized to know (that is, those entities who are within the protected circle of confidentiality). An often overlooked, but essential, aspect of accountability is user identity authentication. In the determination of "who", it is important not only to verify the electronic identity involved in a transaction, but also the actual individual (or group) identity that is behind the electronic identity.

Ease of Use

There is one more attribute that is important for secure computer systems: ease-of-use. In order for a security system to be easy to use, its security procedures and interfaces should be as simple as possible and as similar as possible to those already in use in the normal flow of operations. New procedures and interfaces should be kept to a minimum. If a system is not easy to use then it will not be used as often as it should. And if a system is not used when it should be used, it cannot be effective.

How to Achieve CIA&E
Confidentiality
Content Protection

The heart of content protection is encryption. By encrypting a file, the contents of that file are disguised in such a way that only by decrypting the file are the contents intelligible. Encryption can be thought of as locking a file; decryption as unlocking a file. In accord with the "lock" analogy, both encryption and decryption require the use of a "key" to perform their functions. In electronic encryption/decryption a "key" (either the "encryption key" or the "decryption key") is a string of bits.

As discussed above, there are two principal types of electronic encryption/decryption:

Symmetrical—The key that is used to encrypt a file is the same one required to decrypt that file.

Asymmetrical—Different keys are used to encrypt and decrypt a file. Typically asymmetrical encryption uses two keys. If key "A" is used to encrypt the file, then only key "B" can decrypt the file. If key "B" is used to encrypt the file, then only key "A" can decrypt the file.

Surveillance Protection

Gathering valuable intelligence information is not limited only to discovering the contents of confidential files. Knowledge that certain files exist, knowledge of with whom certain files are being shared, and even knowledge of who is communicating with whom, and how often, (without knowing the content of those communications) can all be valuable information. This type of intelligence gathering falls under the general category of "surveillance". A completely secure file protection system should include protection against these types of surveillance.

File Existence—File existence surveillance is in some ways the hardest surveillance to protect against, and in some ways it is the easiest. If the facility wherein the files are stored is truly secure and only authorized personnel have access to it, then file Surveillance Protection is guaranteed. If however, there is the slightest chance that an intruder may have access to the operating system and its file storage media, then more stringent measures are required. These may include:

Randomized File Names—the use of "meaningless" file names in all operating system visible tables. The meaningful file names are stored in a protected file-name-translation table (e.g., in an S-I-S Virtual Strongbox) and are visible only to authorized individuals (e.g., the actual file owners).

"Anonymous" or pseudonym File Owners—the use of "meaningless" file owner entries in the operating system visible tables. The true ownership tables are stored in a protected file-owner-translation table.

File Sharing/Transmission—When files are transmitted over electronic media, even if the files themselves are encrypted, the names of the files, their owners, creation dates, et cetera, should not be accessible to surveillance monitors. Similarly, neither should the identities of the "sender" and ultimate "recipient(s)" be accessible. One method of protecting against transmission surveillance monitoring is to use S-I-S Virtual Strongboxes with an S-I-S Enabled e-Mail System Provider. Transmitted files are wrapped in an S-I-S Virtual Strongbox whose contents are hidden and transmitted to a trusted third party S-I-S e-Mail service. From there, the S-I-S Virtual Strongbox is repacked and passed along to the intended recipient(s). Although the ownership of the initial e-Mail message (i.e., the identity of who sent it) may be discernible by a surveillance monitor, the contents of the e-Mail message, the nature of the contents of the e-Mail message, and its ultimate destination are not (as illustrated in FIG. 16 & FIG. 17).

Integrity

Digital Signatures and Virus Scanning are the foundations for assuring electronic file integrity. A file that has been digitally signed cannot be tampered with (changed in any way) without invalidating the digital signature. The identity of the signer is also beyond question ("non-repudiation") as long as the means to affix the signer's digital signature remains only in the hands of that signer. Digitally signed files are comprised of two pieces: the original data file and the digital signature. When a digitally signed file is opened the digital signature can be verified to ensure data file integrity.

Accountability

Accountability is a matter of "Who/Whom", "What", and "When".

"Who"—User Authentication

User Authentication is vital to security. All of security depends upon the correct identification of the individuals and entities involved. Two essential elements for effective authentication are: knowing who requires authentication, and when (under what conditions is) authentication required:

Who is being authenticated?
  An Individual—Personal Privacy.
  A Group Member—One of a circle of trust. For example, all the members of a certain department may require access to a specific set of documents.
  A Group "Entity"—When more than one individual is required. Sometimes the presence of more than one individual is a requirement for the granting of access permission (e.g., the two keys necessary to open a safe deposit box).

When is it necessary to know "who"?
  On System Registration (Enrollment)
  On System Access
  On Secure Session Access
  On Resource/Information Access "What & When"—What has Transpired and When The second aspect of accountability is being able to know what has transpired and when. Part of knowing "what and when" is the maintenance of a separate and independent audit trail. The other part is the recording of the activities, and the time and date of those activities, within a section of the objects of those activities themselves (e.g., a file creation date within the file itself).

Audit Trail—an Activity Log—This must be:
  Independent—Neutral Source
  Protected—Tamperproof & Repudiation Proof
  Accurately Time/Date Stamped
Time/Date Stamped Activities
  Accurate
  Independent—Neutral Source
  Protected—Tamperproof & Repudiation Proof
  Examples include:
    Time/Date stamped transactions (e.g., e-mail)
    Time/Date stamped file saves "Who & When"—Delivery Acknowledgement The third aspect of accountability is being able to track documents in transit. An essential element of this is the accountability of the "hand-off", the passing of a file from one dominion to another. Typically this is accomplished when the receiving party "signs for" the document. Any secure system, whether hardcopy or electronic, must be able to track documents/files with accurate and reliable "signed" return receipts, audit trails of the documents/files in transit.

Ease of Use

A Balance Between Transparency and Awareness

As much as possible, all systems should be easy to use. They should be "transparent" to the extent that they do not get between the user and the tasks that are to be performed. They should not unnecessarily constrain the user. Too often, security systems present the aura of security by creating an unnecessary atmosphere of complexity. On the other hand, in an environment where security measures are not necessary all of the time, it is important that, when security features are being employed, the user is aware of them. More than anything else, effective security is a matter of awareness.

Familiar User Interfaces

Wherever and whenever possible, security systems should utilize familiar user interfaces. The bane of Information Technology (IT) departments is what has sometimes been called the YAAI factor (Yet Another Application Interface). For individuals who have tasks to accomplish, learning yet another user interface, another methodology, another set of steps to be performed, is not a welcome prospect. Security systems that require an entirely new set of procedures run the serious risk of user avoidance.

Flexibility

An effective and viable security system should include and support a wide range of options. The system should enable the users to tune the system to meet their evolving requirements. The same system should be able to handle "low" security environments, "high" security environments, and everything in between.

Referring now to FIG. 4, an embodiment of the S-I-S architecture according to the present invention is shown. As seen in this FIG. 4, the S-I-S architecture according to this embodiment is built upon a foundation of three basic components:

The S-I-S Virtual Strongbox
The S-I-S Public Key Repository Network
The S-I-S Client Software (the S-I-S "Core Module")

Taken together, these components enable provide a secure, easy to use, platform independent, and inexpensive computer security system.

More detail regarding each of the components of this embodiment is provided below as follows:

The S-I-S Virtual Strongbox

The foundation of this embodiment of the S-I-S architecture is the secure S-I-S Virtual Strongbox. The S-I-S Virtual Strongbox of this embodiment is the electronic equivalent of a transportable locked strongbox, sealed with a unique, non-reputable seal, and unlockable by only a single specific key. The lock on each of these "strongboxes" can be set to allow only the possessor of the single key, the key owner, to open it (if the Virtual Strongbox is to be used to store the owner's private possessions), or it can be set to allow only a specific recipient to open it (if the Virtual Strongbox is to be used to transport valuables from one person to another).

A value of the S-I-S Virtual Strongbox is that it is secure and portable. Irrespective of the hardware platform and operating system, a secure S-I-S Virtual Strongbox of this embodiment may be stored on any computer, transmitted via any electronic transport medium, and accessed from any computer application that is "S-I-S enabled" (i.e., has the appropriate S-I-S software installed on it). The confidential content of each S-I-S Virtual Strongbox of this embodiment is:

Encrypted, so that only the specified, authorized, authenticated party can decrypt (i.e., read) it, and
Digitally signed, so that the contents cannot be changed (without invalidating the digital signature) and the authorship cannot be disputed ("non-repudiation").
Optionally, the contents may also be:
Virus scanned, to prevent "encrypted viruses" from sneaking past firewalls and other virus protection mechanisms, and
Time/Date stamped with an independent third party's digitally signed Time/Date Stamp, to prevent fraudulent time/date manipulation.

In addition, each S-I-S Virtual Strongbox of this embodiment contains an audit trail log, a history of all accesses it has experienced (creation, open/read, modify/save, et cetera).

Further, S-I-S Virtual Strongboxes according to this embodiment can be used to store information locally on an end-user's computer, share information in a group (departmental) environment, and exchange/transmit information to outside entities. For example, S-I-S Virtual Strongboxes according to this embodiment can be used as:

Attachments to e-mail messages, in order to help provide the confidentiality, integrity, accountability, and ease of use required to transform that medium into a viable conduit for confidential information
Protocol "handshake" exchange media for website access, in order to help prevent website spoofing and other Internet-based fraud, and
Mutual identification and authentication media for entity-to-entity (including person to person) payment systems; helping to enable websites to accept payments without the necessity of customers entering their credit card numbers.

When an S-I-S enabled application saves or creates an S-I-S Virtual Strongbox according to this embodiment, the data file is encrypted, digitally signed, optionally time/date stamped and virus scanned, and written into the Virtual Strongbox file together with a secure audit trail (log file) that maintains a history of the files activity. The S-I-S Virtual Strongbox, which may be saved as an "S-I-S" type file on the local operating system, can be stored, copied, and/or transmitted to any other computer. If the Virtual Strongbox is transmitted to another computer, the receiving computer need not be running the same operating system as the sending computer. It merely requires the appropriate S-I-S enabled application (and, of course, the appropriate authenticated authorization, the appropriate "key") in order to open the S-I-S Virtual Strongbox.

The S-I-S Public Key Repository Network

Whenever an S-I-S user's application must communicate with another S-I-S user, the first S-I-S user must obtain the second user's Public Key. This may be accomplished by a look-up request to the S-I-S Public Key Repository. When a user's application requires another user's Public Key, the application may query its local S-I-S Public Key Repository. If the entry is not found locally, the local S-I-S Public Key Repository may issue a "public" query to all S-I-S Public Key Repositories to which it itself is connected.

S-I-S Public Key Repositories can exist locally and/or remotely, isolated or connected. When a S-I-S Public Key Repository is "connected", its administrators can determine which entries within it are to be shared with the public network, and which are to be available only to the local domain. One or more parties may maintain an S-I-S Public Key Repository Network Management Service to insure the integrity of all connected S-I-S Public Key Repositories.

The S-I-S Client Software (the S-I-S "Core Module")

The S-I-S Core Module according to this embodiment is an add-on component for application software. The S-I-S Core Module according to this embodiment contains all of the functionality required to:

create, read, and write (save) S-I-S Virtual Strongboxes
authenticate the S-I-S system users, and
query S-I-S Public Key Repositories When embedded within an application, the S-I-S Core Module according to this embodiment may render that application "S-I-S Enabled". The requisite interface between the S-I-S Core Module code and some existing software applications may be provided "out of the box" as a convenient add-on component to certain popular computer desktop applications. For other applications, a Software Developer's Kit (SDK) may be utilized to enable software developers to build an interface to the S-I-S Core Module and thus create their own S-I-S Enabled applications.

S-I-S Enhanced Components

In addition to the basic S-I-S components and optional services of this embodiment (e.g., Certified Time/Date Stamp), S-I-S may provide some "enhanced" components, especially designed for those entities that require the utmost in security.

S-I-S Name Randomizer

The S-I-S Name Randomizer according to one embodiment is an S-I-S enhanced component that serves to provide protection against unwanted surveillance intrusion on file storage systems. It does so by disguising file names and/or file owners as listed in operating system directory tables. File names and ownership can, and should, be revealing. With the quantity of information stored and the number of files maintained on computers, it would be totally unmanageable if the file names did not indicate something about the content of their files and who owns them. And yet, even if a malefactor does not have access to the content of a file, knowing the name of a file, that the file exists, and who the owner is, can be valuable information. The S-I-S File Name Randomizer program, according to this embodiment, exists in order to protect against this type of vulnerability.

"Random" File Names

Using an S-I-S Virtual Strongbox, the S-I-S File Name Randomizer program of this embodiment maintains a file-owner-owned translation table (the S-I-S File Name and Ownership Translation Table) that converts between meaningful file Virtual Strongbox names and random (meaningless, disguised and/or misleading) names generated by S-I-S that are seen by the operating system.

Proxy File Ownership

File Proxy Ownership is an S-I-S File Name Randomizer option that, under one embodiment, enables the user to hide the ownership of a Virtual Strongbox file. When this option is installed, the S-I-S File Name Randomizer registers a number of new operating system users. Each of these new users has a "random" name, i.e., a "proxy" name, and identical permissions as the original S-I-S user. The number of proxy names requested may be a user settable parameter (within the limitations set up the by the system administrator). When a new Virtual Strongbox is created, the S-I-S File Name Randomizer saves the Virtual Strongbox file in the operating system, assigning its ownership randomly to one of the file owner's proxy names. Access to the operating system file directory reveals only the proxy name for the file ownership and not the identity of the real owner. When a Virtual Strongbox is opened, the S-I-S File Name Randomizer assumes the identity of the proxy name in order to open the file.

For environments in which strong centralized Information Technology department control is a requirement, S-I-S may render the appropriate file ownership information available to System Administrators.

S-I-S Return Receipt Package—Delivery Acknowledgement Management

When files are transmitted, although it is comforting to know that the file transmission security architecture provides content and surveillance protection, it is also comforting to know that the intended recipient did actually receive them. Indeed, there are times when the acknowledgement of delivery by the recipient is almost as important as the content of the files being transmitted. S-I-S recognizes this essential aspect of "accountability" and provides for it through the use of S-I-S Return Receipt Packages ("S-I-S RR Packages").

S-I-S Return Receipt Packages

An S-I-S RR Package according to this embodiment is similar to an S-I-S Virtual Strongbox, in that it consists of a number of component files packaged together in a file container, but it is designed to optimize the process of delivery acknowledgement. The S-I-S RR Packages according to this embodiment are divided into two portions: the "message portion" and the "receipt portion".

Using a four-step protocol according to this embodiment, S-I-S enabled file transmission software (e.g., e-Mail or FTP) ensures that transmitted files cannot be read unless signed for by the recipient. Naturally, all four steps in the process record digitally signed and certified Time/Date stamps. S-I-S enabled file transmission software may support both automatically generated receipt signatures (for more convenience, but less security) and required "manual" receipt signatures (for more security, but less convenience).

Add-On Applications

Using the core S-I-S technology according to the present invention, combined with the S-I-S enhanced components according to the present invention, it is possible to construct and deploy platform and operating system independent secure applications, applications such as:

Secure e-Mail (client-server based)
Secure e-Mail (web-based)
Secure FTP (and other file transfer protocols)
Secure Business-to-Business (and Customer-to-Business) Payment Systems
Secure Person-to-Person Payment Systems
Secure Web Browsing
et cetera.

Of note, the S-I-S technology makes it possible to rise above the protocol minutia, complexity, and platform/OS dependence of more traditional security systems. S-I-S' application layer architecture makes it possible to use the same security solution for all applications and all environments. S-I-S' completeness and ease-of-use enables users to use one security system for all of their needs, and not worry about sub-optimized systems that can cause more harm than good.

In another embodiment of the present invention, S-I-S may utilize certain support services, including:

S-I-S Public Key Repository Network Management
S-I-S Public Key Repository Network Service
S-I-S Certified Time/Date Application Service
S-I-S Virus Scanning Service In addition, S-I-S may support significant enhanced application services, such as S-I-S enabled file transmission systems (e.g., e-mail and FTP).

In one embodiment the S-I-S services are be operational essentially 24 hours a day, every day. In order to ensure this level of service, S-I-S may utilize modularity and redundancy. For example (which example is intended to be illustrative and not restrictive), multiple S-I-S SP Nodes (Service Provision centers) may be distributed throughout diverse geographical regions (the S-I-S SP Nodes may be managed centrally from one or more S-I-S Network Operations Centers (NOCs)).

In another example (which example is intended to be illustrative and not restrictive), each of the S-I-S SP Nodes may be located in secure third-party co-hosting facility. The "third party" may be one of the large professional co-hosting entities such as AT&T, IBM, or others. The S-I-S SP Nodes may be designed to balance the load between them and back each other up. The S-I-S SP Nodes may be engineered with enough spare capacity that even if one entire Node is unavailable there will be essentially no service degradation. Each S-I-S SP Node may be linked to the outside world via multiple high-speed communication lines and multiple ISPs.

Referring now to FIG. 5A, an embodiment of an S-I-S Virtual Strongbox according to the present invention is shown. As seen in this FIG. 5A, the S-I-S Virtual Strongbox according to this embodiment is the basic S-I-S file storage and file transmission medium. The S-I-S Virtual Strongbox according to this embodiment is a secure file container that is used by S-I-S enabled applications to store electronic files and communicate securely with other S-I-S enabled applications. Each S-I-S Virtual Strongbox according to this embodiment contains the following:

- One or more data files that are encrypted with a randomly generated one-time symmetric encryption key (the "one-time random key").
- The one-time random key encrypted with the Virtual Strongbox owner's Public Key. This ensures that only the Virtual Strongbox owner (i.e., the possessor of the owner's Private Key) can read the random one-time key and decrypt the files encrypted with it.
- An Audit Trail Log of the Virtual Strongbox's history (see FIG. 7). All file access (create, read, and write), and if and when the Virtual Strongbox was virus scanned are recorded in this Audit Trail Log. Each entry in the Audit Trail Log is digitally signed by the individual who performed the logged activity. Since the Audit Trail Log is also encrypted with the one-time random key, only the Virtual Strongbox's owner can read this Audit Trail.
- The Digital Signature of the individual who last wrote to the Virtual Strongbox. The individual who saves ("writes) the Virtual Strongbox file signs it. The Digital Signature is created using the Data File(s), the Audit Trail Log, and the Private Key of the signer. This ensures that neither the Data File(s) nor the Audit Trail Log can be tampered with. It also ensures that the individual who last saved the Virtual Strongbox cannot deny having done so (i.e., "non-repudiation"). For greater security, greater confidentiality, the Digital Signature may be encrypted with the one-time random key, thus rendering it inaccessible to anyone except the Virtual Strongbox owner.
- The Virtual Strongbox Profile. This file contains Virtual Strongbox specific information that is required by the S-I-S program, but that should not require the Virtual Strongbox owner's Private Key to access. The Virtual Strongbox Profile is normally encrypted with the file saver's (the "signer's) Private Key. For greater security, greater confidentiality, the Virtual Strongbox Profile may be encrypted with the one-time random key, thus rendering it inaccessible to anyone except the Virtual Strongbox owner. The most important elements of the Virtual Strongbox Profile are:
  The File (Virtual Strongbox) Owner's Public Key
  Whether the Virtual Strongbox requires special access authentication
  Other optional fields include:
  Who the owner/creator is
  When it was created
  If it was Virus Scanned when last saved
  et cetera
- The Public Key of the individual who last wrote to the Virtual Strongbox. This Public Key, which is transported within the Virtual Strongbox, can be used to help validate the Virtual Strongbox saver's digital signature. Important Note: The inclusion of the File Saver's Public Key in the Virtual Strongbox is optional. For greater security (but less convenience) the File Saver's Public Key can be omitted. This prevents an unauthorized third party from opening the Virtual Strongbox and garnering information stored in the Profile (e.g., who the owner & saver of the Virtual Strongbox are). Since the File Saver's Public Key is required before being able to obtain any information from the Virtual Strongbox, if the File Saver's Public Key is omitted, the person opening the Virtual Strongbox will have to know, a priori, who the Saver (signer) is in order to look up and obtain the File Saver's Public Key. For even greater security, greater confidentiality, the File Saver's Public Key may be encrypted with the one-time random key, thus rendering it inaccessible to anyone except the Virtual Strongbox owner.

Of further note, a user may use S-I-S Virtual Strongboxes to store private information, accessible only by the Virtual Strongbox's creator, or to create Virtual Strongboxes for others, Virtual Strongboxes that only their new owners may open. Virtual Strongboxes thus become the medium for both secure information storage and secure information transmission.

Regarding ownership of the Virtual Strongboxes, it is noted that in this embodiment each Virtual Strongbox has one owner. More particularly, as seen in FIG. 5B, under this embodiment the owner can be either an individual or a group. More particularly, in this embodiment there are four types of S-I-S Virtual Strongbox ownerships (i.e., ownership by virtue of):

- Individual Identity—The Virtual Strongbox is owned by a single individual. To be recognized as the Virtual Strongbox owner, the individual is authenticated as an individual (i.e., by a pass phrase known only to the individual, and optionally, with some form of unique device technology and/or biometric data). Whenever an individual's digital signature is generated, it is generated using the individual's identity. S-I-S based Individual Identity authentication may require real-time key generation.
- Group Identity—The Virtual Strongbox is owned by a group (e.g., a department in an organization). The Group Identity is functionally the same as an individual, except for digital signature and audit trail records (which always revert to the individual). S-I-S based Group Identity authentication may require real-time key generation. Group members must typically remember the group pass phrase and possibly be required to possess group specific "unique devices".
- Group Membership—The Virtual Strongbox is owned by a group (e.g., a department in an organization). The Group Membership is functionally the same as an individual, except for digital signature and audit trail records (which always revert to the individual). The Group Membership authentication may require table look for membership, based upon individual identity authentication. Group Membership use may also require a "group administrator" to manage and control the group membership look-up table and its keys.
- Group Entity—The Virtual Strongbox is owned by more than one individual, but typically not many. The Ownership is functionally the same as an individual, except that all the individual owners are required for all functions. All of the individual owner authentications are required to establish the Group Entity identification. The digital signature and audit trail records are also that of the Group Entity and not of any single individual. The concept is similar to that of a safety deposit box that requires multiple keys to be opened and closed.

Note, it is also possible to create a Mixed Group Entity. A "mixed group", entity is a group in which some members are Group Entities, Group Identities, Individual Identities, and/or Individual members of a Group Membership. This mix-and-match capability enables significant flexibility for data access when, for example, "any three out of five" entities are required for access.

Referring now to authentication according to an embodiment of the present invention it is noted that there are two principal types of Authentication: Registration Authentication, and Access Authentication. More particularly:

Registration Authentication occurs when an individual is enrolled as a system user and receives a system identity. This system identity is familiar to most computer users as being their system "login name". In many, perhaps most, public systems, Registration Authentication is the least stringent of the authentication processes, and the source of significant vulnerability. Within S-I-S, how an entity is registered into the system is an attribute of that entity's identity. S-I-S supports the following Registration Authentication classes:

Self-Affirmation—"I am who I am because I say that I am" is self-affirmation. In the cyber world, this is the most common form of registration authentication, but it is also the least secure.

Institutional Affirmation—A recognized institution, such as a corporate employer or a bank, can vouch for and corroborate the identity of the entity.

Trusted Third Party Affirmation—An individual, such as a notary public, or an organization (perhaps governmental, perhaps private) whose specific function it is to verify identities, certifies the entity's identity.

Access Authentication consists of "Who", "How" and "When".

"Who" answers the question "who is using the system?".

"How" defines the means used to identify "who".

"When" determines under what circumstances the authentication is required.

Within the context of S-I-S according to this embodiment, "Who" is an entity that can be of any of the different types of S-I-S Virtual Strongbox owner classes: Individual Identity, Group Identity, Group Membership, and Group Entity. "How" is dependent upon the owner class and the specific entity's authentication profile. "When" is dependent upon how the particular S-I-S installation is set up and the individual configuration of specific Virtual Strongboxes. FIG. 6 illustrates the S-I-S Authentication Options according to this embodiment. As seen in this FIG. 6:

There are two types of "When" Authentication:

Work Session Authentication determines "when" in the process of accessing a computer the End User must be authenticated. It is a required configuration parameter. The options are mutually exclusive and End User must specify only one.

The least restrictive (and least secure) is "On System Logon". Here the "session" is defined as being from "Logon" to "Logoff".

More restrictive, but also more secure and more flexible is "On Secure Logon". Here the End User defines a secure session as being the period between a "secure logon" and a "secure logoff". The "Secure Logon" enables the End User to assume various secure identities (e.g., individual, departmental, et cetera) in a single System Logon Session. "On Secure Logon" can also be configured with a "Time Out" option, so that if the user has not accessed the system for a predetermined period of time, the system automatically logs the user out of the secure session.

File Access Authentication determines when, in the process of retrieving and storing data the system requires ID validation (authentication) of the End User. The two salient time points are when a file is opened and when a file is saved. These are not required, nor are they mutually exclusive. One, both, or none can be specified. Note: File Access Authentication can be an attribute of both an individual's (or group's) profile and a specific S-I-S file.

The "How" Authentication Options determine the criteria used to authenticate (identify) the End User. S-I-S uses three classes of "How" criteria:

"Secret" Pass Phrase—A "Pass Phrase" is the familiar "password" or PIN used in so many systems. Secret Pass Phrases may also include "Duress Codes" (codes that when keyed in notify security personnel that the code has been entered under duress).

Unique Device—A unique device is a device the possession of which serves to confirm the possessor's identity (e.g., a "smart card" or a "dongle").

Biometric Measurement—A biometric authenticator is a device that reads a unique human attribute, such as a fingerprint.

Note, according to this embodiment these options are not mutually exclusive. Pass Phrase authentication is always required, but it can be used either alone or in conjunction with one, or both, of the other options.

"Who" authentication is very much dependent upon the nature of "who" is being authenticated. Individual authentication can have different criteria than group authentication. In this embodiment, there are four classes of identity. The "who" authentication of each is explained in the following:

Individual Authentication—An individual is a single person. S-I-S Individual Authentication requires a Pass Phrase, known only to the individual, and can optionally employee one or more unique devices (e.g. a smart card) and/or one or more biometric measurements (e.g., retina scan).

Group Identity Authentication—Group Identity refers to a number of individuals (the group), such as a department or work group, who share information and ownership of one or more S-I-S Virtual Strongboxes. S-I-S relates to the group as if it were a single individual. S-I-S Group Identity Authentication requires a Pass Phrase, known only to the members of the group, and can optionally employee one or more unique devices that are shared by members of the group. Naturally, biometric measurements cannot be used.

Group Membership Authentication—Group Membership refers to the situation whereby an individual is considered to be a member of a group based upon his/her own individual identity. No special authentication, beyond that required to establish individual authentication, is required to participate as Group Member. Groups and their members are listed in S-I-S Membership tables. Once an individual's identity is known, the Groups in which he/she participates as member are also known.

Group Entity Authentication—A Group Entity consists of a number of individuals, all of whom must be present in order to establish the Entity's identity. To establish Entity identification, each member of the Entity must enter his/her individual credentials. As with Individual Authentication, these credentials must include individual Pass Phrases and may include unique devices and biometric measurements. (Note: It is not essential that all members of the entity use all of the same types of credentials, although it is prudent that they do.)

Referring now to FIG. 7, audit trails according to an embodiment of the present invention will be discussed. More particularly, according to this embodiment for each Virtual Strongbox at least two Audit Trail files are maintained. One of these, the "Internal Log" is stored in the Virtual Strongbox itself. The other, the "External Log" is stored, as a special version of a Virtual Strongbox, in a secure file in the operating system of the computer that stores the Virtual Strongbox. When a Virtual Strongbox is successfully opened, the entries in its two Audit Trail files may be synchronized. Of note, synchronization may be necessary because there are times when entries will be recorded in one Audit Trail file and not in the other. For example, the External Log may record all unsuccessful attempts to open a specific Virtual Strongbox. These cannot be recorded in the Virtual Strongbox's Internal Log until the Virtual Strongbox is actually successfully opened.

All Virtual Strongbox access may be recorded in an Audit Trail file. When the Virtual Strongbox is created in this embodiment, an audit trail profile is created. This may determine what actions are to be recorded to the audit trail. Each audit trail entry according to this embodiment contains:

Who (the name of the individual signing the entry)
Who (the digital signature of the signer based upon the Virtual Strongbox files and the other fields in the specific Audit Trail entry)
Who (the Public Key for the Digital Signature)
What (the action performed)
When (the system time/date stamp)
Virus Scanner Seal (a digitally signed Time/Date Stamp and "Bill of Health" from an S-I-S enabled Virus Scanner) or an indication that the Virtual Strongbox was not virus scanned.

In addition, an audit trail entry may contain optional fields such as:

Certified "When" (a digitally signed Time/Date Stamp for an S-I-S enabled Certified Time/Date Server).

Referring once again to the Internal Log file of this embodiment, it is noted that this is a file that is stored inside of each Virtual Strongbox. It is encrypted with the Virtual Strongbox owner's Public Key so that only the Virtual Strongbox owner may read it. It is also digitally signed by the individual who writes/saves the Virtual Strongbox. This digital signature helps protect the Internal Log file from tampering.

Referring once again to the External Log file of this embodiment, it is noted that this is a file stored in the operating system of the computer that stores the Virtual Strongbox. In this registered user. The S-I-S External Audit Trail file is managed by the S-I-S Core Module and is operating system per computer. The S-I-S External Audit Trail file is owned by the S-I-S embodiment there is only one S-I-S Audit Trail ("Log") file per S-I-S registered user per encrypted with the S-I-S External Audit Trail owner's Public Key. Thus, only the S-I-S External Audit Trail's owner can read its contents. Naturally, since the External Log may contain entries from multiple Virtual Strongboxes, all owned by the same owner, each External Log entry contains an additional field indicating to which Virtual Strongbox the entry pertains. Of note, the External Log will contain one type of entry that cannot appear in the Internal Log—the entry that records the deletion of the Virtual Strongbox file.

In addition, for greater security it is also possible to record, in a System Administrator owned S-I-S Audit Log file, all access, and attempted access, to specific S-I-S "External Log" files. This additional audit trail can help prevent malicious activities specifically directed at particular S-I-S Audit Trail files.

Referring now FIG. 8, an S-I-S Return Receipt Package according to an embodiment of the present invention will be discussed. More particularly, although it is comforting to know that the file transmission security architecture provides content and surveillance protection, for files that are transmitted, it is also comforting to know that the intended recipient did indeed receive them. There are times when the acknowledgement of delivery by the recipient is almost as important as the content of the files being transmitted. S-I-S recognizes this essential aspect of "accountability" and provides for it through the use of S-I-S Return Receipt Packages ("S-I-S RR Packages").

An S-I-S RR Package is similar to an S-I-S Virtual Strongbox, in that it consists of a number of component files packaged together in a file container, but it is designed to optimize the process of delivery acknowledgement. In this embodiment the S-I-S RR Packages are divided into two portions: the "message portion" and the "receipt portion".

As seen in this FIG. 8, the Message Portion includes:

The "Message File"—The Message File is the file that the sender wishes to transmit to the recipient. The Message File can (and for optimum security should) be an S-I-S Virtual Strongbox file. In the S-I-S RR Package of this embodiment the Message File is encrypted with a 1-Time Random Key (for symmetrical encryption).

Message Unique ID—The Message Unique ID is a unique identifier assigned to the transmitted "Message File". The Message Unique ID is a proprietary combination of the Time/Date, the sender's identity, the recipient's identity, and a randomizing factor. In this embodiment the Message Unique ID is encrypted with the recipient's public key (so that the recipient, and only the recipient, can read it).

The Sender's ID & Time/Date Stamp—The Sender's unique S-I-S identity, Public Key, and an S-I-S certified Time/Date Stamp all encrypted with the recipient's public key in this embodiment (so that the recipient, and only the recipient, can read them).

The S-I-S RR Package's Digital Signature. The S-I-S RR Package's Digital Signature is the Sender's Digital Signature of the remainder of the entire S-I-S RR Package (i.e., the Message File, the Message Unique ID, the Sender's ID & Time/Date Stamp, and the entire Receipt Portion. This Digital Signature is encrypted with the recipient's public key in this embodiment (so that the recipient, and only the recipient, can read it).

Further, as seen in this FIG. 8, the Receipt Portion includes:

The 1-Time Random Key—The 1-Time Random Key is the symmetric encryption key used to encrypt the Message File. This is stored encrypted in the S-I-S RR Package's Receipt Portion with the sender's public key. Thus, the recipient cannot read the value of the 1-Time Random Key and cannot decrypt the Message File at this time. When the receipt portion is sent back to the sender, the sender will be able to read the value of the 1-Time Random Key.

The Message Unique ID—This is the same Message Unique ID that is found in the Message Portion of the S-I-S RR Package, but here it is encrypted with the sender's public key. When the receipt portion is sent back to the sender, this Message Unique ID will identify the appropriate S-I-S RR Package for the sender.

Referring now FIG. 9, a four step delivery acknowledgement process according to an embodiment of the present invention will be discussed. In summary, under this delivery acknowledgement process:

- The Sender Prepares and Sends the "Package" to the Recipient
- The Recipient Receives the Package and Returns the Receipt Portion to the Sender
- The Sender Records the Receipt and Sends the "Release" to the Recipient
- The Recipient Receives the Release and Opens the Message File More particularly:

Step 1—The Sender Sends the Package

When an S-I-S user (the "Sender") transmits a file (the "Message File") to another S-I-S user (the "Recipient") using S-I-S enabled software and the S-I-S Return Receipt option, the S-I-S software creates an S-I-S RR Package. Within the S-I-S RR Package are, among other items:

- The Message File, encrypted with a 1-Time Random Key (for symmetrical encryption) that, at this point, the recipient does not know.
- A Message Unique ID encrypted with the Recipient's public key (i.e., only the Recipient can read it).
- The 1-Time Random Key encrypted with the Sender's public key (i.e., only the Sender can decrypt the 1-Time Random Key), and
- The Sender's digital signature for the entire S-I-S RR Package encrypted with the Recipient's public key (i.e., only the Recipient can read it).

Of note, the entire S-I-S RR Package is transmitted to the Recipient and the S-I-S RR Package is also recorded as "sent" in the Sender's S-I-S RR Transmission Log (which may be an S-I-S Virtual Strongbox file).

Step 2—The Recipient Returns the Receipt

On the Recipient's computer, the S-I-S enabled software opens the S-I-S RR Package. The software then:

- Decrypts the Digital Signature using the Recipient's Private Key.
- Checks the Package for tampering/corruption by verifying the digital signature.
- Stores the Message File in its encrypted form (it cannot yet be read by the Recipient) in the S-I-S "Pending Directory".
- Decrypts the Message Unique ID and the Sender's Identity (these can be read by the recipient) and stores these with the encrypted Message File.
- Digitally signs the entire remaining Receipt Portion of the S-I-S RR Package. This consists of the 1-Time Random Key, the Message Unique ID, and the Recipient's ID & Time/Date Stamp (all encrypted with the Sender's Public Key). This Digital Signature is also encrypted with the Sender's Public Key. Of note, this operation and the one after it can, at the user's discretion, be accomplished automatically or require manual confirmation.
- Returns the entire Receipt Portion, together with the Recipient's Digital Signature of the receipt portion of the S-I-S RR Package, Message ID & Time/Data Stamp to the Sender. Of note, this operation and the one prior to it can, at the user's discretion, be accomplished automatically or require manual confirmation.

Step 3—The Sender Sends the Release

When the Sender receives the Receipt, the S-I-S enabled transmission software:

- Decrypts the Digital Signature using the Sender's Private Key.
- Checks the Package for tampering/corruption by verifying the digital signature.
- Decrypts and stores the Receipt (for audit purposes) in an S-I-S Receipt Directory (which may be an S-I-S Virtual Strongbox file).
- Marks the S-I-S RR Package as "signed for" in the Sender's transmission log.
- Creates a "Release" message. The "Release" message is composed of:
    - the encrypted 1-Time Random Key
    - the Message Unique ID
    - (the above two elements are now both encrypted with Recipient's public key and therefore readable by the Recipient)
- Appends the Sender's Unique ID & Time/Date Stamp (encrypted with the Recipient's Public Key)
- Digitally signs the "Release" with the Sender's private key.
- Encrypts the Digital Signature with the Recipient's Public Key.
- Sends the "Release" to the Recipient.

Step 4—The Release is sent to the Recipient

When the Recipient receives the Release, the S-I-S enabled software:

- Decrypts the Digital Signature using the Recipient's Private Key.
- Checks the Package for tampering/corruption by verifying the digital signature.
- Opens and decrypts the Release
- Using the Message Unique ID the Recipient identifies the Message File in the S-I-S Pending Directory.
- Using the 1-Time Random Key decrypted from the Release, the Message File is decrypted and presented to the Recipient.
- The Message File is moved from the Pending Directory to the "Received" Directory.
- If the Message File is unreadable the Recipient contacts the Sender who can resend either the entire S-I-S RR Package or merely the Release.

Referring now to FIG. 10, various S-I-S Return Receipt Options according to an embodiment of the present invention will be discussed.

Depending upon the volume of Delivery Acknowledgement (Return Receipt) traffic received and the nature of the communications, a Recipient may find that the manual acknowledgement of each and every Return Receipt transmission is an overly onerous and unnecessary task. In this embodiment the Recipient has the option to set S-I-S RR Receipt response to "Implicit", i.e., to automatically send the return receipt without any human intervention. There is, however, a price for this convenience. Messages are "signed for" without the Recipient's knowledge (i.e., information is being transmitted from the recipient's computer without the recipients explicit consent) and the "Receipt" Signature may not be legally binding. In any case as seen in this FIG. 10, the Recipient's options in this embodiment are two:

- Explicit Signatures—Manual Intervention is required to sign for each and every S-I-S RR Package.
- Implicit Signatures—S-I-S RR Packages are automatically signed for, except for those packages for which the Sender requires an Explicit Signature.

As might be expected, the Sender of an S-I-S RR Package may not want merely an Implicit Return Receipt Signature. This embodiment therefore provides the Sender with an option that forces the Recipient to provide an Explicit Signature. When the Sender specifies the "Explicit Return Receipt Signature" option, the S-I-S enabled recipient software of this embodiment will only accept an Explicit Signature, an explicit response.

Of note, S-I-S enabled file transmission software of this embodiment can send the transmitted file either directly (Sender to Recipient—"Point to Point") or indirectly via an intermediary (a "Third Party Service Provider). Depending upon the specific application, there are advantages and disadvantages to each. When sending an S-I-S RR Package transmission through a Third Party Service Provider, the Sender has the option of managing the return receipt directly, or of requesting that the Secure Third Party Service (e.g., a Secure e-Mail Service) manage it. This option is set up as a user preference that can be changed on a per message basis.

The basis for S-I-S's encryption and digital signature features according to an embodiment of the present invention involves asymmetric encryption; in particular Public and Private keys. This technology is colloquially known as "Public Key Infrastructure" or "PKI". Under PKI, each entity using the system has a unique pair of encryption/decryption keys. One key is the "Public Key". As its name implies, the Public Key is public. Its value can be shared with the world. The other Key is the "Private Key". The Private Key should be known only to the owner of the key.

The two predominate methods of assigning PKI Keys according to this embodiment are:
  To obtain them from a Trusted Third Party—A Trusted Third Party generates a PKI Key pair. These keys are then sent to the key owner and installed on that key owner's computer. Both keys, the Public Key and the Private Key, are stored in non-volatile memory (e.g., a hard disk) on the key owner's computer.
  To generate them directly on the key owner's computer—The computer code necessary to generate PKI Key pairs is installed on the key owner's computer. The PKI Keys are generated when needed. These keys should not be stored in non-volatile memory since they are readily reproducible; that is, they should be stored only in volatile memory (e.g., in RAM).

S-I-S, according to this embodiment, can work with PKI keys generated by and obtained from a Trusted Third Party Vendor. For optimum security, however, native S-I-S works best with S-I-S PKI keys generated on the key owner's computer. Native S-I-S key generation may be based upon the identity authentication information provided by the user. S-I-S Core Module software provides the functionality for generating these Public/Private Key pairs. Since these keys need not be stored in non-volatile memory, an S-I-S user may be able to use any S-I-S enabled computer, not merely the computer in which his/her PKI keys are stored. S-I-S may store Public Keys on key owner's computers, but never Private Keys.

In order to send secure information to others using PKI technology, or to validate a digital signature, it is sufficient to know the other entity's Public Key. S-I-S registered Public Keys are stored in a network of S-I-S Public Key Repositories. These S-I-S Public Key Repositories are accessible by the S-I-S Core Module programs.

When an S-I-S key owner first registers with S-I-S, the Public Key is recorded in an S-I-S Public Key Repository. Within each S-I-S Public Key Repository, it can be specified which Public Keys are to be shared with the general public and which are to known only to the local members of the repository. It is also possible within a single repository to set up multiple domains of Public Keys, so that, on a key by key basis it is possible to specify which key to share, or not share, and with which domains.

In order to maintain consistency and the integrity of the S-I-S Public Key Repository Network, an oversight entity may maintain an S-I-S Public Key Repository Network Management Service. In one embodiment all S-I-S Public Key Repositories must subscribe to this oversight service.

Further, S-I-S according to this embodiment provides support for some of the more popular non-S-I-S PKI systems. The S-I-S Core Module contains the functionality to interface with these non-S-I-S vendors. When working with a non-S-I-S PKI System, S-I-S obtains the required PKI key pairs, either from those stored on the S-I-S user's computer or from those the PKI vendor makes available to the public.

The following discussion will now focus on certain additional S-I-S components according to an embodiment of the present invention:

S-I-S Virus Scanner Interface

The spread of computer viruses has reached pandemic proportions. The use of encryption may, unless the proper precautions are taken, adversely contribute to the unchecked spread of these destructive programs. If a file in encrypted, and that file contains a virus, the virus will also be encrypted. Firewalls and other corporate level defenses cannot readily detect encrypted viruses (and thus, such defenses let encrypted viruses pass through unimpeded—see FIG. 13). For virus protection to be effect it must take place when a file is in its unencrypted (plain text) state. In this embodiment S-I-S provides this service.

More particularly, Virtual Strongbox files can be scanned just before they are encrypted and written into the Virtual Strongbox. They can be scanned again, when the Virtual Strongbox is opened and its contents decrypted, but before the individual files are themselves opened. When the S-I-S Virus Scanner Interface option is active, the S-I-S Core Module may perform these functions automatically. Whenever a Virtual Strongbox is opened or saved (or if a Virus Scan is requested by the user), the S-I-S Core Module searches for presence of an S-I-S enabled Virus Scanner. When it finds one, it submits the Virtual Strongbox contents to the Virus Scanner to be scanned. If an S-I-S enabled Virus Scanner is not found, the S-I-S Core Module issues an error message and requests guidance from the user. The user may opt to try again or cancel the Virus Scanning operation. In this embodiment, for this S-I-S option to function effectively, the user must maintain, or have access to, an up-to-date S-I-S enabled virus scanner program, accessible from the user's computer.

S-I-S Time/Date Stamp Interface

Inaccurate time/date stamps can lead to confusion. Deliberately altered time/date stamps can be used as tools for fraud and deceit. It is easy, for those who know how, to manipulate and alter the time/date stamp on their own computers. For true and accurate, impartial, time/date stamps, an independent third party may be necessary. The S-I-S Time/Date Stamp Interface of this embodiment works with S-I-S enabled independent Time/Date providers to record digitally signed, independently certified time/date stamps in the S-I-S Virtual Strongboxes. When the S-I-S Time/Date Stamp Interface option is active in this embodiment, before the S-I-S Core Module records a time/date stamp, it attempts to find an S-I-S enabled Time/Date provider and obtain a certified, digitally signed, time/date stamp from that provider. If it cannot find such a provider, it issues an error message and requests guidance from the user. The user may opt to try again, cancel the operation, or use the local computer's (not certified) time/date stamp.

S-I-S File Name Randomizer

File names and ownership can, and should, be revealing. With the quantity of information stored and the number of files maintained on computers, it would be totally unmanageable if the file names did not indicate something about the content of their files and who owns them. And yet, even if a malefactor does not have access to the content of a file, knowing the name of file, that the file exists, and who the owner is, can be valuable information. In order to protect against this type of vulnerability, this embodiment of S-I-S provides an S-I-S File Name Randomizer program. Using an S-I-S Virtual Strongbox, the S-I-S File Name Randomizer program maintains a file-owner-owned translation table (the S-I-S File Name and Ownership Translation Table) that converts between meaningful Virtual Strongbox file names and random meaningless names, generated by S-I-S, that are seen by the operating system. When a new Virtual Strongbox is created, the S-I-S File Name Randomizer:

Obtains the meaningful name from the user

Generates a "random" name for use by the operating system

Creates a new translation entry in the Virtual Strongbox S-I-S File Name and Ownership Translation Table Saves the new Virtual Strongbox as an operating system visible file using the random name When the user wishes to open a Virtual Strongbox and the S-I-S File Name Randomizer is operating, the user consults the list of meaningful Virtual Strongbox names in the translation table. Upon choosing one, the S-I-S File Name Randomizer issues a command to the operating system to open the file (the Virtual Strongbox file) with the corresponding random name.

Of note, when the S-I-S File Name Randomizer assigns a "random name" to a Virtual Strongbox file, it can, at the user's option, also disguise the "type" of file (i.e., it can alter the file suffix as well as the file name).

File Proxy Ownership

File Proxy Ownership is an S-I-S File Name Randomizer option that enables the user to hide the ownership of a Virtual Strongbox file. When this option is installed, the S-I-S File Name Randomizer registers a number of new operating system users. Each of these new users has a "random" name, i.e., a "proxy" name, and identical permissions as the original S-I-S user. The number of proxy names requested is a user settable parameter (within the limitations set up by the system administrator). When a new Virtual Strongbox is created, the S-I-S File Name Randomizer saves the Virtual Strongbox file in the operating system, assigning its ownership randomly to one of the file owner's proxy names. Access to the operating system file directory reveals only the proxy name for the file ownership and not the identity of the real owner. When a Virtual Strongbox is opened, the S-I-S File Name Randomizer assumes the identity of the proxy name in order to open the file.

Centralized Control File Proxy Ownership

For some IT environments, the free-wheeling, decentralized control provided by the standard S-I-S File Proxy Ownership may be too lax. These environments may require stronger centralized control, control that permits the System Administrators to know who the real file owners are. For such environments, a variation on the standard S-I-S File Name Randomizer program may be provided: the S-I-S Centralized File Name Randomizer (CFNR). In a CFNR environment, in addition to each user maintaining his/her own S-I-S File Name and Ownership Translation Table, the operating system maintains a table for the entire user population: the Global File Name and Ownership Translation Table. Unlike the standard S-I-S File Name and Ownership Table, this table is not a Virtual Strongbox, since all users must have access to it. In one example (which example is intended to be illustrative and not restrictive) the "Global Table" contains five columns: Meaningful File Name, Randomized File Name, File Owner's Proxy Name, File Owner's Real Name, File Owner's Digital Signature. In order to preserve confidentiality, certain columns of each entry of the table are encrypted. These are as follows:

Meaningful File Name—Encrypted with the file owner's Public Key (only the file owner can read its value).

Randomized File Name—Not Encrypted (plain text)

File Owner's Proxy Name—Not Encrypted (plain text)

File Owner's Real Name—Encrypted with the System Administrator's Public Key (only the System Administrator can read its value).

File Owner's Digital Signature—The digital signature for the four previous columns in the specific table entry.

Since the System Administrator's Public Key is known, each user can write his/her own entries into the table. Since the Meaningful File Name column is encrypted with the File Owner's Public Key, only the File Owner can know its value. The two plain text fields contain information that is available in the operating system directories. The File Owner's Real Name is accessible only to the System Administrator. The File Owner's Digital Signature prevents bogus table entries.

Of note, FIG. 11 shows examples (which examples are intended to be illustrative and not restrictive) of the Translation Tables discussed above.

A discussion of how an certain embodiments of the S-I-S architecture may provide various aspects of CIA&E (discussed above) will now be undertaken:

How S-I-S Protects Confidentiality There are two aspects to Confidentiality: Content Protection and Surveillance Protection.

Content Protection

S-I-S protects the content of Virtual Strongboxes by encrypting the content. The encryption used may be the strongest encryption permissible by law. When the laws change and/or the technology improves, S-I-S may incorporate those changes. Using Public/Private Key technology S-I-S ensures, to the maximum extent possible, that only the entity possessing the appropriate Private Key can decrypt and read the files stored in a Virtual Strongbox. This is true of Virtual Strongboxes that are stored and of Virtual Strongboxes that are transmitted (the technology may be the same; the encryption may be the same; the protection may be the same—the Virtual Strongboxes may be same).

Surveillance Protection

S-I-S provides significant protection against surveillance of stored files and against surveillance of transmitted files.

Surveillance Protection for Stored Files

The S-I-S File Name Randomizer helps ensure the anonymity of stored files. Snoopers are only able to determine that files exist on storage devices. They cannot determine the true names of the files, the types of the files (are they Virtual Strongboxes?), nor the owners of the files.

Surveillance Protection for Transmitted Files

For transmitted S-I-S Virtual Strongboxes, the use of an intermediate destination, such as an S-I-S enabled e-Mail Service, ensures the de-coupling of sender and receiver for any surveillance of the transmission media. Transmission monitors are only able to detect that the sender has transmitted some information (its name and content unknown), not to whom it is being sent (except that it was sent to the neutral intermediate station). Similarly transmission monitors are only able to detect that the receiver has received some information (its name and contents unknown), not from whom it came (except that it came from the neutral intermediate station).

How S-I-S Protects Integrity

File Integrity is a function of tamper-proofing and virus protection. S-I-S provides both. The extensive use of digital signatures ensures that Virtual Strongbox files and S-I-S support files are not tampered with. The optional Virus Scanning at critical points in a file's existence (i.e., on opening, on saving, and during transmission) minimizes the danger of virus infection and renders the limiting factor the capability of the Virus Scanner software, rather than the S-I-S architecture.

How S-I-S Provides Accountability

As it is stated above: Accountability is a matter of "Who/Whom", "What", and "When". S-I-S answers and keeps track of all of this accountability information, ensures its accuracy, and protects the information.

"Who"

S-I-S supports both aspects of "Who" Accountability:

Registration/Enrollment Authentication—S-I-S provides Authentication Classifications to indicate how reliable the entity's identity is.

Access Authentication—S-I-S utilizes robust and extensive Public/Private Key encryption, combined with multiple entity identification technologies (Pass Phrases, Unique Devices, and Biometrics) to ensure and authenticate, within the limits of hardware and software, the identity of the entity accessing the S-I-S system and S-I-S Virtual Strongboxes.

"What & When"

S-I-S's multiple Audit Trail files, one stored within each Virtual Strongbox itself, keep accurate and secure track of all that transpires within the S-I-S system and its Virtual Strongboxes.

The use of digitally signed, independent, certified Time/Date stamps provide S-I-S users with accurate records of "when" events occurred.

"Who & When"—Delivery Acknowledgement

The S-I-S Return Receipt Package and its supporting software provide a reliable, easy-to-use (low administrative overhead), and well-protected Return Receipt mechanism.

Why S-I-S is Easy to Use

S-I-S is easy to use because it provides the appropriate balance between transparency and awareness. The transparency is a result of the S-I-S customized interfaces with existing applications. S-I-S may thus be "built into" those already familiar applications. In one embodiment it is not a whole new system, a whole new paradigm, nor a whole new user interface. By being designed, in one embodiment, as an "add-on" component, S-I-S functionality integrates directly into known workflow and activity patterns. The learning curve is thus anything but steep.

Nevertheless, the awareness is there. There may be "extra buttons" on computer screens and additional functionality to think about. When a legal digital signature is required, S-I-S may prompt for it. Security with S-I-S is a gentle presence, not an overbearing burden.

S-I-S is easy to use because it is flexible. In one embodiment S-I-S builds its security at the application layer, not the operating system layer. This means that S-I-S may be easily operating system and machine independent. S-I-S Virtual Strongboxes can be created, read, saved, and sent on any computer that is running S-I-S enabled software. S-I-S Virtual Strongboxes can travel across any network (including wireless) and through any computer, whether or not it is S-I-S enabled. S-I-S avoids the messy inter-system protocols that complicate communications. S-I-S can stay ahead of the technology wave, riding, as it does, in one embodiment, as an application, above all of the operating system turbulence and dependencies.

S-I-S is easy to use because it is robust. It can support many levels of security requirements, from the most stringent to the most lax, with a level of complexity (although always low) commensurate with the security requirements of the environment.

As discussed above, authentication is an important aspect of security. Thus, it deserves some additional detailed attention. In general, authentication is the means whereby system users are identified (that is, authentication is verification of identity). In one embodiment of the present invention there are three distinct types of authentication that correspond to the three distinct situations when authentication is required:

Registration Authentication (Enrollment)—When an individual is registered to use the system.

External Authentication (System Access)—When an individual "logs in" (identifies him/herself) to use the system.

Internal Authentication (Resource Access)—After an individual has identified him/herself to the system and attempts to use a system resource (run a program) or access information stored in the system (e.g., open a file).

In order to understand the implications and vulnerabilities of each, it is important to understand how each type of authentication is accomplished.

How is Authentication Accomplished?

Registration Authentication

Registration Authentication occurs when an individual is enrolled as a system user and receives a system identity. This system identity is familiar to most computer users as being their system "login name". In many, perhaps most, public systems, Registration Authentication is the least stringent of the authentication processes, and the source of significant vulnerability.

Within the corporate environment, Registration Authentication typically begins with a manual process, usually a Human Resources function. An employee is hired by the company. Forms are filled out and references are checked. If no problems arise, the individual is then assumed to be the person whom he/she has presented him/herself to be. Once the corporate identity has been established, an Information Technology department system administrator typically registers the individual into the system (or systems) to which he/she will have access.

Outside of the controlled corporate environment most Registration Authentication is based upon self-affirmation, "I am who I am because I say that I am." For example, almost any individual can register with almost any Internet Service Provider and create almost any identity he/she desires. That identity, whether real or fictional, whether true or stolen, then takes on an existence all its own. It will appear in shared mailing lists and in Internet based directories. A de facto identity is created, based purely on the Registration Authentication of self-affirmation.

Third party identification authentication (e.g., a notary) is also possible.

External (Access) Authentication

External, or "Access", Authentication occurs when an entity must establish an identity at the start of a new "system session". This can be at the start of a computer usage session (the familiar "Login" screen at system startup) or at the start of a new "session" that requires re-identification (such as is required when accessing a secure area of a web site). External Authentication is used to verify the identity of the entity attempting to use the system. These verification criteria can be as simple as the requirement for a password, or PIN, and as complex as requiring multiple individuals using biometric devices. Typically, External Authentication uses three types of criteria:

"Pass Phrase"—A "Pass Phrase" is the familiar "password" or PIN used in so many systems. Depending upon the level of security required, the rules regarding how Pass Phrases are chosen and used will vary. In general, however, Pass Phrases are one of the less secure forms of authentication. Even if they are kept secret, if they are too short, they can be cracked using brute force, trial-and-error, attacks. If they are too long, most individuals will avoid using them, even when circumstances require their use. The three most common forms of Pass Phrases are:

"Made-up and Remembered"—The simplest, most familiar, and least secure is the made-up Pass Phrase. The system user chooses a phrase that is meaningful (so that it will not be forgotten), and yet not too obvious. Typical admonitions about choosing a good Pass Phrase include:
Do not use the names of relatives or pets.
Do not use birthdays
Use a mixture of letters and numbers
Do not choose a phrase that is too short
Typically, most of us violate at least one of these guidelines.

"Look-up" Reference—A more sophisticated type of Pass Phrase is the look-up reference. For example, the actual Pass Phrase may be found by looking up a certain passage in a book. As far as possible, the name of the book and the rule for finding a Pass Phrase in it are kept secret. One might use a common novel as the book (the "code book"), the day of the year to indicate a page in the book, and the last two digits of the year to indicate at which word on the page to start. With the location determined, one could use the month of the year to determine how many words on the page, starting from the calculated location, will constitute the current Pass Phrase.

"Generated & Synchronized"—Generated and Synchronized are a relatively secure form of Pass Phrase. They are especially useful when the Pass Phrase may be transmitted over a medium that is subject to eavesdropping. They also require specialized hardware. Two (or more) random Phrase generators are synchronized to continuously produce a new random phrase at set intervals. One generator is installed in the authenticating computer. The others are put in the possession of the individuals requiring authentication. When an individual is prompted by the system for a Pass Phrase, he/she enters the phrase currently presented by the generator in his/her possession. This phrase should exactly match the one currently in resident in the synchronized authenticating computer. Once that phrase is used, it is never used again, thus thwarting the attempts of "listeners" to steal Pass Phrases.

Unique Device—A unique device is a device the possession of which confirms the possessor's identity. Typically, unique devices are not used as stand-alone authenticators, but rather, in conjunction with a Pass Phrase or some other authentication criteria. Some examples of unique device authenticators are:
Pass Phrase Generator—see "Generated & Synchronized" Pass Phrases above.
Dongle—a device that plugs into a port on the back of a computer.
Smart Card—a "credit card" with a computer chip in it.

Biometric—A biometric authenticator is a device that reads a unique human attribute, such as a fingerprint. Often, a biometric device is used to compare the read value with the ones stored in the authenticating system's files. When a match is found, the identification of the individual is confirmed. Once, biometric authenticators were the stuff of science fiction, spy novels, and esoteric security organizations. Now, however, some biometric devices have become quite affordable and may soon become quite commonplace. Some of the more popular types of biometric devices are:
Fingerprint reader
Hand Geometry reader
Retina Scan Internal Authentication As computer system users work with their systems, they periodically require access to various system resources. Prior to granting access to a resource, the computer system must determine whether or not the particular user has the permission/authority to access the requested resource. Permissions and authority are a function of identity.

Explicit Internal Authentication—Permission Lists

After External Authentication has taken place, systems typically assign the system user an internal system ID. This internal system ID serves to identify that user in all future system interactions (within the session). The internal system ID is then compared with "permission" lists to determine what privileges the user has and to what information the user should be granted access.

Using permission lists to control resource access implies the need for a central authority. Ultimate control will always reside with whoever has the authority to maintain the lists. The use of permission lists thus mandates a hierarchical privilege structure.

Implicit Internal Authentication—Encryption

An alternative and/or supplement to the use of access permission lists is the use of encryption and "keys" to perform internal authentication. Using this method, the user is associated with one or more "keys". These keys are used for the encryption and decryption of information. Access permission is determined by whether or not the user's keys can correctly decrypt the information.

Key-based access control can be managed by a central authority, the assigner of the keys, or individually, when keys are generated by the individuals who use them. Keys can be used to support both a centralized hierarchical privilege structure and/or a flat, decentralized, egalitarian, privilege structure.

Referring now to the operation of conventional secure file transmission systems, a discussion of secure e-mail utilizing a Point-to-Point Encryption architecture and a Web Based Secure e-Mail architecture will be undertaken (of note, a similar analysis can be performed for File Transfer Protocol [FTP], Electronic Data Interchange [EDI], or other "secure" information transmission systems).

More particularly, referring now to FIG. 12 a diagram of a conventional e-mail system using Point-to-Point Encryption is shown. As seen in this Fig., Point-to-Point Encryption systems encrypt the message at the source, and decrypt the message at the target. Many Point-to-Point systems rely upon Public Key technology (Asymmetric Encryption) in order to avoid the issues associated with Symmetric Encryption (not the least of which is the "Key Distribution Issue": if only one key is being used, how is it passed from the Encryptor to the Decryptor).

In the example shown in FIG. 12, Alice, a message sender, uses Bob's (the message recipient) Public Key to encrypt the message, ensuring thereby that only Bob will be able to decrypt the message (since, if the message is encrypted with Bob's Public Key, only his Private Key can decrypt it). Alice also digitally signs the message using her own Private Key, ensuring both tamper-proofing and non-repudiation.

Disadvantages of Conventional Point-to-Point Encryption

If Point-to-Point Encryption Systems are well implemented they provide a certain degree of security. How good are they in terms of the total picture of the CIA&E criteria?

Confidentiality

Content Protection—Excellent. The content is encrypted

Surveillance Protection—Poor. Even if the content is safe, the e-mail traffic, from whom to whom, can be easily monitored.

Integrity

Tamper-proofing—Excellent. Messages are digitally signed.

Virus Protection—Very Poor. Point-to-Point Encryption is an excellent tool for the proliferation of viruses.

Accountability

"Who"—Good. Digitally signed messages provide non-repudiation, and Public/Private Key encryption ensures the identity of the recipient.

"When"—Poor. No independent Time/Date verification.

Ease of Use—Poor. Typically Point-to-Point Encryption systems are not easy to set up and use. Keeping an address book of Public Keys is an administrative nightmare. Also, since each message can be sent to only one recipient at a time, sending out multiple copies of an e-mail message (and maintaining one for oneself) is a chore.

Some of these limitations of conventional Point-to-Point Encryption systems are illustrated in FIG. 13. In this example, in addition to Alice (the sender) and Bob (the recipient), there is now Eve, a spy. Despite the care Alice and Bob have taken to safeguard their communications, since they are using e-mail, Eve the spy, can keep track of their every e-mail message. Eve cannot know the content (due to encryption), but she can know how many messages are being exchanged and when.

Perhaps even more troubling is the notion that Alice's messages, although tamper-proof and not subject to repudiation, can contain and spread viruses. If Alice's message to Bob contains a virus, either inadvertently or maliciously, the virus itself will be encrypted and therefore it is not detectable by the firewalls' virus scanners.

When using Point-to-Point Encryption, there is nothing to prevent Alice from entering a fraudulent Time/Date stamp on her e-mail before sending it to Bob. Without recourse to independent verification, Bob cannot know, or prove, that the e-mail was not sent when Alice says it was.

Referring now to FIG. 14 a diagram of conventional e-mail using Web Based Secure e-Mail is shown. As seen in this Fig., a web site based e-mail service is used for sending such secure e-mail. More particularly, when using Web Based Secure e-Mail, e-mail messages are stored remotely on a Web site. These e-mail messages are created by a sender and retrieved by one or more recipients. Web Based Secure e-Mail offerings come in many flavors. Some provide features such as timed automatic document "self-destruct", and almost all provide very excellent and extensive Time/Date tracking.

In order to send a secure e-Mail message to Bob, Alice logs on to the web site of a Web Based Secure e-Mail provider. She establishes a secure link (SSL) to the web site and enters her e-mail message. She also typically provides a password that Bob must use in order to authenticate himself when he retrieves the message.

On the web site, the message is Time/Date stamped and may be scanned for viruses. It is then encrypted and stored on the web server. An "open" (non-encrypted) e-mail message is sent to Bob informing him that he has a secure e-mail message from Alice, and instructing him on how to retrieve it.

Bob logs on to the web site and provides the appropriate password, which he has received from Alice via another medium. The message is then decrypted and Bob can read it. Bob's retrieval of the message is also Time/Date stamped and then transmitted to Alice (possibly in a secure e-mail message, but usually in another "open" e-mail).

Disadvantages of Conventional Web Based Secure e-Mail

Web Based Secure e-Mail Systems are becoming more and more popular, although the efficacy of their security is typically not great. How are they in terms of the total picture of the CIA&E criteria?

Confidentiality

Content Protection—Fair. Web servers are notoriously vulnerable to hackers, and web site spoofing (see the discussion below) can be a problem. There is also a possibility that a disgruntled web site employee could read the messages stored at their site.

Surveillance Protection—Poor. The "open" e-mail message informing Bob that he has a secure message from Alice, and the "open" e-mail message informing Alice that Bob has retrieved the secure message are easily intercepted and read.

Integrity

Tamper-proofing—Fair. Web site spoofing is a threat, and there is a possibility that a disgruntled web site employee could compromise the messages stored there.

Virus Protection—Excellent. Messages can be virus scanned on the web site before they are encrypted and after they are decrypted.

Accountability

"Who"—Fair. There is little or no authentication of who the sender is. Authentication of the recipient is limited to password protection only.

"When"—Excellent. There are independent Time/Date verifications and audit records for all stages of the process.

Ease of Use—Fair. Logging on to a web site is typically a departure from most business e-mail systems. It is a whole new process and requires a whole new procedure for tracking and storing e-mail messages. Secure e-mail messages can only be read while "online". One advantage, however, is that neither the sender nor the recipient require any special software other than a web browser.

Some of the limitations of Web Based e-Mail Systems are illustrated in FIG. 15. Here, in addition to Alice (the sender), Bob (the recipient), and Eve (the spy), there is also Lilith (the host of a spoof web site). A spoof web site shares the same look and feel as the web site it is spoofing, but it is operated by imitators, usually for nefarious purposes. In this situation, if Alice logs on to Lilith's web site instead of the genuine Web Based e-Mail System provider's web site, she will send Lilith the complete plain text (un-encrypted) message. Lilith will then be able to read the contents, change the contents, and pass the message along to the genuine web site as if she were Alice. When Bob receives the message, he has no way of determining that it was compromised.

Referring now to FIG. 16, a secure e-mail system architecture designed from a System Integrated Security point of view according to an embodiment of the present invention is shown. Of note, this embodiment address the CIA&E attributes of security and utilizes the S-I-S software, infrastructure and Virtual Strongboxes to ensure the security its e-Mail transmissions.

The overall process of sending a secure e-Mail message consists of three components: the sender, the recipient, and a Mid-Station processing center. The sender has two Mid-Station Processing Options: to send the e-Mail with or without Integrity Checking.

Option #1—Mid-Station Integrity Checking
On The Sender's Computer
  The e-Mail message is composed (using an S-I-S enabled version of a standard e-mail client)
  The e-Mail message, including all address information (to whom, from whom etc.), the message text, and any and all attachments is stored in an S-I-S Virtual Strongbox for which the Secure e-Mail Service is the designated owner.
  A normal (non-secure) e-Mail message containing the S-I-S Virtual Strongbox is sent to the Secure e-Mail Service.
On The Mid-Station (Secure e-Mail Service) Processing Center
  The e-Mail message is received and the S-I-S Virtual Strongbox is opened.
  The contents are virus scanned.
  The digital signature of the sender is verified.
  A certified Time/Date Stamp is affixed to the e-mail message.
  The e-Mail message is stored in an S-I-S Virtual Strong for which the recipient is the designated owner. (If there is more than one recipient, a Virtual Strongbox is created for each recipient.) A confirmation S-I-S Virtual Strongbox is also prepared for the sender.
  A normal (non-secure) e-Mail message containing a S-I-S Virtual Strongbox file is sent to each recipient, (if there is more than one recipient, each recipient is sent his/her own Virtual Strongbox), and to the original sender.
On a Recipient's Computer
  The e-Mail message is received and stored in the recipient's Inbox.
  The S-I-S Virtual Strongbox is opened (using an S-I-S enabled version of a standard e-mail client).
  The contents of the S-I-S Virtual Strongbox, the "e-mail message" is read by the recipient.
Option #2—Mid-Station Pass Through (No Integrity Checking)
On The Sender's Computer
  The e-Mail message is composed (using an S-I-S enhanced version of a standard e-mail client)
  The e-Mail message (including any and all attachments) is scanned for viruses (using the S-I-S Virus Scanner Option). For each designated recipient, an S-I-S Virtual Strongbox is created and the e-Mail message is stored within it. The owner of each Virtual Strongbox is its intended recipient.
  Note: For this process to function properly the sender is required to have the S-I-S Virus Scanner feature operational and to have access to the recipient(s) Public Key(s) (which should be available through the S-I-S Public Key Repository Network).
  A special Virtual Strongbox is created containing the e-Mail addresses of all the recipients. This Virtual Strongbox is created with the Secure e-Mail Service as the owner.
  A normal (non-secure) e-Mail message containing the e-Mail S-I-S Virtual Strongbox(es) is sent to the Secure e-Mail Service.
On The Mid-Station (Secure e-Mail Service) Processing Center
  The e-Mail message is received
  A certified Time/Date Stamp is acquired.
  For each recipient's Virtual Strongbox, a normal (non-secure) e-Mail message is created that contains that recipient's S-I-S Virtual Strongbox and the digitally signed Certified Time/Date Stamp digitally signed by the Secure e-Mail Service.
  Normal e-Mail messages containing the appropriate Virtual Strongboxes are sent to the recipients.
On a Recipient's Computer
  The e-Mail message is received and the S-I-S Virtual Strongbox is opened (using an S-I-S enhanced version of a standard e-mail client).

Of note, there are advantages to each option. In general Option #1 is more convenient (no requirement to maintain a completely up-to-date Virus Scanner), but Option #2 is more secure (no intermediate decryption of the Virtual Strongbox by a third party).

Of further note, a "Registered Mail" (Return Receipt) Option may be provided since confidential communications often require a delivery confirmation and/or an acknowledgement of receipt by the recipient.

Of further note, this embodiment of the present invention may require the following:
  A Secure e-Mail Service Provider (this can be a private service within an organization or a public Application Service Provider) that has the S-I-S Enabled e-Mail Service Server (which also provides access to the S-I-S Public Key Repository, a database of "S-I-S listed" public keys).
  A subscriber population of individuals who have S-I-S Enabled e-Mail Client software installed and a Public Key that is registered with an S-I-S recognized Public Key Repository e-Mail. Typically installation and registration procedures of the S-I-S Enabled e-Mail Client software include:
    Generation of an individual Public/Private Key pair for the subscriber.
    The choice of Access Authentication criteria for the subscriber. A Pass Phrase is required, and other criteria, such as unique device and biometric verification, are available.
    A Registration Authentication class set, that is, an indication of what Registration Authentication criteria were. For example this could be:
      Self-Affirmation
      Employer verification
      Financial institution verification
      Notary verification Of further note, as seen in FIG. 17, the secure e-mail system of this embodiment (using either option) meets the CIA&E Criteria as follows:
  Confidentiality
  The aspects of confidentiality are Content Protection and Surveillance Protection. This embodiment of the secure e-mail System does both.
    Content Protection—The e-mail is securely encrypted with a Public/Private Key encryption system.
    Surveillance Protection—There is essentially no way for a "spy" to discover the identity of both the sender and recipient of the message. A spy could only see that the sender is sending an encrypted message to the Secure e-Mail Provider and that, in what may be a totally unrelated event, the recipient is receiving an encrypted message from that same provider.

Integrity

Integrity is preserved through the use of digital signatures (tamper-proofing) and viable virus scanning; virus scanning of a plain text (not a cipher text) message.

Accountability

The conditions of accountability are also met. These are:

Who

The use of digital signatures provides non-repudiation of sender.

Public/Private Key encryption ensures the identity of the recipient.

The architecture supports the use of a robust registration system that enables a sophisticated Registration Authentication process.

The architecture supports the use of more sophisticated Access Authentication criteria, criteria such as unique devices and biometrics.

When—The Secure e-Mail Service Provider provides an independent and accurate Time/Date Stamp.

Ease of Use

The use of modular client software that functions as an add-on to existing e-mail clients ensures that system users will be working with a familiar user interface. Since it is compatible with an "on-demand" key generation system, users of this secure e-mail system are not tied to using any particular computer for their e-mail. Any computer in which the appropriate e-mail client enhancement is installed can be used. Security levels can be as lax or as stringent as desired and required. The flexibility exists for some subscribers to use simple Pass Phrase authentication, while others use a combination that includes unique devices, biometrics, and even duress codes.

Referring now to FIG. 18, a secure e-mail system according to another embodiment of the present invention is shown.

Referring now to FIG. 19, a secure e-mail system according to another embodiment of the present invention is shown.

Referring now to FIG. 20, a secure FTP system according to another embodiment of the present invention is shown.

Referring now to FIG. 21, a secure web access system according to another embodiment of the present invention is shown.

Referring now to FIG. 22, an S-I-S user's overview according to another embodiment of the present invention is shown.

Referring now to FIG. 23, an S-I-S external services overview according to another embodiment of the present invention is shown.

Referring now to FIG. 24, a flowchart relating to a Virtual Strongbox open operation according to another embodiment of the present invention is shown.

Referring now to FIG. 25, a flowchart relating to a Virtual Strongbox read ("Unpack") operation according to another embodiment of the present invention is shown.

Referring now to FIG. 26, a flowchart relating to a Virtual Strongbox write ("Save") operation according to another embodiment of the present invention is shown.

Referring now to FIG. 27, an overview of user authentication according to another embodiment of the present invention is shown.

Referring now to FIG. 28, a flowchart relating to user authentication according to another embodiment of the present invention is shown.

Referring now to FIG. 29, a diagram showing user ID and key arrays relating to user authentication according to another embodiment of the present invention is shown.

Referring now to FIG. 30, an overview of internal integration according to another embodiment of the present invention is shown.

Referring now to FIG. 31, an overview of S-I-S file processing and I/O according to another embodiment of the present invention is shown.

Referring now to FIG. 32, a flowchart relating to S-I-S invocation according to another embodiment of the present invention is shown.

Referring now to FIG. 33a, a flowchart relating to S-I-S process launch according to another embodiment of the present invention is shown.

Referring now to FIG. 33b, a flowchart relating to S-I-S process thread launch according to another embodiment of the present invention is shown.

Referring now to FIG. 34, an overview of an S-I-S main module according to another embodiment of the present invention is shown.

Referring now to FIG. 35, an overview of an S-I-S core module (and core module components) according to another embodiment of the present invention is shown.

Referring now to FIG. 36, an overview of an S-I-S encryption module according to another embodiment of the present invention is shown.

Referring now to FIG. 37, an overview of S-I-S encryption key management according to another embodiment of the present invention is shown.

Referring now to FIG. 38, an overview of an S-I-S public key network according to another embodiment of the present invention is shown.

In another embodiment of the present invention S-I-S is a platform independent security architecture that provides protection for electronic information storage and transmission.

In another embodiment of the present invention S-I-S is a shared, high availability, high performance, complete, effective, and easy to use electronic security architecture.

In another embodiment of the present invention the S-I-S architecture, and the extent and effectiveness of its security, are unique in the marketplace.

In another embodiment the present invention provides a security mechanism which is:

Powerful enough to provide the requisite level of protection.

Simple enough to use in order that it will be used and not circumvented from within by the individuals and organizations it is intended to protect.

"Transparent with a presence".

Integrated into existing systems and existing system user interfaces.

Easy enough to administer so that the system itself does not collapse under its own administrative infrastructure requirements.

Modular enough and compatible enough so that the same security foundation can become common to all the components of a system, common to all the systems within an organization, and even common enough to enable it to be extended to inter-organizational, national, and even to global security.

Modular enough and small enough so that it can be implemented quickly and operate without the need for, or dependence upon, an enormous national, or international, infrastructure.

Self-sufficient enough so that it does not depend upon the existence of a large, and/or distant, third party entity in order to function properly.

In another embodiment of the present invention the S-I-S applications may include, but are not limited to:

Secure Desktop (Local File System)
  Word Processors, Spreadsheets, etc.
File Sharing
  Direct Exchange
    "Save For . . ."
  Group Access
Secure File Transmission
  Via a trusted 3$^{rd}$ Party (e-mail, FTP, etc.)
Website Mutual Authentication
ISP Services (e.g., e-mail)
Payment Systems In another embodiment of the present invention a revenue model associated with the electronic information security mechanism may utilize one or more of the following revenue stream types according to the implementation of the invention (e.g., the type of product or service being sold):

For services (e.g., secure e-mail and/or certified time/date stamp) there may be a periodic (e.g., monthly, quarterly, yearly) subscription fee.

For products there may be a one-time licensing fee that includes basic technical/customer support. For "Enhanced support" there may be an "additional fee" based option available for specific periods. Software updates may be distributed for free. Software upgrades may require a new, albeit reduced, licensing fee.

Software Developer Kits (SDKs) may be distributed for free (if downloaded from the Web). There may be a nominal cost ("at cost") to cover media, shipping, & handling costs for "hard copy" documentation and distribution media.

Embedded S-I-S software (the result of a successful SDK implementation) may be charged based upon an individually negotiated royalty percentage and/or subscription fee.

Of note, the subscription periods offered and their respective rates (e.g. discounts for longer periods) may be determined by market demand and/or subscriber feedback and the enhanced support periods offered and their respective rates (e.g. discounts for longer periods) may be determined by market demand and/or subscriber feedback.

In another embodiment of the present invention a mechanism may be provided for information storage and transmission which enables entities to store and/or retrieve information efficiently; to communicate quickly; and to operate in a secure and low cost fashion.

In another embodiment of the present invention a mechanism may be provided for a shared, high availability, high performance, complete, effective, easy to use, and platform independent security architecture.

In another embodiment of the present invention a mechanism may be provided for universal, platform and application independent, security software. The software's completeness and ease of use may render it an effective electronic file security system.

In another embodiment of the present invention a mechanism may be provided for a platform-independent system architecture that provides the foundation for complete and secure electronic file storage and/or transmission.

In another embodiment of the present invention a mechanism may be provided for universal and secure interconnectivity.

In another embodiment of the present invention the same technology may be used to protect files that are stored and files that are transmitted.

In another embodiment of the present invention a mechanism may be provided for the protection across the spectrum of electronic security: Confidentiality, Integrity, Accountability, and Ease of Use.

In another embodiment of the present invention a combination of Symmetrical and Asymmetrical encryption may be used to protect the content of confidential files.

In another embodiment of the present invention the virtual strongboxes may contain additional files (wherein hooks are provided in the virtual strongboxes to aid in downward and/or cross-platform compatibility).

In another embodiment of the present invention each virtual strongbox may be named with the same name as a data file contained therein (including the suffix), with a unique (for example, but not limited to, ".vsb") suffix appended thereto (e.g., if a data file is a Microsoft Word document called "myword.doc", then the virtual strongbox containing this Word document may be named "myword.doc.vsb").

In another embodiment of the present invention the "random" names (e.g., in connection with a file name and/or a file owner alias) may be generated from either totally random (e.g., pseudo) combination of characters, or from a combination of random characters and predetermined character strings. One reason for this is that if a file name has a completely unintelligible name (e.g., AcI9xowq.doc), it may be readily recognizable as a disguised file; on the other hand, if the file has an innocuous looking name (e.g., Soccer League Roster 23.doc), it will far less conspicuous, and hence, better hidden.

While a number of embodiments of the present invention have been described, it is understood that these embodiments are illustrative only, and not restrictive, and that many modifications may become apparent to those of ordinary skill in the art. For example, any aspect(s) of the invention may be implemented, as desired, as software, firmware, and/or hardware.

What is claimed is:

1. A digital processor-readable strongbox container digital file disposed on a digital storage medium, the file including instructions executable by a processor for providing autonomous file level security to protect one or more digital files to be stored therein and to be accessed by a user, the file comprising:

instructions for allowing access to one or more secure digital files in the strongbox container, each of the digital files being encrypted and digitally signed;

an audit trail log comprising one or more entries, wherein each user interaction with the strongbox is recorded and digitally signed by each user;

authentication information defining for each user who has permission to access the strongbox, each user's privileges for accessing the strongbox, the one or more protected files, the audit trail log, and each user's authentication privileges;

wherein said recorded user interactions include one or more of: each attempt by the user to access and/or manipulate the strongbox and/or its content: each manipulation of the strongbox and/or its content; and manipulation of the authentication information for modifying user permissions and/or privileges;

and wherein each user's ability to interact with the container is based on the authentication and encryption information independent of the digital processor or operating system upon which it resides.

2. A digital processor-readable strongbox container digital file disposed on a digital storage medium, the file including instructions executable by a processor for providing autonomous file level security to protect one or more digital files to be stored therein and to be accessed by a user the file comprising:

instructions for allowing access to one or more secure digital files in the strongbox container;

an audit trail log comprising one or more entries, wherein each user interaction with the strongbox container and its contents is recorded and digitally signed by the user; and authentication information defining the user's privileges for interacting with the one or more secure digital files and the audit trail log, wherein said recorded user interactions include one or more of: each attempt by the user to access and/or manipulate the strongbox and/or its content; each manipulation of the strongbox and/or its content; and manipulation of the authentication information for modifying user permissions and/or privileges;

wherein the user's ability to interact with the secure strongbox container digital file and its contents is based on the authentication information independent of the digital processor or operating system upon which they reside.

3. The container of claim 2 wherein the one or more secure digital files are secured using encryption.

4. The container of claim 3 wherein the one or more secure digital files are digitally signed.

5. The container of claim 3 wherein each recorded user interaction in the audit trail log is indicative of at least one of a read-only transaction, a read/write transaction and a save transaction with the container and/or its content.

6. The container of claim 2 wherein the authentication information further defines each user's privileges for accessing the strongbox.

7. A method for providing autonomous file level security to protect one or more digital files to be accessed by a user, comprising steps of:

creating a digital processor-readable strongbox container digital file to be stored on a digital storage medium, wherein the strongbox container can store one or more secure digital files;

creating an audit trail log to record each user interaction with the strongbox container and its contents, wherein each log entry is digitally signed by the user, and wherein the audit trail log is stored in the strongbox container; and creating authentication information defining the user's privileges for interacting with the one or more secure digital files and the audit trail log, wherein the authentication information is stored in the strongbox container;

wherein said recorded user interactions include one or more of: each attempt by the user to access and/or manipulate the strongbox and/or its content; each manipulation of the strongbox and/or its content; and manipulation of the authentication information for modifying user permissions and/or privileges; and wherein the user's ability to interact with the strongbox container and its contents is based on the authentication information independent of the digital storage medium, digital processor or any operating system on the digital storage medium or digital processor.

8. A method for providing autonomous file level security to protect one or more digital files to be accessed by a user, comprising steps of:

creating a digital processor-readable strongbox container digital file to be stored on a digital storage medium, wherein the strongbox container can store one or more secure digital files;

creating an audit trail log to record each user interaction with the strongbox container and its contents, wherein each log entry is digitally signed by the user, and wherein the audit trail log is stored in the strongbox container; and creating authentication information defining the user's privileges for interacting with the one or more secure digital files and the audit trail log, wherein the authentication information is stored in the strongbox container;

wherein the user's ability to interact with the strongbox container and its contents is based on the authentication information independent of the digital storage medium, digital processor or any operating system on the digital storage medium or digital processor.

* * * * *